(12) United States Patent
Franco

(10) Patent No.: US 7,257,552 B1
(45) Date of Patent: Aug. 14, 2007

(54) CONSUMER PRODUCTS DISTRIBUTION SYSTEM

(76) Inventor: Hector Franco, 999-A La Mesa Ter., Sunnyvale, CA (US) 94086

( * ) Notice: Subject to any disclaimer, the term of this patent is extended or adjusted under 35 U.S.C. 154(b) by 243 days.

(21) Appl. No.: 09/817,535

(22) Filed: Mar. 26, 2001

Related U.S. Application Data

(60) Provisional application No. 60/225,393, filed on Aug. 15, 2000, provisional application No. 60/192,291, filed on Mar. 27, 2000.

(51) Int. Cl.
*G06Q 10/00* (2006.01)
(52) U.S. Cl. .............................. 705/28; 705/26; 705/27
(58) Field of Classification Search ............ 705/26–27, 705/28
See application file for complete search history.

(56) References Cited

U.S. PATENT DOCUMENTS

| | | | | |
|---|---|---|---|---|
| 4,799,156 A | * | 1/1989 | Shavit et al. ................ | 705/26 |
| 5,158,155 A | * | 10/1992 | Domain et al. .............. | 186/53 |
| 5,186,281 A | * | 2/1993 | Jenkins ........................ | 186/55 |
| 5,431,250 A | * | 7/1995 | Schlamp ...................... | 186/55 |
| 5,595,264 A | * | 1/1997 | Trotta, Jr. .................... | 186/56 |
| 5,672,039 A | * | 9/1997 | Perry et al. ................. | 414/280 |
| 5,890,136 A | * | 3/1999 | Kipp ............................ | 705/22 |
| 5,943,424 A | * | 8/1999 | Berger et al. ................ | 705/26 |
| 5,960,411 A | * | 9/1999 | Hartman et al. ............. | 705/26 |
| 5,966,697 A | * | 10/1999 | Fergerson et al. ........... | 705/26 |
| 6,026,375 A | * | 2/2000 | Hall et al. ................... | 705/26 |
| 6,101,482 A | * | 8/2000 | DiAngelo et al. ........... | 705/26 |
| 6,193,160 B1 | * | 2/2001 | Zembitski .............. | 235/472.01 |
| 6,211,102 B1 | * | 4/2001 | Jones et al. ................ | 442/149 |
| 6,249,773 B1 | * | 6/2001 | Allard et al. ................ | 705/26 |
| 6,336,100 B1 | * | 1/2002 | Yamada ....................... | 705/26 |
| 6,370,515 B1 | * | 4/2002 | Diamond et al. ............ | 705/28 |
| 6,535,880 B1 | * | 3/2003 | Musgrove et al. ........... | 705/27 |
| 6,556,975 B1 | * | 4/2003 | Wittsche ...................... | 705/26 |
| 6,615,184 B1 | * | 9/2003 | Hicks .......................... | 705/26 |

OTHER PUBLICATIONS

Netship: Markowicz, Bernard; "Decentralizing the Online Market," Traffic World, v260n9pg23, 2pgs, Proquest #47192564.*
PaxZone: Internet Archive Wayback Machine, www.archive.org; www.paxzone.com; Nov. 28, 1999, 1 pg.*

(Continued)

*Primary Examiner*—Robert M. Pond

(57) ABSTRACT

A real-time transaction processing Consumer Products Distribution System (PDMS) reduces distribution costs, facilitates the distribution of products to consumers and makes online shopping practical. The PDMS integrates Collaborative Inventory Sharing, Order Aggregation, Consumer Predictive Purchasing, Product Transport Support Service, Display Shops, Uniform Consumer Preference Codes, Integrated Virtual Technical Support Centers, and other convenient features. Consumers purchase products through web sites of local and remotely located retailers preferably using Predictive Purchasing. The items purchased from multiple retailers are aggregated at a consumer selected Order Aggregation Site (OAS) based upon a consumer specified schedule. The consumer can pick up the aggregated orders at the selected OAS or have the aggregated orders delivered to a residence. Commercial carriers process consumer parcels at OASs where they are combined with Aggregated Orders for pickup or delivery. Consumers are given incentive discounts to promote the use of Predictive Purchasing, which significantly improves supply chain productivity.

12 Claims, 54 Drawing Sheets

OTHER PUBLICATIONS

Combini: Landers, Peter; "Japan Offers High-Tech Convenience Stores," The Salt Lake Tribune, Aug. 4, 1996, 2 pgs, Proquest #15870405.*

Combini: Landers, Peter; "In Japan, the Hub of E-Commerce is a 7-Eleven-Without Credit Cards, Shoppers Order Online and Pick Up at a Local Convenience Store," Wall Street Journal, Nov. 1, 1999, 3 pgs, Proquest #4948096.*

Schnabel, Megan; "Changing Chains Brendle's Closing More Bad News for Catalog Showroom Industry," Roanoke Times & World News, Jul. 21, 1996, Proquest #15758804, 5 pgs.*

Joselow, Froma; "Self-serving Convenience, more stores are letting the shopper go it alone," Providence Journal, Apr. 16, 1989, Proquest #59599571, 3 pgs.*

* cited by examiner

ORDER PROCESSING MODULE (OPM) FLOW CHARTS

RETURNS PROCESSING MODULE (RPM) FLOW CHARTS

ORDER AGGREGATION PROCESSES
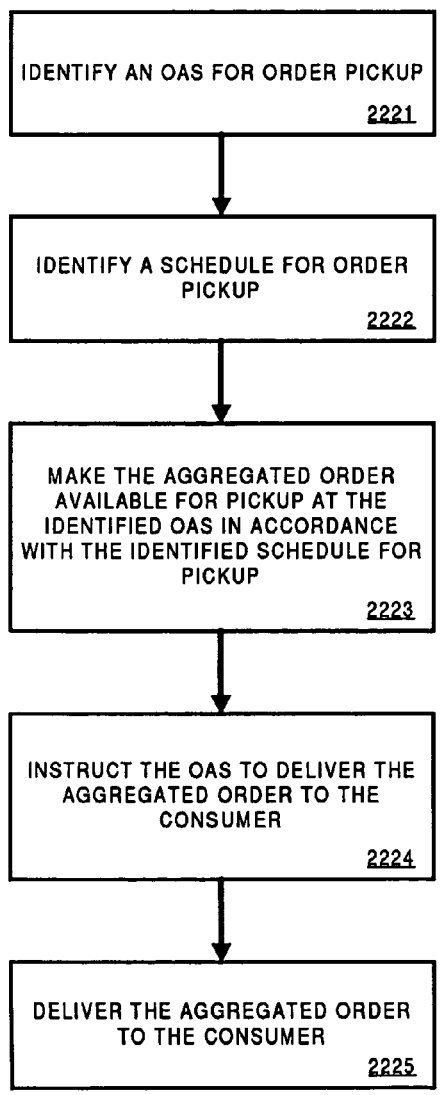
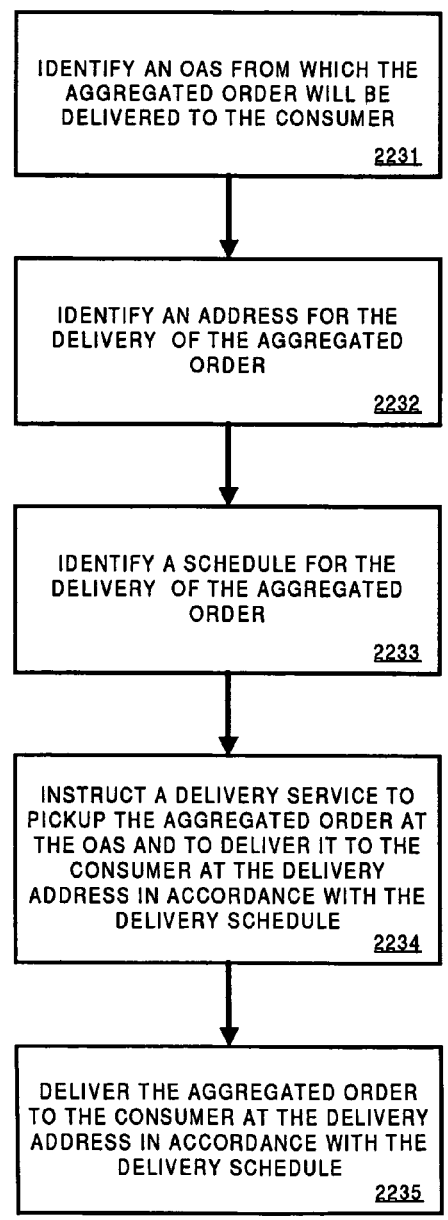
FIG. 22B

ORDER AGGREGATION PROCESSES
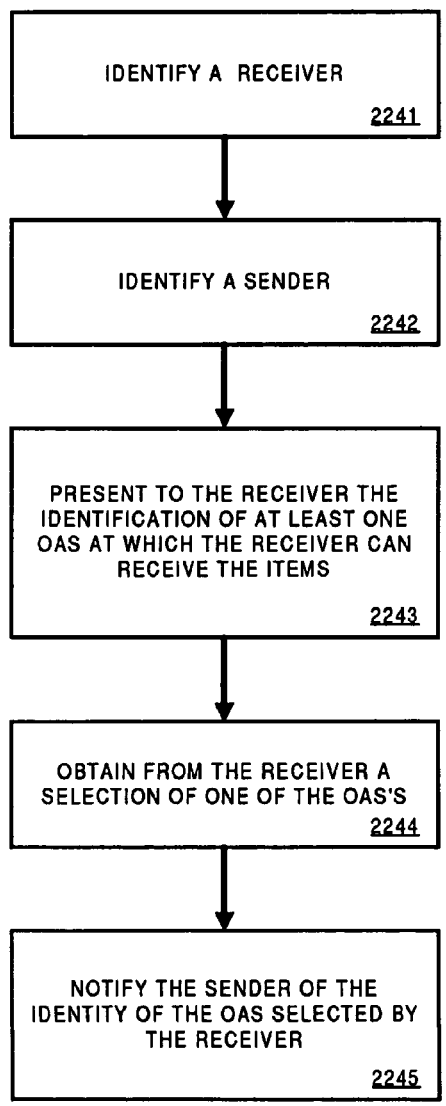
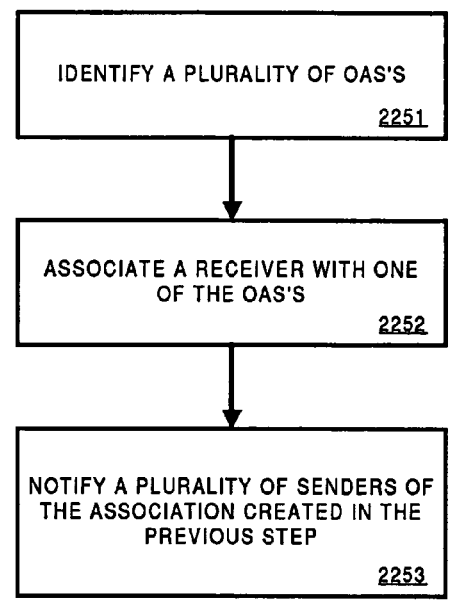
FIG. 22C

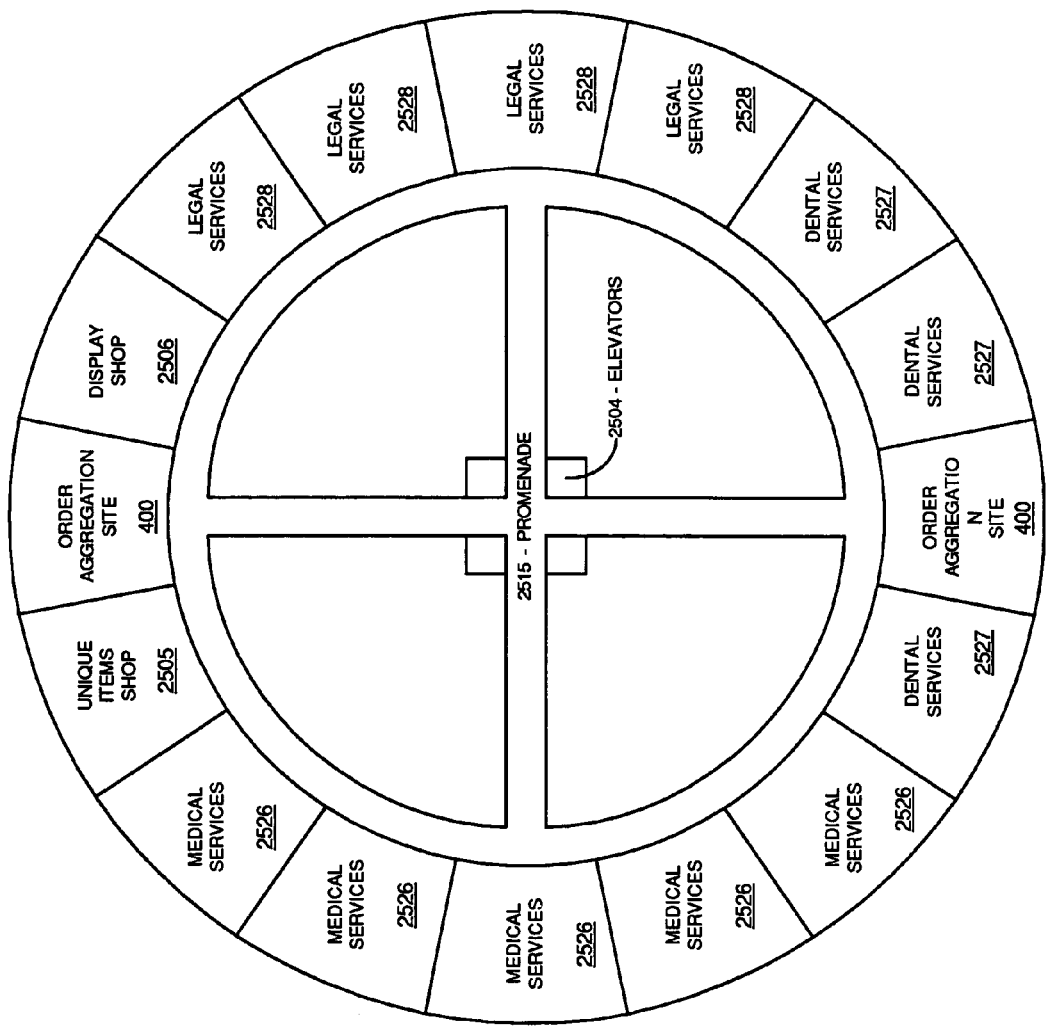

EXAMPLE WEB PAGES FOR SETTING UNIFORM CONSUMER PREFERENCE CODES (UCPC)

2610 - REPRESENTATION OF UCPC

| PRODUCT: 2611 | BANANA 2612 | |
|---|---|---|
| CODE NAME: 2613 | GREEN 2614 | |
| CHARACTERISTIC 2615 | UNIT 2616 | UCPC 2617 |
| WEIGHT 2621 | OUNCE 2631 | 7 2641 |
| RIPENESS 2622 | DAY 2632 | 3 2642 |

2650 - REPRESENTATION OF UCPC

| PRODUCT: 2611 | NEW YORK STEAK 2652 | |
|---|---|---|
| CODE NAME: 2613 | MY NY 2654 | |
| CHARACTERISTIC 2615 | UNIT 2616 | UCPC 2617 |
| THICKNESS 2661 | INCH 2671 | 1 2681 |
| WEIGHT 2662 | OUNCE 2672 | 12 2682 |
| MARBLE FAT 2663 | SPOTS/SQ IN 2673 | 2 2683 |
| PERIPHERAL FAT 2664 | % 2674 | 5 2684 |

FIG. 26

METHOD FOR CORRELATING INCENTIVE PRICE DISCOUNT TO PREDICTIVE PURCHASE DELAY (PPD)

CONSUMER PRODUCTS DISTRIBUTION SYSTEM

RELATED APPLICATION

This application claims the benefit of U.S. Provisional Application No. 60/192,291, filed on Mar. 27, 2000, which is incorporated by reference, and U.S. Provisional Application No. 60/225,393, filed on Aug. 15, 2000.

FIELD OF THE INVENTION

This invention relates generally to a method and system for improving the efficiency and reducing the cost of distributing and selling products to consumers. More particularly, the invention relates to Internet based methods and systems for Just-In-Time product distribution, inventory sharing, order aggregation, consumer predictive purchasing, and other conveniences and benefits that provide incentives for consumers to shop online.

BACKGROUND OF THE INVENTION

The conventional distribution of products to consumers is, and always has been, a most inefficient process. Pipeline inventories tend to be much higher than necessary to support average consumer demand. Distribution times—from manufacturer to wholesaler to distributor to retailer to consumer—tend to be significantly longer than the time necessary to transport products from the manufacturer's shipping dock to the consumer's doorstep. Products often remain in warehouses for excessive periods of time. In conventional retailing, the allocation of overhead expense to each individual product sold represents a disproportionately high percentage of the retail price. On the consumer side, there are additional distribution costs such as the value of time expended to locate and select the desired products, the expense of driving to stores, and the additional cost of time and inconvenience of waiting in line at cash registers to pay for purchases.

With advances in Internet and online retailing technology, it was expected that inefficiencies associated with conventional product distribution could be significantly reduced—or even eliminated. The expectation was that Internet customers would simply place orders with various retailers and have products shipped directly to their homes. While this is exactly how electronic commerce operates at the present time, this business model is burdened by its own set of problems and gross inefficiencies. For example:

(1) The cost of processing, packing, and shipping an individual item from a distribution center to a consumer is substantially higher than the average unit cost of shipping a comparable item, in bulk, to a retailer.

(2) The requirement that a consumer be at home to accept delivery at random times during the day—especially delivery of perishable goods or items requiring the signature of a recipient—has proven to be an unexpected, major inconvenience.

(3) In an attempt to solve the home delivery problems discussed above, many consumers have created a brand new set of problems by using their employer's address for personal deliveries during the workday. Unfortunately, this "solution" creates a new problem—for the employer—by straining corporate mail system capacity and increasing corporate operating costs. As the problem grows, more and more employers are restricting this practice.

Returning online purchases represents another major inconvenience—typically involving the following time-consuming steps the consumer must complete:

(1) Secure a return authorization from the distribution center.

(2) Follow packing instructions dictated by the distribution center.

(3) Prepare a bill of lading or other required shipping documents.

(4) Get the return shipment into the hands of a common carrier. If the distribution center elects to have the customer deliver the item to a designated common carrier facility, the customer must drive to the facility where a wait in line is almost inevitable before a carrier representative actually takes more of the customer's time to process the shipment. Alternatively, the distribution center may arrange to have a common carrier pick up the item in which case the customer is inconvenienced in a different way by being committed to be home during a time window, specified by the carrier, that may span several hours or a full day.

Online retailing has also levied a heavy toll on our fragile environment. The delivery of ever-larger numbers of small parcels as individual shipments to consumers requires more and more trucks and fuel, results in increased vehicular traffic and pollution, and uses more and more non-biodegradable packaging materials such as foam and plastic.

In summary, today's consumer product distribution—either through conventional stores or online storefronts—is plagued with inefficiencies that typically raise the retail price of products to a level many times the manufacturing cost. The lack of an appropriate business model for the distribution of products to consumers limits many of the potential benefits that online merchandising can and should bring to society. These benefits include: (1) lower costs, (2) improved shopping convenience, (3) means to quickly locate any type of product, (4) broader selection of vendors, (5) increased variety of products, (6) ease of feature and price comparison, and (7) enhanced competition.

In conclusion, there is no Internet-based business model currently in operation that supports the efficient distribution of products to consumers.

SUMMARY OF THE INVENTION

The present invention addresses the problems previously outlined by providing an Internet-based infrastructure that improves the efficiency of product distribution to consumers. In accordance with one embodiment of the invention, this infrastructure includes a Product Distribution Management System (PDMS) through which various the aspects of the invention are enabled.

One aspect of the invention relates to Collaborative Inventory Sharing. In accordance with this aspect, inventory providers participating in the PDMS agree to share all or part of their respective inventories using a mechanism called the "Virtual Inventory." This aspect is discussed in Sections I.A.1, II.A.1, and VI of the Detailed Description of the Invention. Retailers participating in the PDMS have access to the Virtual Inventory to expand their product line and fill their orders, as needed.

One aspect of the invention relates to Order Aggregation. In accordance with this aspect, purchases made by a consumer from a variety of local and remotely located retailers are aggregated at a consumer-selected local facility called an "Order Aggregation Site." Thereafter, the aggregated order can be picked-up by the consumer or delivered to an address designated by the consumer in a single trip. Order Aggregation Sites can be established at strategic locations and can operate within existing stores. This aspect is discussed in Sections II.A.6, II.C, and VII of the Detailed Description of the Invention.

One aspect of the invention relates to Consumer Predictive Purchasing. In the current product distribution space, vast amounts of extremely valuable predictive consumption data stored in the minds of individual consumers are lost every day to the detriment of the supply chain and the economy. This aspect provides a system and method to collect and store, in real-time, predictive consumer consumption data. The use of this data in supply chain planning and forecasting can significantly contribute to major cost reductions in product manufacturing and distribution. In one embodiment of this invention, consumers are offered incentive discounts to use the infrastructure provided by the PDMS for predicting their consumption needs at a future date and placing Predictive Purchase orders scheduled for future delivery to fulfill the predicted needs. The incentive discounts can be determined by appropriate algorithms designed to ensure extensive consumer participation. This aspect is discussed in Sections, II.A.7 and VIII of the Detailed Description of the Invention.

One aspect of the invention relates to a Product Transport Support Service. In accordance with this aspect, a regional trucking service is deployed to support the operation of the PDMS and provide a solution to the so-called "Last Mile Problem." This service, referred to as "PTSS," preferably operates between regional distribution centers and Order Aggregation Sites and can also make deliveries of orders to, and pickups of returns from, consumer residences. The PTSS preferably operates under the control of a computer system that uses optimization algorithms to coordinate the efficient transportation of products. This control system supports Just-In-Time schedules and attempts to utilize the trucks at full capacity to maximize productivity. The optimization algorithms take advantage of the large volume of activity that is typically associated with the deployment of the PDMS in any reasonably populated area. This aspect is discussed in Sections, II.B and III.B of the Detailed Description of the Invention.

One aspect of the invention relates to Display Shops. In accordance with this aspect, premium commercial shelf space is used to display products on the behalf of manufacturers, wholesalers, and distributors. These shops are the ultimate place where consumers can make the right decisions with respect to products they are interested in buying. Such shops need not carry inventory for sale. Instead, the products they sell are brought directly from distribution centers to the Order Aggregation Site of the consumer's choice to be made available based upon the consumer's instructions. The primary function of the Display Shop is service. It uses trained technicians to answer questions, assist consumers, and explain product features. In addition, these technicians also give demonstrations, and provide technical support and consumer training. The Display Shops are equipped with web browsers that can be used for order placement and other activities associated with the PDMS.

One aspect of the invention relates to Uniform Consumer Preference Codes. In accordance with this aspect, a universal coding system is used to characterize with sufficient specificity discrete consumer products. Discrete consumer products are those that are well recognized by a generic name that is not specific enough to fully characterize the product. To illustrate, picture a consumer trying to describe over the phone to the grocer the desired cut for a New York steak the consumer may have in mind. The weight and thickness may not be a problem. However, the amount of fat and how it may be distributed present considerable difficulty. Using these codes, a consumer can easily identify with sufficient specificity the desired discrete product. The Uniform Consumer Preference Codes can provide the convenience and incentive for consumers to extend online shopping to discrete products. This aspect is discussed in Sections, II.A.8 and X below of the Detailed Description of the Invention.

One aspect of the invention relates to Integrated Virtual Technical Support Centers. In accordance with this aspect, groups of support technicians can be coordinated and organized to provide customer service and technical support for multiple brands of products of the same type. These centers can operate efficiently and eliminate the consumer inconvenience of long waits on the phone. Their operation relies upon integration and scheduling. Integration combines the technical support groups of multiple manufacturers of similar products. A technician with expertise in one product can be easily and cost effectively trained to support any similar product of a different brand. Irrespective of the geographic location of the participating support technicians, they can all be integrated into one virtual center under the control of a computer system that coordinates their activities. Such integration can provide good load balance and significantly improve system efficiency. Scheduling means making an appointment for a technical support phone session like making an appointment to see a doctor. Using the Internet infrastructure provided by the PDMS, the consumer is guided through a few simple steps on a web browser, to select a convenient time slot and the option of initiating or receiving a call at the selected time. After completing these steps the consumer can be guaranteed voice contact with a technician within a narrow window of the selected time such as 60 seconds, as described in Section IV.B.8.

One aspect of the invention relates to Unique Items Shops. In accordance with this aspect, shops such as the current boutique, which specialize in unique items that the consumer may want to personally inspect and select have the opportunity to participate in the extensive benefits offered by the PDMS. These items are not produced in volume like staple type products. Instead, they are typically hand made and only one or sometimes just a few copies are available in the world. Typically, the Unique Items Shops do not carry inventory of staple type products. However, they can offer their clientele any product available in the Virtual Inventory through the use of web browsers. By participating in the PDMS, these shops can expand their product line without extra inventory while enjoying increased revenues and profitability.

One aspect of the invention relates to Product Returns Processing. In accordance with this aspect, the return of a product only takes a few minutes of the consumer's time. To initiate the return, all the consumer has to do is to follow three simple steps on a web browser, which include opening the original purchase order containing the item to be returned, selecting the item to be returned, and clicking on the return button. The computer immediately processes the request and, assuming the item is returnable, displays a page with a return authorization containing a return authorization number. If needed, the consumer has the option of printing the return authorization that preferably includes any applicable return instructions. Upon approval of the return, as evidenced by the return authorization number, the consumer simply drops the item to be returned, together with the return authorization number, at any convenient Order Aggregation Site. As an alternative, the consumer can elect to have the item picked-up by the Product Transport Support Service. Returns also benefit from aggregation and can be combined with order pickup and delivery. This feature reduces product returns to a very simple and cost-effective set of steps presented in Sections II.A.11 and IV.B.4.

One aspect of the invention relates to a Distributed Exhibition System. In accordance with this aspect, the Display Shops described earlier are coordinated to function as a virtual exhibition center. Unlike conventional exhibitions, this virtual center is not concentrated in one large hall. Instead, the Distributed Exhibition System is distributed through thousands of Display Shops from coast to coast, operating year around during commercial hours. This system offers unlimited product display flexibility with respect to time window and geographic location. It provides manufacturers, distributors, and wholesalers an efficient place to display and promote their products or unveil new product offerings. For example, through the Distributed Exhibition System a manufacturer can contract for display shop space from October through December in the metropolitan areas of New York, Boston, San Francisco, and Los Angeles, to run a pilot test on a new product offering before engaging in high volume production.

One aspect of the invention relates to Shipping and Receiving Through Order Aggregation Sites. In accordance with this aspect, the infrastructure provided by the PDMS is extended to facilitate shipping and receiving by commercial carriers. It takes advantage of the Order Aggregation Sites to provide an efficient shipping and receiving system. It eliminates the need for a consumer to be home to accept deliveries at random times. It offers the consumer the flexibility of online processing of parcels to be shipped while eliminating both the need to go to a common carrier facility and the associated inconvenience of the usual long wait in line. It provides for the aggregation of parcels received or shipped by consumers with regular orders and returns for the same consumer, at any Order Aggregation Site. This feature results in significant reductions of miles driven by both carriers and consumers. Further, it saves considerable time and offers all participants the benefits of a highly streamlined and efficient operation.

One aspect of the invention relates to an Order Aggregation Mall. In accordance with this aspect, a shopping mall integrates in a compact area, an Order Aggregation Site, Display Shops, Unique Items Shops, and numerous services frequently used by consumers. This mall enables consumers to obtain most goods and services at a convenient location, often within walking distance, with little or no need to drive for shopping. The consumer can take advantage of any trip to the Order Aggregation Mall for needed services to pickup aggregated orders, thus eliminating a separate drive associated with shopping. The retail part of the Order Aggregation Mall operates substantially under a Just-In-Time model where shops need not carry inventory. Instead of wasting high priced shelf space for storing products, merchants use the PDMS to coordinate the transport of products from regional distribution centers to the built-in Order Aggregation Site, Just-In-Time, for consumer pickup or delivery to the consumer by the Product Transport Support Service. This aspect is discussed in Section XIV of the Detailed Description of the Invention.

Deployment of business models based on the above concepts can encourage consumers to shop online and can produce numerous benefits. Among these benefits, the most important are significant reductions in product distribution costs and the time and effort consumers spend shopping.

One specific object of this invention is to provide a system and method for coordinating the operation of the Collaborative Inventory Sharing aspect. This system and method gives each participating merchant the opportunity to minimize inventory and costs while offering a broader selection of products and better service to consumers. This system and method also offers retailers the opportunity to broaden their customer base, negotiate better terms and prices for their product acquisitions, balance and reduce inventories, and eliminate unnecessary product transportation costs.

Another specific object of this invention is to provide a system and method for executing Order Aggregation by coordinating the shipment of orders, placed by a consumer with any number of retailers, to strategically located Order Aggregation Sites. Products can be allocated to a consumer order from the nearest inventory site or distribution center irrespective of the retailer that booked the order, and quickly made available at the Order Aggregation Site of the consumer's choice.

Another specific object of this invention is to provide a system and method for coordinating Consumer Predictive Purchasing. This system relies upon incentive discounts to encourage consumers to use Predictive Purchase Orders.

Another specific object of this invention is to provide a system and method for managing the operation of the Product Transport Support Service to transport products in accordance with optimized instructions, schedules, and itineraries.

Another specific object of this invention is to provide a system and method for coordinating the operation of Display shops.

Another specific object of this invention is to provide a system and method for coordinating the operation and use of the Uniform Consumer Preference Codes.

Another specific object of this invention is to provide a system and method for coordinating the operation and use of the Integrated Virtual Technical Support Centers.

Another specific object of this invention is to provide a system and method for coordinating the operation and use of Unique Items Shops.

Another specific object of this invention is to provide a system and method for conveniently and cost effectively processing product returns by utilizing, in reverse, the infrastructure described herein to support product distribution.

Another specific object of this invention is to provide a system and method for coordinating the operation and use of the Distributed Exhibition System.

Another specific object of this invention is to provide a system and method for coordinating the operation and use of Shipping and Receiving Through Order Aggregation Sites.

Another specific object of this invention is to provide a system and method for coordinating the operation and use of Order Aggregation Malls.

Another specific object of this invention is to provide a computing system infrastructure, configured for real-time operation, preferably including: a communications network with appropriate protocols; methods to uniquely identify each participant from the manufacturer to the consumer; methods to allow participants to enter and retrieve data; the capacity to store and archive data; the ability to interface with the existing computing systems used by manufacturers, distributors, and retailers; sufficient computing power to execute transactions without objectionable delays; fail-safe and secure operation; and algorithms for optimization of order management, product transportation, and other functions.

Another specific object of this invention is to provide a system and method that enables the entities participating in the product distribution chain to quickly respond to consumer orders, obtain accurate sales statistics in real-time, and accurately forecast sales and market trends.

All participants in the distribution chain, such as manufacturers, wholesalers, distributors, retailers, and consumers can derive benefits from this invention. Manufacturers can obtain accurate real-time data upon which to base production plans. Using a Just-In-Time business model, wholesalers, distributors, and retailers can operate efficiently, with reduced inventories, product costs, shipping costs, and shipping times. Retailers can ensure that no sales are lost due to lack of inventory and can better serve their customers with broader product selections. At the end of the distribution chain, consumers can shop comfortably from home, buy products at more competitive prices, receive their purchases more quickly, and have little or no need to drive for shopping.

The present invention takes advantage of recent advances in computer and Internet technology to provide the infrastructure necessary for electronic commerce to become one of the most significant factors in continuing the economic prosperity of the last decade.

Further aspects of this invention will become apparent in the Detailed Description and by reference to the attached drawings. The Detailed Description contains the following Sections:

I. Overview
   A. The Product Distribution Management System
   1. The Virtual Inventory Management System
   2. The Product Transport Support Service
   3. The Order Aggregation Site
   B. The Retailer
   C. The Consumer
   D. The Inventory Provider II. Description of the Functional Components
   A. The Virtual Inventory Management System
   1. Maintaining Real-Time Inventory Data
   2. Virtual Inventory Database Module
   3. Management of Product and Financial Transactions
   4. Preservation of Privacy
   5. Product Search Mechanism
   6. Order Aggregation
   7. Consumer Predictive Purchasing
   8. Uniform Consumer Preference Codes
   9. Integrated Technical Support Centers
   10. Distributed Exhibition system
   11. Product Returning
   12. Shipping and Receiving Through Order Aggregation Sites
   13. Architecture Scalability
   14. Communication Links
   B. The Product Transport Support Service
   C. The Order Aggregation Site
   D. The Order and Inventory Management System
   E. The Inventory Site
   F. The Storefront
   G. The Consumer
   H. The Inventory Provider III. Product Distribution Management System
   A. The Virtual Inventory Management System
   B. The Product Transport Support Service
   C. The Order Aggregation Site IV. Operation of the Product Distribution Management System
   A. The Product Distribution Management System Information Flow
   B. Operation of the Virtual Inventory Management System Software Modules
   1. Order Generation Module
   2. Order Processing Module
   3. Returns Generation Module
   4. Returns Processing Module
   5. Order Aggregation Module
   6. Pickup and Delivery Information Module
   7. Product Transport Module
   8. Customer Service Module
   9. Statistical Analysis Module
   10. Accounting and Billing Module
   11. Exception and Recovery Module
   C. Operation of the Product Transport Support Service
   D. Operation of the Order Aggregation Site
   E. Operation of the Order and Inventory Management System V. Example System Implementation VI. The Collaborative Inventory Sharing Process VII. The Order Aggregation Processes VIII. Consumer Predictive Purchasing
   A. Consumer Predictive Purchasing Process
   B. Consumption Cruise Control Process IX. The Display Shop X. Uniform Consumer Preference Codes XI. The Unique Items Shop XII. The Distributed Exhibition System XIII. Shipping and Receiving Through Order Aggregation Sites XIV. The Order Aggregation Mall XV. Conclusion

BRIEF DESCRIPTION OF THE DRAWINGS

FIGS. 22A-C illustrate preferred Order Aggregation processes.

FIGS. 25A-D are conceptual illustrations of an Order Aggregation Mall.

FIG. 26 illustrates two example web pages through which a consumer can define personal Uniform Consumer Preference Codes.

GLOSSARY OF ACRONYMS

| | |
|---|---|
| ABM | Accounting and Billing Module |
| PPD | Predictive Purchase Delay |
| API | Applications Programming Interface |
| CORBA | Common Object Request Broker Architecture |
| CSM | Customer Service Module |
| DBM | Database Module |
| DES | Distributed Exhibition System |
| ERM | Exception and Recovery Module |
| EDI | Electronic Data Interchange |
| EWT | Estimated Wait Time |
| HTTP | HyperText Transport Protocol |
| JIT | Just-In-Time |
| MAWT | Maximum Acceptable Wait Time |
| OIMS | Order and Inventory Management System |
| OAM | Order Aggregation Module |
| OAS | Order Aggregation Site |
| OGM | Order Generation Module |
| OPM | Order Processing Module |
| PDIM | Pickup and Delivery Information Module |
| PDMS | Product Distribution Management System |
| PTM | Product Transport Module |
| PTSS | Product Transport Support Service |
| RGM | Returns Generation Module |
| RPM | Returns Processing Module |
| SAM | Statistical Analysis Module |
| UCPC | Uniform Consumer Preference Codes |
| VIMS | Virtual Inventory Management System |
| XML | Extensible Markup Language |

DETAILED DESCRIPTION OF THE INVENTION

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

I. OVERVIEW

Figure 1:
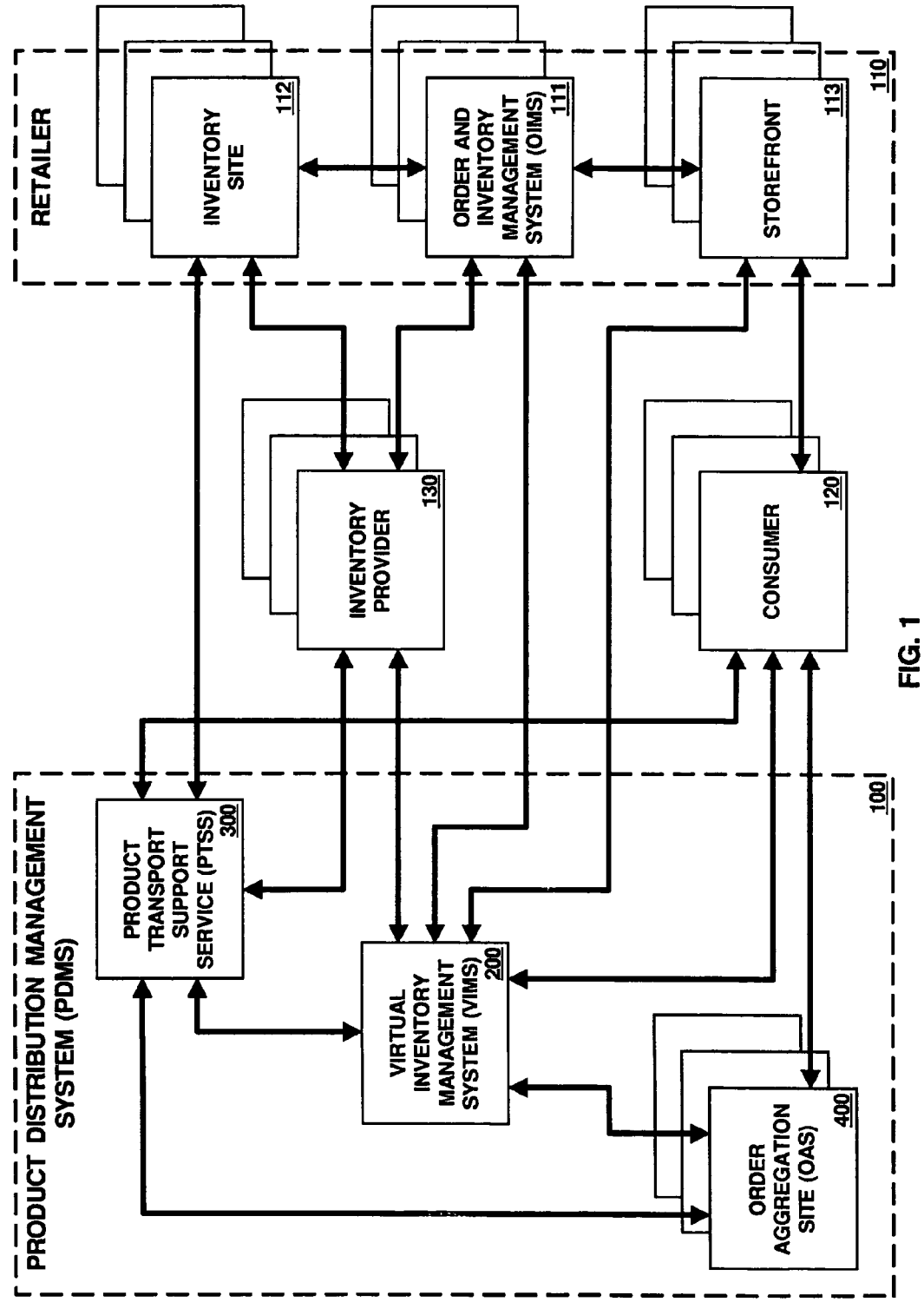
FIG. 1 illustrates a functional block diagram of a preferred embodiment of the Consumer Products Distribution System.

FIG. 1 shows, in block form, four components in accordance with one embodiment of the invention. The components include a Product Distribution Management System (PDMS) 100, a Retailer 110, a Consumer 120, and an Inventory Provider 130, each of which will be described in additional detail below.

For the purpose of this description, a merchant is any business entity that sells products. The sale of a product includes the transfer of legal title to a product and may also include the transfer of physical possession of the product. A retailer is a merchant that sells directly to the ultimate consumer. An inventory provider is a merchant that provides inventory to other merchants or to the ultimate consumer. Inventory includes physical stock and/or possession of goods or products. An inventory provider can be, for example, a retailer, a distributor, or a manufacturer. A retailer or merchant need not necessarily also be an inventory provider. For example, a web-based retailer may contract with a third party inventory provider to supply the products the retailer sells to consumers.

A. The Product Distribution Management System

The Product Distribution Management System (PDMS) 100 preferably includes three components. The first component is a Virtual Inventory Management System (VIMS) 200. The second component is a Product Transport Support Service (PTSS) 300. The third component, represented as a plurality, is an Order Aggregation Site (OAS) 400.

1. The Virtual Inventory Management System

The VIMS 200 is a business-to-consumer commerce platform that manages inventory data and coordinates the retail operations for a plurality of merchants, including inventory providers and retailers, that participate in the PDMS 100.

2. The Product Transport Support Service

The PTSS 300 is a carrier service to transport consumer products within a regional product distribution area.

3. The Order Aggregation Site

The OAS 400, represented as a plurality, is a physical site used for temporary storage and aggregation of consumer orders.

B. The Retailer

The second component is a Retailer 110, represented as a plurality, which preferably includes three components. The first component is an Order and Inventory Management System (OIMS) 111. The second component is an Inventory Site 112. The third component is a Storefront 113.

C. The Consumer

The third component is a Consumer 120, represented as a plurality. For the purposes of this description, a consumer can be any individual that purchases goods for personal consumption or use.

D. The Inventory Provider

The fourth component is an Inventory Provider 130, represented as a plurality. The Inventory Provider 130 preferably includes several components, intentionally not shown in FIG. 1, to preserve clarity. However, an Inventory Provider 130 can also include an Order and Inventory Management System (OIMS) 111, an Inventory Site 112, and a Storefront 113. For example, the computer manufacturer Dell Computer Corporation is an Inventory Provider that also is a Retailer that operates its own web storefront from which it sells directly to consumers.

II. DESCRIPTION OF THE FUNCTIONAL COMPONENTS

This Section describes the functional blocks represented in FIG. 1 in additional detail. In this Figure, the arrows indicate interactions between the functional blocks.

A. The Virtual Inventory Management System

The VIMS 200 is preferably a computerized system that provides the services to support the operation of the PDMS 100 and offers special features to enhance its performance. Various services and features provided by the VIMS are described in the Subsections below.

1. Maintaining Real-Time Inventory Data

Figure 2:
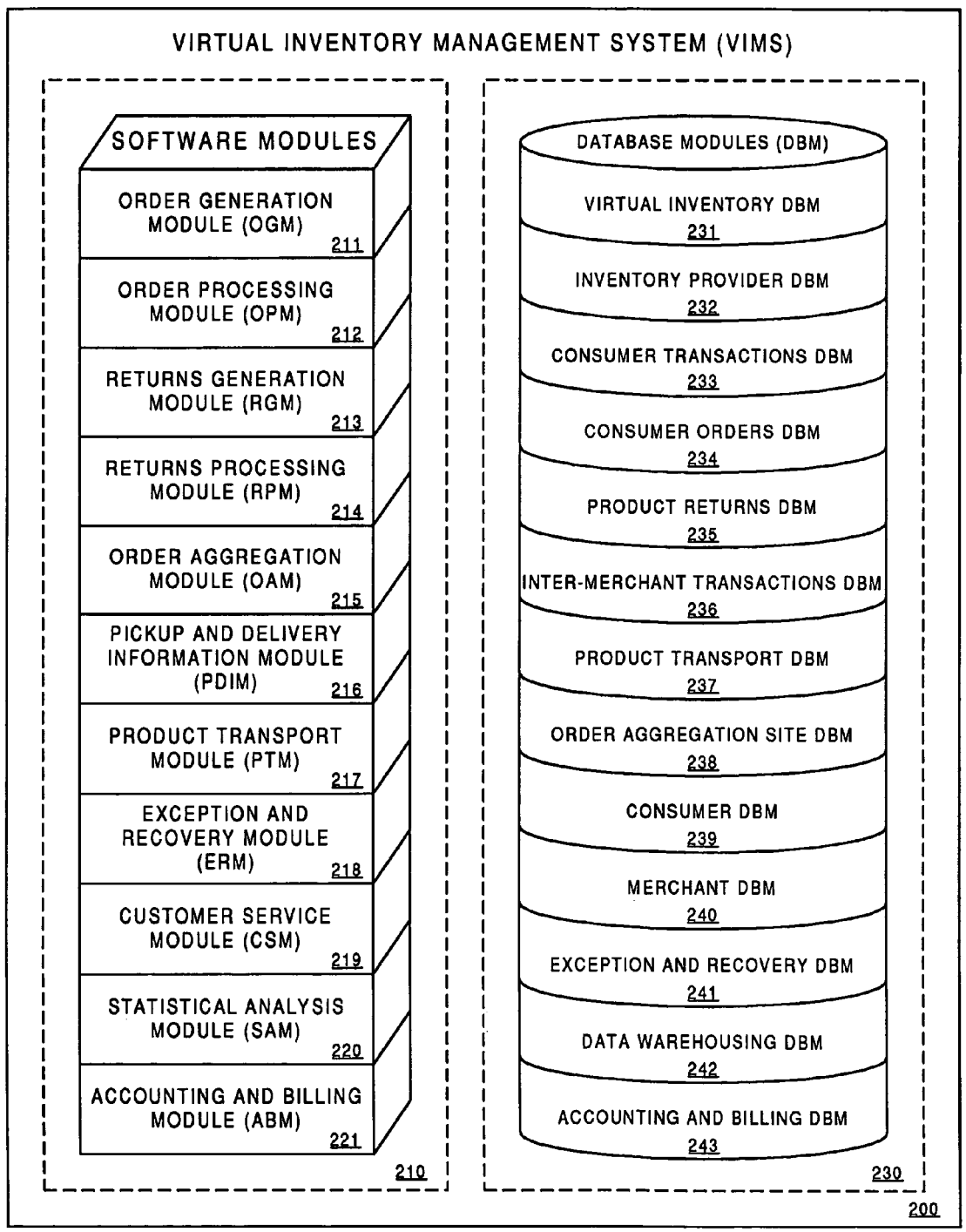
FIG. 2 illustrates a preferred configuration of the Virtual Inventory Management System.

The VIMS 200 preferably records and maintains, in real-time, inventory data collected from a plurality of Inventory Providers 130 that participate in Collaborative Inventory Sharing. The VIMS 200 collects from each participating Inventory Provider 130 the data representing the inventory to be made available by that Inventory Provider 130 to the merchants participating in the PDMS 100. This data is preferably stored in an Inventory Provider DBM 232 (FIG. 2) allocated to that Inventory Provider 130. From the collected inventory data, the VIMS 200 preferably computes and stores in a database, in real-time, the total of the inventory data supplied by each of the participating Inventory Providers 130. This total defines the Virtual Inventory and the corresponding database module is shown in FIG. 2 as the Virtual Inventory DBM 231. Preferably, each participating Inventory Provider 130 makes its entire inventory available to the Virtual Inventory. However, a participating Inventory Provider 130 can make only part of its inventory available to the Virtual Inventory. The virtual inventory database provides the foundation for the operation of Collaborative Inventory Sharing. This system allows each retailer to use the Virtual Inventory, as needed to conduct its business, and offers two fundamental advantages:

(1) Each retailer can operate with minimal physical inventory.
(2) The product line of each retailer is expanded to the large number of items listed in the Virtual Inventory DBM 231, thus including those items not normally stocked by the retailer.

To illustrate the inventory minimization advantage, consider a retailer that sells 1,000 bottles of a particular soft drink per week averaged over one year whereby sales fluctuate between 500 and 1,500 bottles per week. Consider further the following distinct business models: Model A, where the retailer does not participate in Collaborative Inventory Sharing; and Model B, where the retailer does participate in Collaborative Inventory Sharing. Under Business Model A, to ensure that no sales are lost due to lack of inventory, the store manager systematically replenishes inventory to 1,500 bottles at the start of each week. As a result, the inventory typically starts at 1,500 bottles at the beginning of the week and decreases to 500 bottles at the end of the week for an average of 1,000 bottles. Under Business Model B, the manager systematically orders 1,000 bottles per week, regardless of sales, resulting in an average inventory of 500 bottles. During those weeks where sales exceed the inventory available in the store, the deficiency is made up from the Virtual Inventory. Although both models support annual sales totaling 52,000 bottles, the average inventory in Model A is 1,000 bottles compared with only 500 bottles in Model B, a major savings in inventory cost and space.

To carry this illustration further, assume the retailer in Model B above is one of 7 retailers, numbered 1 through 7, participating in Collaborative Inventory Sharing. Each of these 7 retailers has weekly sales averaging 1,000 bottles and the economic order quantity for a reasonable price break is also 1,000 bottles. Assume further these 7 retailers stagger inventory purchases such that on Monday retailer number 1 receives 1,000 bottles, on Tuesday retailer number 2 receives 1,000 bottles, on Wednesday retailer number 3 receives 1,000 bottles, etc. Based on this arrangement, retailer number 1 opens for business on Monday with 1,000 bottles in inventory that are used to fill orders for the 7 participating retailers during business hours on Monday. Since the daily sales fluctuations tend to cancel each other, retailer number 1 finishes the Monday business day with nearly zero inventory and the average inventory for Monday drops to 500 bottles. For the remainder of the week, retailer number 1 operates at zero inventory and fills its orders from the Virtual Inventory contributed by the remaining 6 retailers. The same circumstances occur for retailer number 2 on Tuesday, retailer number 3 on Wednesday, etc. The result is that the average inventory for each retailer decreases to 500/7 (one day at 500 bottles and six days at 0 bottles) or 71 bottles, a reduction of 14 times when compared with business model A of the previous illustration. As shown by this illustration, Collaborative Inventory Sharing can approximate a Just-In-Time inventory model by averaging out statistical fluctuations experienced by individual retailers. In general, the larger the number of participating retailers the closer Collaborative Inventory Sharing approximates a Just-In-Time operating model.

An even more significant aspect of the inventory minimization advantage relates to the very inefficient use of expensive shelf space by conventional retailers. Typically, retailers pay a premium for desirable retail space. The more desirable the location in terms of consumer traffic and revenue opportunities the higher the premium. At the same time, retailers waste this valuable space by using it for warehousing their inventory in store shelves. The impact is the significant price markup that retailers need to charge consumers to recover the costs of inefficient inventory storage. Such inefficient use of expensive shelf space can be eliminated by the deployment of the business models proposed in this invention. In accordance with these models, Retailers 110 get the products they offer from regional distribution centers preferably operated by Inventory Providers 130, where storage costs are much lower. As products are sold, they can be delivered Just-In-Time directly to selected Order Aggregation Sites 400, for subsequent pickup by or delivery to the consumers that purchased the products. This process eliminates the storage inefficiency currently experienced by most Retailers 110. The transport of products from distribution centers to Order Aggregation Sites 400 is executed cost effectively and efficiently by the Product Transport Support Service (PTSS) 300, further described below.

In accordance with the model presented above, Retailers 110 practically eliminate most products from their store shelves and use the same space more efficiently for specialty items and product displays. Section XIV describes an Order Aggregation Mall that includes an OAS 400, Unique Items Shops, and Display Shops that provide a further illustration of the above aspects. New retailers can easily adopt the model proposed herein. Existing retailers on the other hand, can also adopt the same model by following a transitional conversion process. Using the PDMS 100 infrastructure, an existing retailer can start by eliminating a small selection of staple type products from the store inventory to free some space for order aggregation. As Order Aggregation activities expand, additional staple type products can be progressively eliminated to make room for the increased Order Aggregation volume and for product display areas. At the end of the conversion process the retailer can operate efficiently with an OAS 400, a display section, a unique items section, and computer terminals for accessing the VIMS 200 to make purchases and browse around the store on the web.

To illustrate the product line expansion advantage, consider the case of a small, well-established, old-time specialty neighborhood retailer that offers moderately expensive, premium quality produce to a loyal, affluent clientele. The retail store started out as a fruit stand that abutted an orchard. The orchard, owned by the store proprietor, supplied most of the produce carried by the store. Eventually, the storeowner sold the orchard, which was subsequently replaced with high-priced townhouses. At that time, the storeowner kept the original store—considered a landmark in the area, purchased a much larger orchard located about 50 miles away, and continued to supply premium produce to the store's valued clientele. As had always been the case, the small size of the store continued to restrict the variety of products it could carry, to the frustration of those customers who expected a broader selection.

Consider now the following distinct business models: Model A, where the retailer does not participate in Collaborative Inventory Sharing; and Model B, where the retailer does participate in Collaborative Inventory Sharing. Under Business Model A, sales will indefinitely remain restricted by the small size of the store. Under Business Model B, the retailer's product line will expand to include every item listed in the virtual inventory database; and without expanding floor space by a single square inch, the retailer's business can expand significantly. Furthermore, the store's renowned produce will be made available to a huge number of new clients through many of the retailers participating in the PDMS 100.

2. Virtual Inventory Database Module

The VIMS 200 is preferably configured to manage and maintain, in real-time, the Virtual Inventory DBM 231; respond to database queries; compute consumption statistics; generate consumption forecasts based on historical records; archive consumption data; manage access to consumption and other data; etc.

3. Management of Product and Financial Transactions

The VIMS 200 preferably manages product and financial transactions between Retailers 110 and Inventory Providers 130 arising out of Collaborative Inventory Sharing and order Fulfillment-Substitution. Fulfillment-Substitution is the substitution of an item intended to be provided by a given Inventory Provider 130 by a like item provided by a different Inventory Provider 130. Fulfillment-Substitution will be discussed in further detail in Section IV.B.2, with reference to step 708 of the flowchart shown in FIG. 7B.

4. Preservation of Privacy

The VIMS 200 preferably preserves the privacy of the inventory data supplied by each Inventory Provider 130. To preserve privacy, the access by each Inventory Provider 130 to inventory data can be limited to the Virtual Inventory DBM 231 and to the Inventory Provider DBM 232 of that Inventory Provider 130. Likewise, the access by each Retailer 110 that does not carry inventory can be limited to the Virtual Inventory DBM 231. However, the VIMS 200 can let each Inventory Provider 130 control the access privileges that are offered to third parties with respect to his Inventory Provider DBM 232. Those Inventory Providers 130 and Retailers 110 that do not yet have an in-house computerized inventory system can use the VIMS 200 as a state-of-the-art, cost-effective solution. The VIMS 200 can also be an excellent alternative for replacing aging or outdated computerized inventory systems.

5. Product Search Mechanism

Through use of the virtual inventory database, the VIMS 200 can provide the most efficient product search mechanism available. The Virtual Inventory DBM 231 is preferably structured as a relational database with fields for Uniform Product Code, category, type, description, designation, brand, etc. In particular, this database associates each product with the Inventory Providers 130 holding inventory on that product. With this configuration, the search for a specific product becomes straightforward and extremely efficient. In addition, the Virtual Inventory DBM 231 can be supplemented by entries of products offered by nonparticipating inventory providers. For a small fee, such nonparticipating inventory providers can list their products in this database. With this supplementary information, the Virtual Inventory DBM 231 can become the broadest product selection catalog ever created.

This technology offers the consumer the opportunity to locate a specific product anywhere in the country within seconds. In addition, store locations, operating hours, pricing, availability, and other pertinent information, can also be obtained at the same time.

6. Order Aggregation

The VIMS 200 preferably manages the Order Aggregation process whereby products ordered by a consumer from one or more Retailers 110 are aggregated at an OAS 400 for pickup or delivery. For products shipped from outside the region, the VIMS 200 can facilitate the use of an OAS 400 to receive such shipments. At the OAS 400, orders shipped from outside the region can be aggregated with any pending order for the same Consumer 120 for subsequent pickup by, or delivery to, that Consumer 120. The VIMS 200 can also coordinate the shipment of parcels to be sent by consumers and the receipt of parcels addressed to consumers by facilitating the use of an OAS 400 to send or receive such parcels. The pickup and delivery of such parcels can be executed in conjunction with the pickup and delivery of any pending aggregated orders or returns for that consumer thus saving the consumer considerable time and additional trips to a carrier service. Further, commercial carriers that participate in the PDMS 100 can limit their consumer deliveries to the local Order Aggregation Sites instead of a much larger number of random locations each day. With this operating model, carrier service productivity can experience a significant increase.

To illustrate the Order Aggregation aspect, assume that on Monday evening a consumer buys a book online and has it shipped to a selected OAS 400. On Wednesday, while at work, the consumer hears about a drugstore promotion and immediately orders several products online from that store. On Thursday, the consumer receives a message indicating that the book has arrived at the selected OAS 400. The same day, the consumer shops for groceries online and schedules a pickup for Friday at 5:25 PM. On Friday, at 4:30 PM, the purchases made by the consumer from the drugstore and the grocer are transported to the selected OAS 400 and at 5:10 PM all orders are aggregated and readied for pickup. On the way home from work, the consumer pulls into one of the loading pads of the selected OAS 400 at 5:18 PM, seven minutes ahead of schedule, picks up the items ordered in a matter of minutes, and resumes the drive home.

7. Consumer Predictive Purchasing

The VIMS 200 preferably manages and coordinates the operation of specialized application programs that support Consumer Predictive Purchasing. One of these programs helps consumers predict and plan their household consumption. Another computes incentive price discounts. Using the infrastructure provided by the PDMS 100, consumers can obtain significant price discounts on Predictive Purchase orders scheduled for delivery at some future time determined by the consumer's prediction. The consumer ordering data can be collected and processed by the PDMS 100 in real-time to generate consumption reports that are available to the affected participants in the product distribution path, from the manufacturers that produce the products to the retailers that receive the purchase orders. This information gives the manufacturers the opportunity to generate accurate production forecasts and manufacturing schedules and provides the necessary infrastructure for the entire product distribution chain to approach a Just-In-Time operating model.

8. Uniform Consumer Preference Codes

The VIMS 200 preferably manages and coordinates the operation of Uniform Consumer Preference Codes (UCPC) that enable consumers to purchase discrete products online. For each registered user, the VIMS 200 preferably maintains a record of that user's UCPC. When a user whishes to purchase a discrete product, the UCPC defined by that user can be automatically displayed to facilitate selection and order placement.

9. Integrated Technical Support Centers

The VIMS 200 preferably manages and coordinates the operation of the Integrated Virtual Technical Support Centers. When a registered user logs-on to the VIMS 200, the system can provide a web page with a click button that links the user to the Customer Service Module (CSM) 219. This module's web page can be configured for the user to schedule a session with a customer service representative. This feature can eliminate the inconvenience and waste of time experienced otherwise by consumers while waiting on the phone.

10. Distributed Exhibition System

The VIMS 200 preferably manages and coordinates the operation of the Distributed Exhibition System (DES). In particular, the VIMS 200 can maintain in the Merchant DBM 240 complete records of Display Shops participating in the PDMS 100. These records can include space availability, areas of expertise, pricing, etc. Using the Display Shop data, the DES can also provide a nationwide exhibition exchange service that gives Display Shops and merchants the opportunity to negotiate their transactions.

11. Product Returning

The VIMS 200 provides efficient and cost-effective coordination for processing product returns by utilizing, in reverse, the same infrastructure that supports product distribution. For both orders and returns, the VIMS 200 can offer consumers the opportunity to select an OAS 400 to pick up aggregated orders or deliver items to be returned. As an alternative, the VIMS 200 can offer the consumer the choice of having aggregated orders delivered to, or items to be returned picked-up from, a consumer specified address.

12. Shipping and Receiving Through Order Aggregation Sites

The VIMS 200 preferably manages and coordinates the operation of Shipping and Receiving Through Order Aggregation Sites. The VIMS 200 can facilitate the interface with commercial carriers to process shipping and receiving of parcels at Order Aggregation Sites and aggregate parcels with orders and returns associated with the same consumer.

13. Architecture Scalability

In a preferred embodiment of this invention, the architecture of the VIMS 200 is scalable through a component-based API which allows programmatic access to low level data structures and functions. This feature allows flexible customization of the VIMS 200 to meet specific business requirements through the use of specialized application programs. Examples of such specialized application programs are:

(1) A program that coordinates the use of an OAS 400 for shipping and receiving parcels as a convenience to consumers.

(2) A program that optimizes the use of the trucks associated with the PTSS 300 by optimizing schedules and itineraries subject to system constraints.

(3) A program that computes minimum acceptable inventory levels for the most efficient operation of Inventory Sites.

(4) A program that helps consumers predict and plan household consumption to enable them to take advantage of the incentive discounts associated with Consumer Predictive Purchasing.

(5) A program that manages and coordinates the operation of Integrated Virtual Technical Support Centers.

14. Communication Links

The VIMS 200 preferably communicates with the following:

(1) Each OIMS 111 to exchange inventory status data or negotiate inventory transactions.

(2) Each OAS 400 to provide Order Aggregation instructions and schedules and receive reports.

(3) The Consumer 120 to provide or receive information and respond to inquires.

(4) The PTSS 300 to provide transport instructions, schedules, and itineraries and receive reports.

(5) Each Storefront 113 for the generation of orders and returns.

(6) Each Inventory Provider 130 to reserve products on a consumer's shopping list; exchange inventory status data or negotiate inventory transactions; supply custom reports; and respond to queries regarding consumption statistics and forecasts, inventory status, and real-time data on consumer orders.

Further details of the operation of the VIMS 200 are presented in Section III.A.

B. The Product Transport Support Service

The Product Transport Support Service (PTSS) 300 is preferably a carrier service with appropriate resources to transport products, as needed, to support the operation of the PDMS 100. Examples of product transports that can be executed by the PTSS 300 are:

(1) From a regional distribution center to the Inventory Site 112 of a Retailer 110 or to an OAS 400.

(2) From an Inventory Site 112 to an OAS 400.

(3) From an OAS 400 to an address designated by a Consumer 120, or from any address designated by a Consumer 120 to any OAS 400.

Preferably, the PTSS 300 transports are executed in accordance with instructions, schedules, and itineraries provided by the Product Transport Module (PTM) 217.

The PTSS 300 preferably communicates with the following:

(1) The VIMS 200 to receive transport instructions and schedules and send status reports.

(2) Any Inventory Provider 130 to confirm the impending pickup or delivery of products.

(3) Each Inventory Site 112 to confirm the impending pickup or delivery of products.

(4) Any OAS 400 to provide notification of impending transports.

(5) Any Consumer 120 to provide notification of an impending pickup or delivery.

Further details of the operation of the PTSS 300 are presented in Section III.B.

C. The Order Aggregation Site

Figure 4:
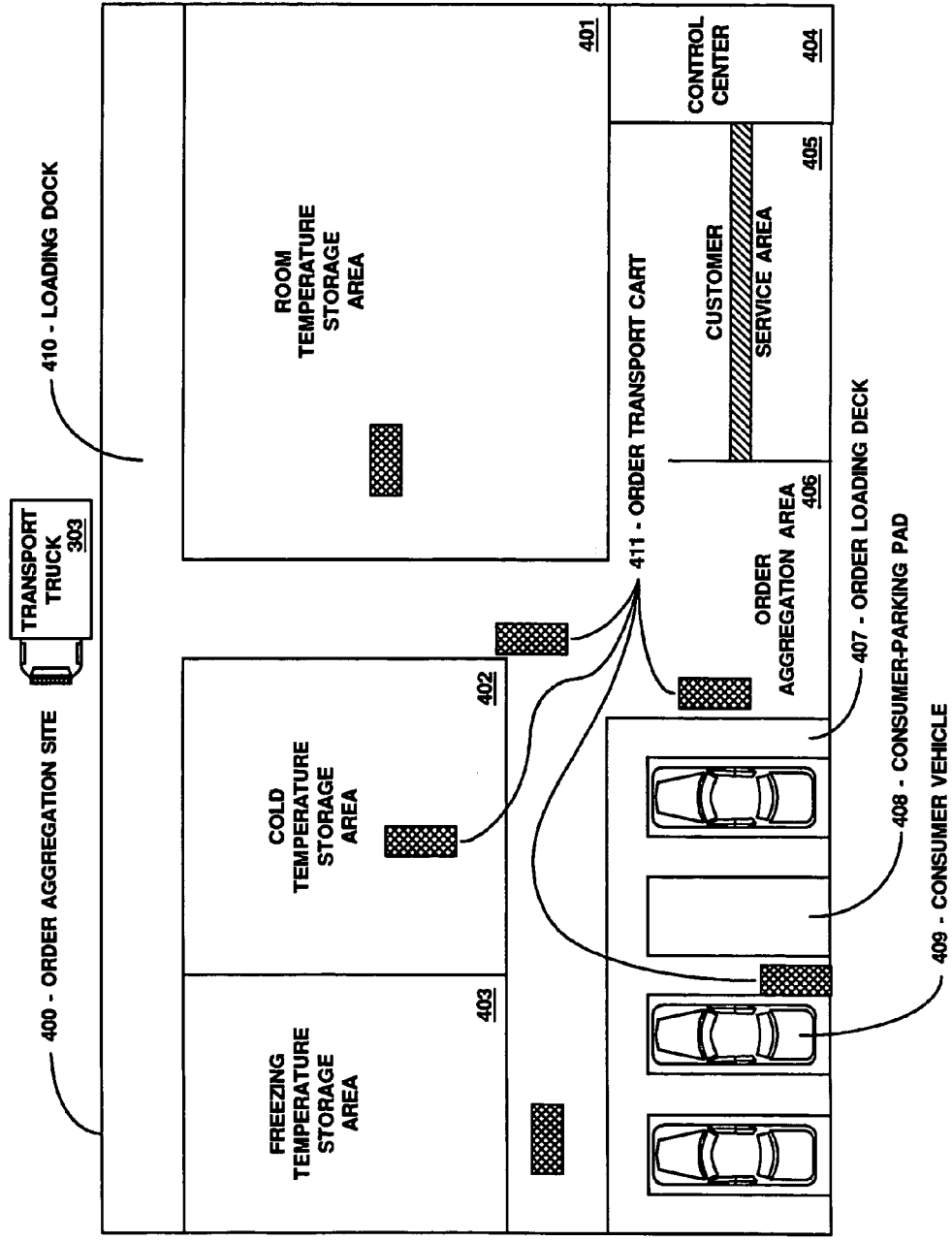
FIG. 4 is a conceptual illustration of an Order Aggregation Site.

Each OAS 400 is preferably a physical site configured with temporary storage for consumer products and where the orders placed by a Consumer 120 with a plurality of Retailers 110 can be aggregated for either pickup by, or delivery to, that Consumer 120. Preferably, each OAS 400 is equipped with appropriate frozen, cold, and room temperature storage facilities. A conceptual illustration of an OAS 400 is shown in FIG. 4 and described in Section III.C. An OAS 400 can be an independent establishment or can operate within one of the existing commercial establishments such as Safeway, Mail Boxes Etc, 7-Eleven Food Store, etc.

As noted previously, the OAS 400 can also be used as a convenient location from which parcels can be shipped by consumers or where parcels can be received on the behalf of consumers. Such parcels can be combined with aggregated orders or returns for pickup and delivery, as appropriate. The OAS can also offer packaging materials and services for the convenience of the consumer. Further, the OAS can provide facilities for recycling packaging materials, thus reducing costs and contributing to the preservation of the environment.

The OAS 400 can also offer three dimensional body measurement equipment to be used for web based retail of clothing and footwear. Using this equipment, consumers can have their three dimensional body measurements stored in the VIMS 200 database and subsequently use this information to get proper fits for clothing and footwear purchased online.

In other embodiments, an OAS 400 can operate within a specially designed neighborhood mall, called an Order Aggregation Mall, planned to include Display Shops, Unique Item Shops, and services that require the physical presence of the consumer. With this configuration, the consumer can obtain the desired services and pickup aggregated orders, all in a single trip.

Each OAS 400 preferably communicates with the following:

(1) The VIMS 200 to receive Order Aggregation instructions and schedules and provide notification of the arrival of orders received from outside the region.

(2) The PTSS 300 to send and receive products and verify schedules.

(3) The Consumer 120 to service order pickups, receive updates of expected consumer arrival times, or update delivery schedules.

D. The Order and Inventory Management System

Each OIMS 111 is a typical computerized system used to perform order processing and store and maintain inventory data. Examples of such systems include products offered by EXE Technologies of Dallas, Tex.; ACCPAC International, Inc., of Pleasanton, Calif.; and AccountMate Software Corp. of Novato, Calif. These systems are well understood by those skilled in the art and will not be further described.

Each OIMS 111 preferably communicates with the following:

(1) The VIMS 200 to check Virtual Inventory status or negotiate inventory transfers.

(2) The Inventory Site 112 to reserve products on a consumer's shopping list, fill consumer orders, or add products to the Virtual Inventory.

(3) Each of its Storefronts 113 to respond to inquiries.

(4) Any Inventory Provider 130 to respond to inquiries or negotiate and schedule product shipments.

E. The Inventory Site

For the purpose of this description, an Inventory Site 112 is a logical entity representing a physical area, such as store shelves and warehousing space, where a Retailer 110 or an Inventory provider 130 keeps products in inventory. Although most conventional retailers have an Inventory Site 112, a Retailer 110 need not have an Inventory Site 112 to conduct its business. For example, a Retailer can operate a web Storefront 113 from which it books orders from Consumers 120 for products supplied by third party Inventory Providers 130 that ship the orders directly to the Consumers 120.

Each Inventory Site 112 can communicate with the following:

(1) The respective OIMS 111 to obtain instructions to fill consumer orders and to verify inventory quantities.

(2) The PTSS 300 to confirm readiness of orders scheduled for transport.

(3) Any Inventory Provider 130 for the matters related to product deliveries.

F. The Storefront

For the purpose of this description, a Storefront 113 is a logical entity representing the resources used by a Retailer 130 to interact with Consumers 120. A Storefront 113 can be a web storefront; a conventional storefront; a telephone, fax, or email order storefront; or any other resource used to conduct business with Consumers 120.

Each Storefront 113 can communicate with the following:
(1) The respective OIMS 111 to check on pricing or product availability at the respective Inventory Site 112.
(2) The VIMS 200 to generate orders or returns.
(3) A Consumer 120 to book orders or returns and to respond to inquiries.

G. The Consumer

Each Consumer 120 can interact with the following:
(1) Any Storefront 113 for inquires, placing orders, returning products, scheduling deliveries, etc.
(2) The VIMS 200 to place orders, request returns, inquire about orders and returns, etc.
(3) The PTSS 300 for verifying residential deliveries or pickups, and obtaining time updates on pending deliveries or pickups.
(4) Any OAS 400 to obtain the status of an order intended for pickup, reschedule the date and time of a pickup or return, update a pickup or return time, or reschedule the delivery of any order intended for delivery or the pickup of any return scheduled for pickup.

H. The Inventory Provider

Each Inventory Provider 130 can communicate with the following:
(1) The VIMS 200 to fill consumer orders from its Inventory Site 112 or to obtain consumption statistics and forecasts, Virtual Inventory status, and real-time data on consumer orders.
(2) The OIMS 111 of a Retailer 110 to negotiate product supplies, optimize product distribution, minimize total inventory, and reduce distribution cost and time.
(3) Each Inventory Site 112 to which it supplies products for the matters related to product deliveries.
(4) The PTSS 300 for deliveries or pickups, and time updates for pending deliveries or pickups.

III. PRODUCT DISTRIBUTION MANAGEMENT SYSTEM

Figure 3:
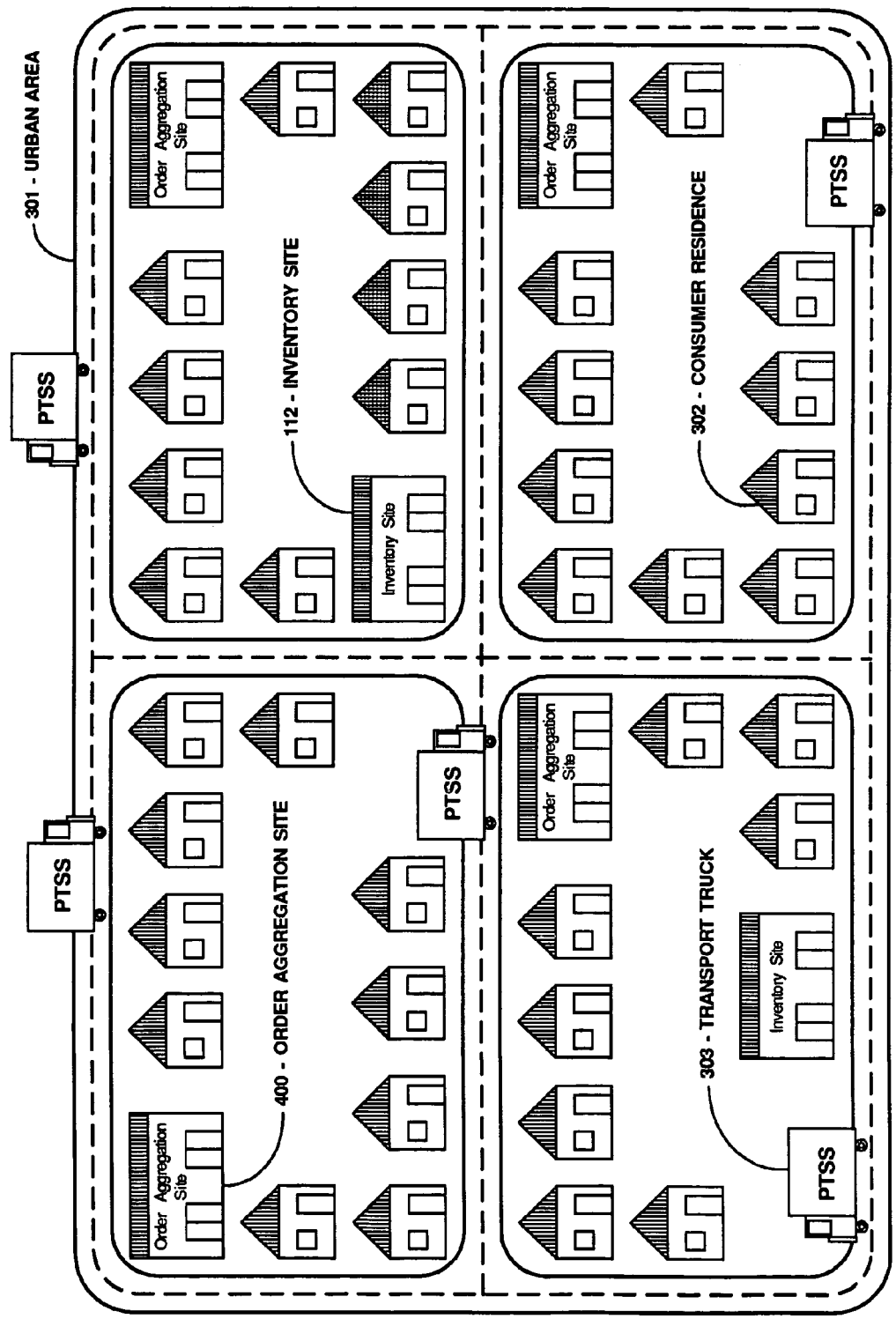
FIG. 3 is a conceptual illustration of the Product Transport Support Service.

FIGS. 2, 3, and 4 illustrate the three components of a preferred embodiment of the PDMS 100.

A. The Virtual Inventory Management System

FIG. 2 shows, in block form, the various components used in the description of the Virtual Inventory Management System (VIMS) 200 including of a set of Software Modules 210 and a set of Database Modules (DBM) 230.

The Software Modules 210 include the following:
(1) Order Generation Module (OGM) 211.
(2) Order Processing Module (OPM) 212.
(3) Returns Generation Module (RGM) 213.
(4) Returns Processing Module (RPM) 214.
(5) Order Aggregation Module (OAM) 215.
(6) Pickup and Delivery Information Module (PDIM) 216.
(7) Product Transport Module (PTM) 217.
(8) Exception and Recovery Module (ERM) 218.
(9) Customer Service Module (CSM) 219.
(10) Statistical Analysis Module (SAM) 220.
(11) Accounting and Billing Module (ABM) 221.

The OGM 211 preferably interacts with the Storefront 113 to provide product information, generate purchase orders, and enter purchase orders in the Consumer Orders DBM 234. These functions can be performed in accordance with the process discussed with reference to the flowchart of FIGS. 6A-D.

The OPM 212 preferably performs fulfillment allocations and substitutions and enters ordering information in the Virtual Inventory DBM 231 and in the Inventory Provider DBM 232. It preferably also executes any applicable inter-merchant transactions and enters such transactions in the Inter-Merchant Transactions DBM 236. These functions can be performed in accordance with the processes described with reference to the flowcharts of FIGS. 7A-B.

The RGM 213 preferably interacts with the Storefront 113 to provide product return, order cancellation, and return cancellation information; generate return, cancellation, and return cancellation authorizations; and enter returns, cancellations, and return cancellations in the Product Returns DBM 235. These functions can be performed in accordance with the processes discussed with reference to the flowcharts of FIGS. 8A-E.

The RPM 214 preferably performs return and order cancellation allocations; enters return and order cancellation information in the Virtual Inventory DBM 231 and in the Inventory Provider DBM 232; executes any applicable inter-merchant transactions; and enters such transactions in the Inter-Merchant Transactions DBM 236. These functions can be performed in accordance with the processes described with reference to the flowcharts of FIGS. 9A-B.

The OAM 215 preferably coordinates the operation of the Pickup and Delivery Information Module 216 and the Product Transport Module 217. It manages the operation of the Order Aggregation Sites 400 and the Product Transport Support Service 300. It preferably interacts with the Order and Inventory Management Systems (OIMS) 111 of participating Retailers 110 to coordinate order and return execution. It makes appropriate entries in the Consumer Orders DBM 234 and the Product Returns DBM 235. These functions can be performed in accordance with the processes discussed with reference to the flowcharts of FIGS. 10A-E.

The PDIM 216 preferably provides a user interface for the entry of pickup and delivery information in the Consumer Orders DBM 234 and Product Returns DBM 235. These functions can be performed in accordance with the process described with reference to the flowchart of FIGS. 11A-B.

The PTM 217 preferably generates and optimizes transport instructions, schedules, and itineraries and makes the appropriate entries in the Product Transport DBM 237. These functions can be performed in accordance with the process described with reference to the flowchart of FIG. 12.

The ERM 218 preferably manages the exceptions to the normal operation of the VIMS 200 including those related to unpredictable events such as accidents or failures that may affect or disrupt the normal operation of the Product Distribution Management System (PDMS) 100. These functions can be performed in accordance with the processes described with reference to the flowcharts of FIGS. 16A-C.

The CSM 219 preferably handles the customer service activities normally associated with product distribution. These activities can be organized in accordance with the diagram of FIG. 13A and performed in accordance with the process described with reference to the flowchart of FIG. 13B.

The SAM 220 preferably performs statistical analysis on the data stored in the Database Modules 230 as needed for optimizing the operation of the (PDMS) 100 and for the benefit of Retailers 110, Consumers 120, and Inventory Providers 130. Statistical analysis can be organized in accordance with the diagram of FIG. 14.

The ABM 221 preferably performs accounting and billing to reflect and settle transactions among the entities participating in the PDMS 100 and records the accounting and billing transactions in the Accounting and Billing DBM 243. Examples of such transactions are consumer orders, inter-merchant product transfers, OAS 400 services, PTSS 300 services, Display Shop services, etc. Accounting and billing can be organized in accordance with the diagram of FIG. 15.

The Database Modules (DBM) 230 preferably include the following:

(1) Virtual Inventory DBM 231, which preferably represents the total of the inventory data supplied by each the participating Inventory Providers 130.

(2) Inventory Provider DBM 232. An Inventory Provider DBM 232 is preferably allocated to each Inventory Provider 130 to reflect the inventory data supplied by that Inventory Provider 130.

(3) Consumer Transactions DBM 233, which preferably maintains data related to communications with consumers.

(4) Consumer Orders DBM 234, which preferably maintains data related to consumer orders.

(5) Product Returns DBM 235, which preferably maintains data related to consumer returns and order cancellations.

(6) Inter-Merchant Transactions DBM 236, which preferably maintains data related to the transactions between merchants resulting from fulfillment allocations and substitutions.

(7) Product Transport DBM 237, which preferably maintains data related to the transport of products by the PTSS 300 in accordance with the needs of the Product Distribution Management System 100.

(8) Order Aggregation Site DBM 238. An Order Aggregation Site DBM 238 is preferably allocated to each OAS 400 to reflect data related to the operation of that Order Aggregation Site 400.

(9) Consumer DBM 239. A Consumer DBM 239 is preferably allocated to each Consumer to maintain data related that Consumer.

(10) Merchant DBM 240. A Merchant DBM 240 is preferably allocated to each Merchant to maintain data related to that merchant.

(11) Exception and Recovery DBM 241, which preferably maintains data related to exception reports and the actions taken to recover from the exceptions noted in such reports.

(12) Data Warehousing DBM 242, which preferably maintains data related to consumer purchases, pricing, statistical analysis reports, etc.

(13) Accounting and Billing DBM 243, which preferably maintains accounting and billing data, related to the services offered by the VIMS 200.

It will be apparent to one skilled in the art that the various database modules can be embodied in one or several databases.

B. The Product Transport Support Service

FIG. 3 shows a conceptual illustration of the area of operation of a Product Transport Support Service (PTSS) 300. It depicts an urban area 301, consumer residences 302, Inventory Sites 112, Order Aggregation Sites (OAS) 400, and transport trucks 303 preferably operated by the PTSS 300. The PTSS 300 can execute product transports in accordance with instructions, schedules, and itineraries generated by the Product Transport Module 217. Examples of such transports include carrying products from Inventory Sites 112 to OAS's 400, carrying consumer orders scheduled for delivery from OAS's 400 to consumer residences 302, carrying returns from consumer residences 302 to OAS's 400, and carrying returns from OAS's 400 to Inventory Sites 112.

C. The Order Aggregation Site

FIG. 4 shows a conceptual illustration of a typical OAS 400. It preferably includes a room temperature storage area 401, a cold temperature storage area 402, a freezing temperature storage area 403, a control center 404, a customer service area 405, an Order Aggregation area 406, an order loading deck 407, consumer parking pads 408, a truck loading dock 410, and order transport carts 411 to move products and orders within the OAS 400 facilities. The control center 404 can house the computer systems used by the OAS 400 to communicate with the software modules of the VIMS 200. The consumer parking pads 408 are preferably used by consumer vehicles 409 to park while loading orders or unloading returns. The loading dock 410 can be used by the transport trucks 303 for loading and unloading operations. Typically, the operation of an OAS 400 involves physical functions and administrative functions.

Examples of physical functions performed in an OAS 400 include receiving and storing products arriving from Inventory Sites 112, aggregating orders for the intended Consumers 120 in accordance with instructions provided by the Order Aggregation Module 215, and servicing the pickup of an order or the delivery of a return by the respective Consumer 120.

Examples of administrative functions performed in an OAS 400 include making appropriate entries in the Consumer Orders DBM 234 upon completion of each order aggregation, notifying the Order Aggregation Module 215 upon receipt of an out-of-the-region order missing pickup and delivery information, and sending an exception notice and accompanying exception status report to the Exception and Recovery Module 218 upon occurrence of an error condition.

IV. OPERATION OF THE PRODUCT DISTRIBUTION MANAGEMENT SYSTEM

A. The Product Distribution Management System Information-Flow

Figure 5:
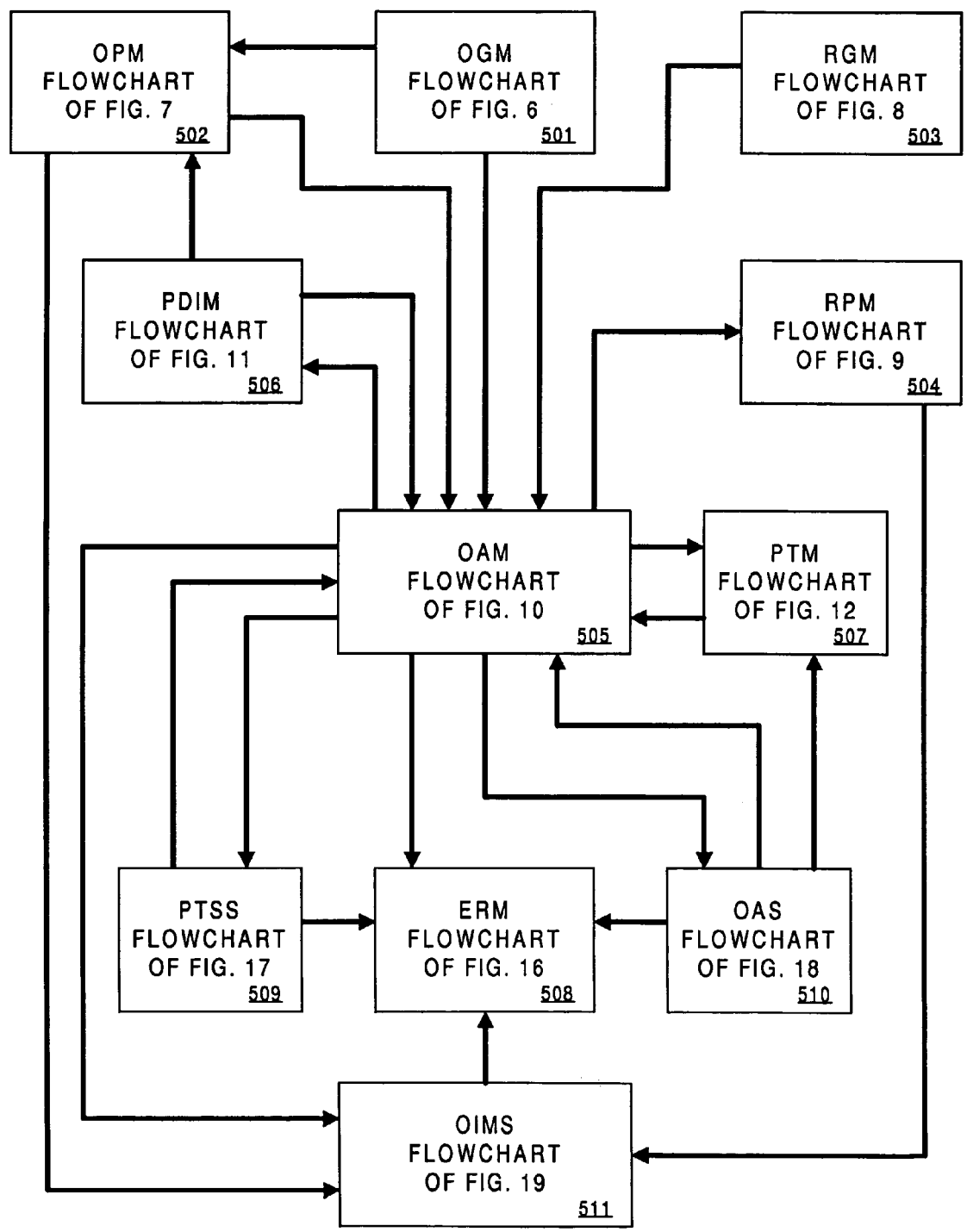
FIG. 5 is a summary flowchart illustrating a preferred configuration of the Product Distribution Management System.

FIG. 5 is a summary flowchart outlining the general information flow between the processes illustrated by the flowcharts of FIGS. 6 through 12 and 16 through 19 in a preferred configuration of the PDMS 100. It shows information flowing from the OGM FLOWCHART OF FIG. 6 (501) to the OPM FLOWCHART OF FIG. 7 (502) and to the OAM FLOWCHART OF FIG. 10 (505); from the OPM FLOWCHART OF FIG. 7 (502) to the OAM FLOWCHART OF FIG. 10 (505) and to the OIMS FLOWCHART OF FIG. 19 (511); from the RGM FLOWCHART OF FIG. 8 (503) to the OAM FLOWCHART OF FIG. 10 (505); from the RPM FLOWCHART OF FIG. 9 (504) to the OIMS FLOWCHART OF FIG. 19 (511); from the OAM FLOWCHART OF FIG. 10 (505) to the RPM FLOWCHART OF FIG. 9 (504), to the PDIM FLOWCHART OF FIG. 11 (506), to the PTM FLOWCHART OF FIG. 12 (507), to the ERM FLOWCHART OF FIG. 16 (508), to the PTSS FLOWCHART OF FIG. 17 (509), to the OAS FLOWCHART OF FIG. 18 (510), and to the OIMS FLOWCHART OF FIG. 19 (511); from the PDIM FLOWCHART OF FIG. 11 (506) to the OPM FLOWCHART OF FIG. 7 (502) and to the OAM FLOWCHART OF FIG. 10 (505); from the PTM FLOWCHART OF FIG. 12 (507) to the OAM FLOWCHART OF FIG. 10 (505); from the PTSS FLOWCHART OF FIG. 17 (509) to the OAM FLOWCHART OF FIG. 10 (505) and to the ERM FLOWCHART OF FIG. 16 (508); from the OAS FLOWCHART OF FIG. 18 (510) to the OAM FLOWCHART OF FIG. 10 (505), to the PTM FLOWCHART OF FIG. 12 (507), and to the ERM FLOWCHART OF FIG. 16 (508); and from the OIMS FLOWCHART OF FIG. 19 (511) to the ERM FLOWCHART OF FIG. 16 (508).

B. Operation of the Virtual Inventory Management System Software Modules

1. Order Generation Module

Figure 6A:
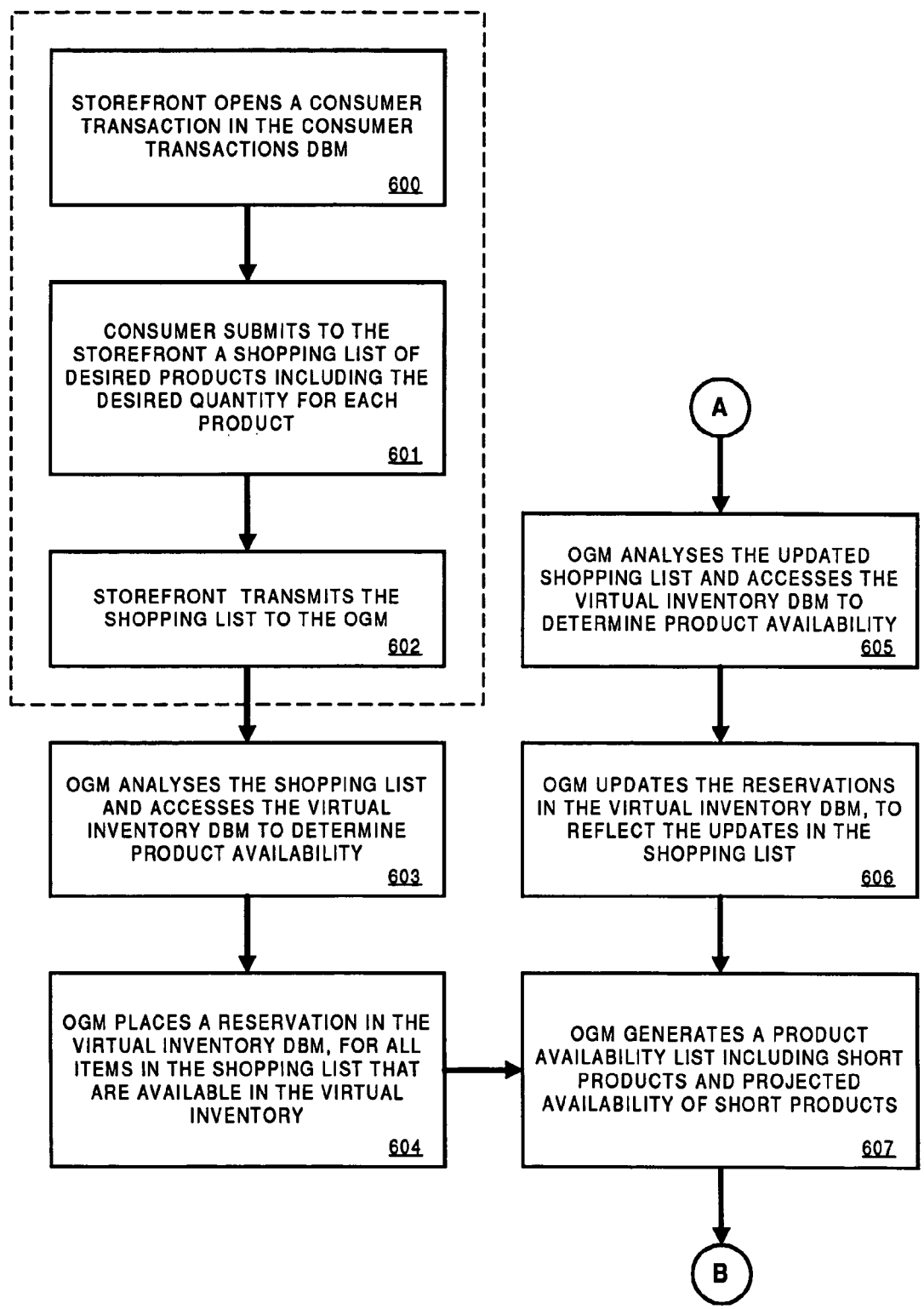
FIGS. 6A-D illustrate a process preferably performed by the Order Generation Module.
Figure 6B:
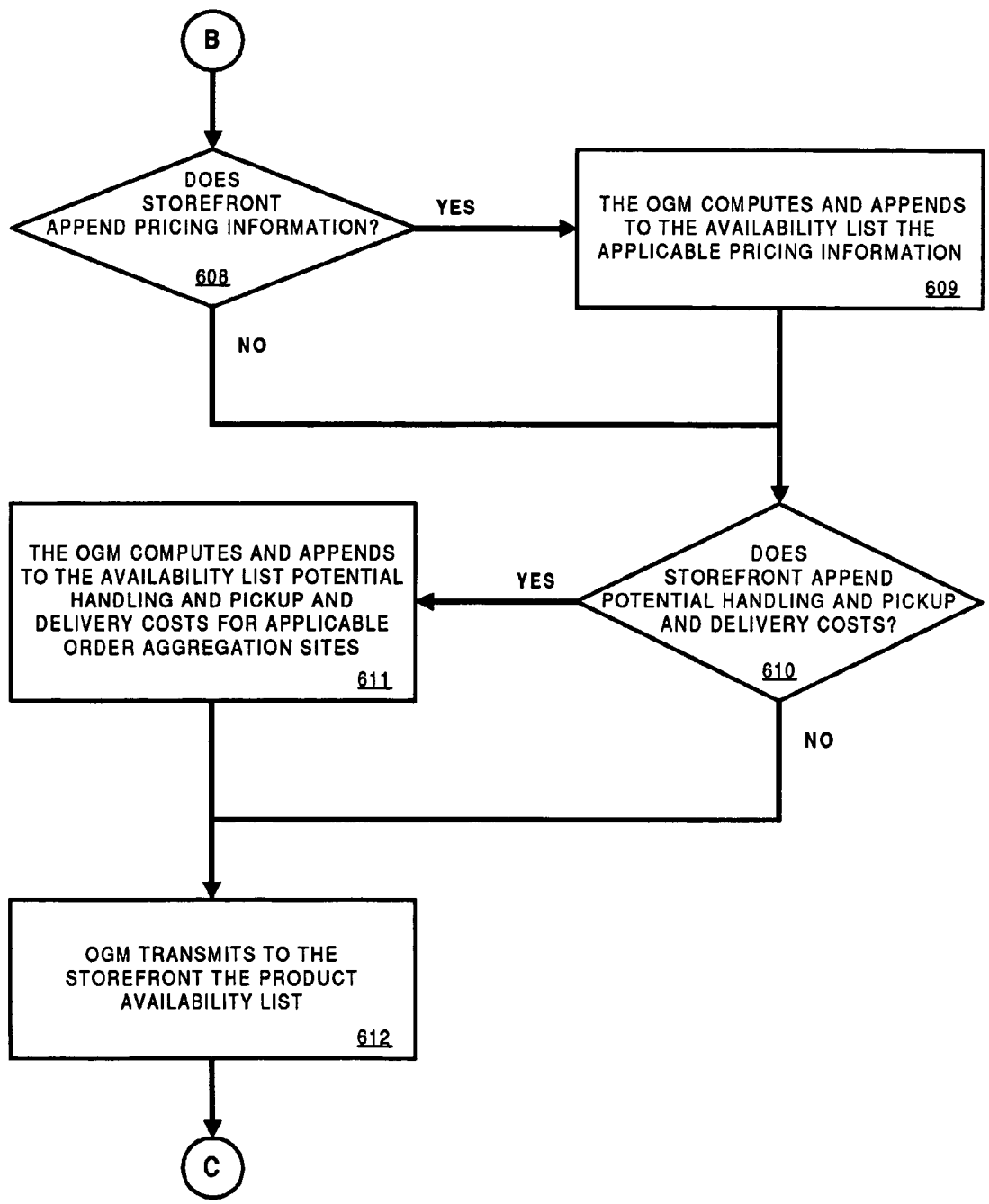
Figure 6C:
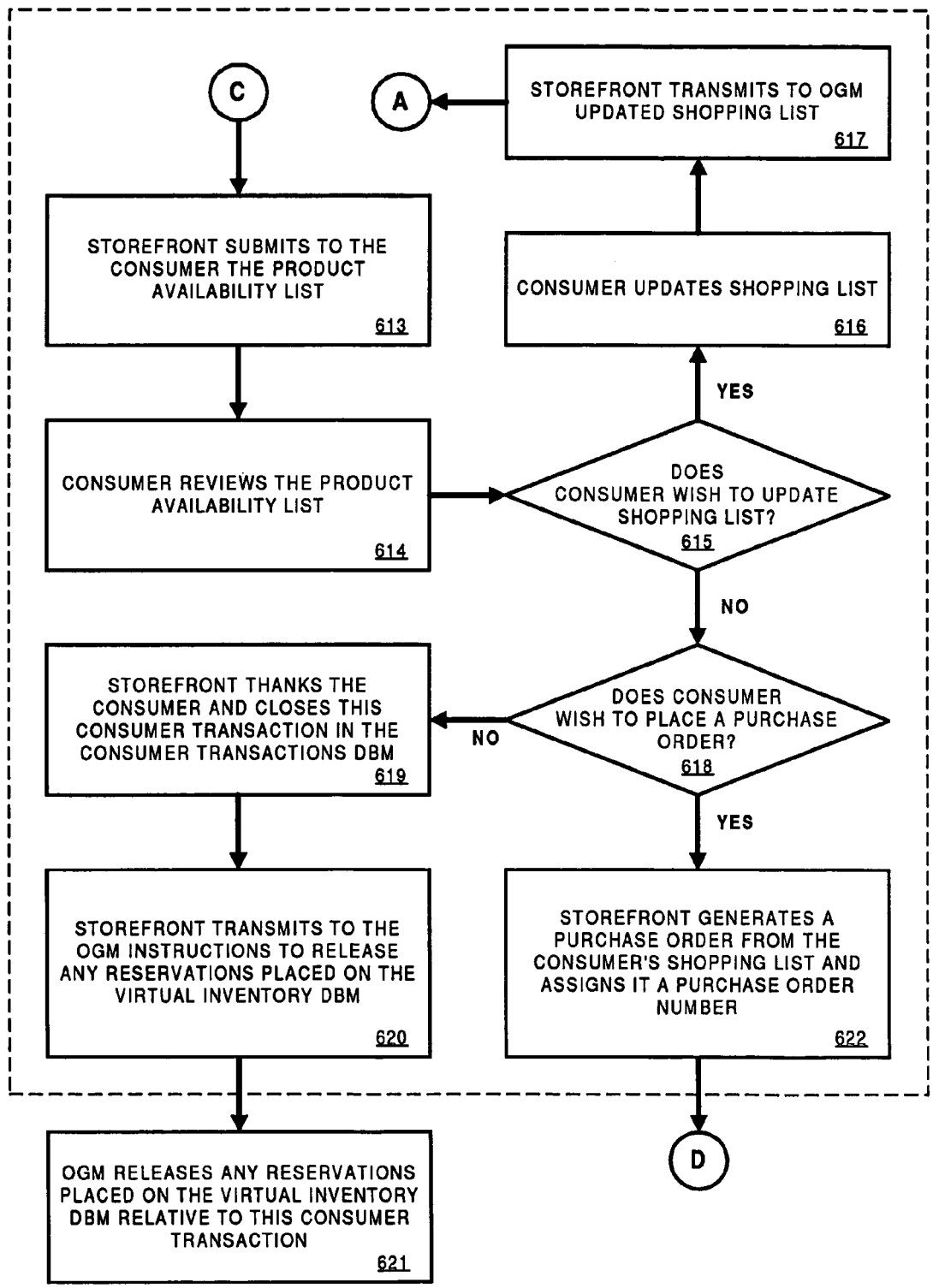
Figure 6D:
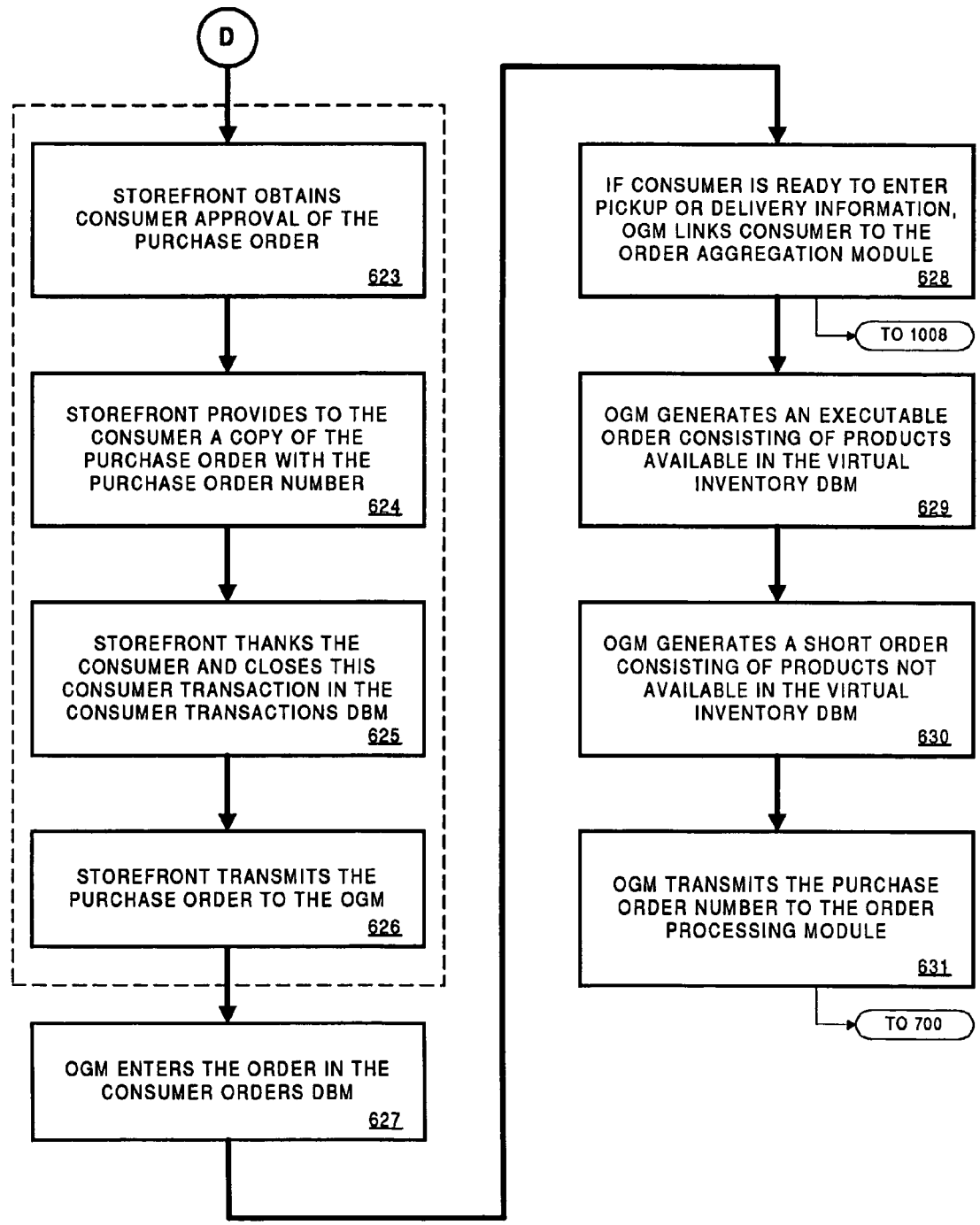

FIGS. 6A-D illustrate a process by which the Order Generation Module (OGM) 211 can be configured to generate consumer orders. Steps 600-602, 613-620, 622, and 623-626 occur at the Storefront 113 and serve as an interface with the Consumer 120 while steps 603-612, 621, and 627-631 occur within the OGM 211. Steps occurring at the Storefront 113, in FIGS. 6A, 6C, and 6D, are enclosed in dashed rectangles to distinguish them from the steps occurring in the OGM 211.

At step 600, the Storefront 113 opens a consumer transaction in the Consumer Transactions DBM 233. At step 601, the Consumer 120 submits to the Storefront 113 a shopping list of desired products including the desired quantity for each product. At step 602, the Storefront 113 transmits the shopping list to the OGM 211.

At step 603, the OGM 211 analyzes the shopping list and accesses the Virtual Inventory DBM 231 to determine product availability. At step 604, the OGM 211 places a reservation in the Virtual Inventory DBM 231 for the items in the shopping list that are available in the Virtual Inventory DBM 231.

At step 607, the OGM 211 generates a product availability list including short products (those products not available in the Virtual Inventory DBM 231) and projected availability of short products. At step 608, the OGM 211 analyzes the policies of the Storefront 113 to determine whether or not the Storefront 113 appends pricing information to the availability list. If step 608 is affirmative, at step 609 the OGM 211 computes and appends to the availability list the applicable pricing information and then the process continues with step 610. If step 608 is not affirmative, the process proceeds directly to step 610 where the OGM 211 analyzes the policies of the Storefront 113 to determine whether or not the Storefront 113 appends potential handling, pickup, and delivery costs to the availability list. If step 610 is affirmative, at step 611, the OGM 211 computes and appends to the availability list potential handling, pickup, and delivery costs for the applicable Order Aggregation Sites 400. The process then continues with step 612. If step 610 is not affirmative, the process proceeds directly to step 612 where the OGM 211 transmits to the Storefront 113 the product availability list.

At step 613, the Storefront 113 submits to the Consumer 120 the product availability list. At step 614, the Consumer 120 reviews the product availability list. At step 615, the Consumer 120 decides whether or not to update the shopping list. If step 615 is affirmative, the process loops back by following steps 616, 617, 605, and 606, to reach step 607 described above. At step 616, the Consumer 120 updates the shopping list. At step 617, the Storefront 113 transmits the updated shopping list to the OGM 211. At step 605, the OGM 211 analyzes the updated shopping list and accesses the Virtual Inventory DBM 231 to determine product availability. At step 606, the OGM 211 updates the reservations in the Virtual Inventory DBM 231, to reflect the updates in the shopping list.

If step 615 is not affirmative, the process continues with step 618 where the Consumer 120 decides whether or not to place a purchase order. If step 618 is not affirmative, the process continues with steps 619-621. At step 619, the Storefront 113 thanks the Consumer 120 and closes the consumer transaction in the Consumer Transactions DBM 233. At step 620, the Storefront 113 transmits to the OGM 211 instructions to release any reservations placed on the Virtual Inventory DBM 231 relative to the consumer transaction closed at step 619. At step 621, the OGM 211 releases any reservations placed on the Virtual Inventory DBM 231 relative to the consumer transaction closed at step 619, thus completing the order generation process for the case where the Consumer 120 decides not to place a purchase order.

If step 618 is affirmative, the process continues with steps 622-631. At step 622, the Storefront 113 generates a purchase order from the consumer's shopping list and assigns it a purchase order number. At step 623, the Storefront 113 obtains from the Consumer 120 approval of the purchase order. At step 624, the Storefront 113 provides to the Consumer 120 a confirmation of the purchase order with the purchase order number. Such confirmation can be an electronic or hard copy of the purchase order, or any other form of confirmation appropriate for the way in which the transaction is executed. At step 625, the Storefront 113 thanks the Consumer 120 and closes the consumer transaction in the Consumer Transactions DBM 233. At step 626, the Storefront 113 transmits the purchase order to the OGM 211.

At step 627, the OGM 211 enters the purchase order in the Consumer Orders DBM 234. At step 628, if the consumer is ready to enter pickup or delivery information, the OGM 211 links the Consumer 120 to the OAM 215. At step 629, the OGM 211 generates an executable order consisting of products available in the Virtual Inventory DBM 231. At step 630, the OGM 211 generates a short order consisting of products not available in the Virtual Inventory DBM 231. At step 631, the OGM 211 transmits the purchase order number to the Order Processing Module 212, thus completing the order generation process for the case where Consumer 120 decides to place a purchase order.

2. Order Processing Module

Figure 7A:
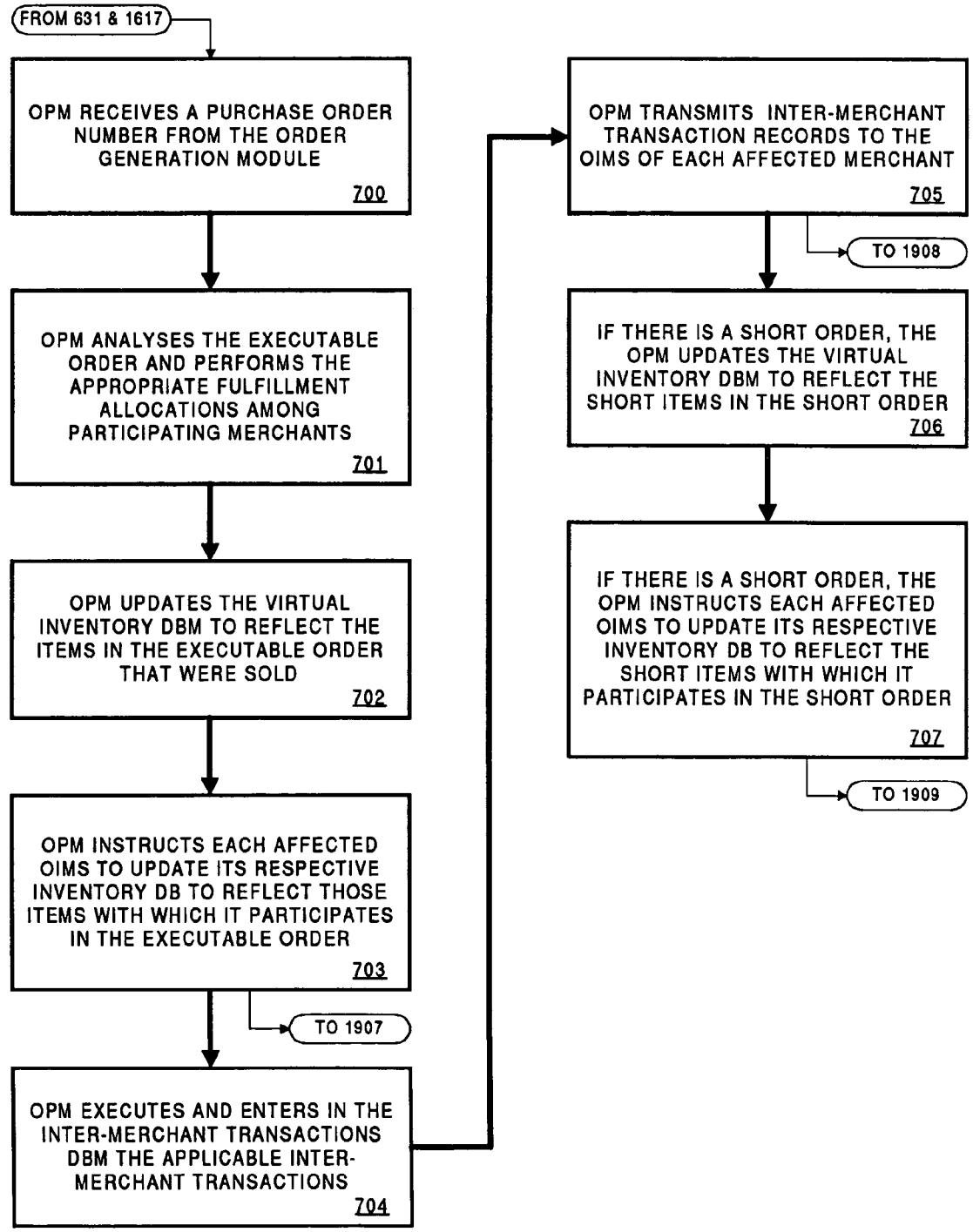
FIGS. 7A-B illustrate processes preferably performed by the Order Processing Module.
Figure 7B:
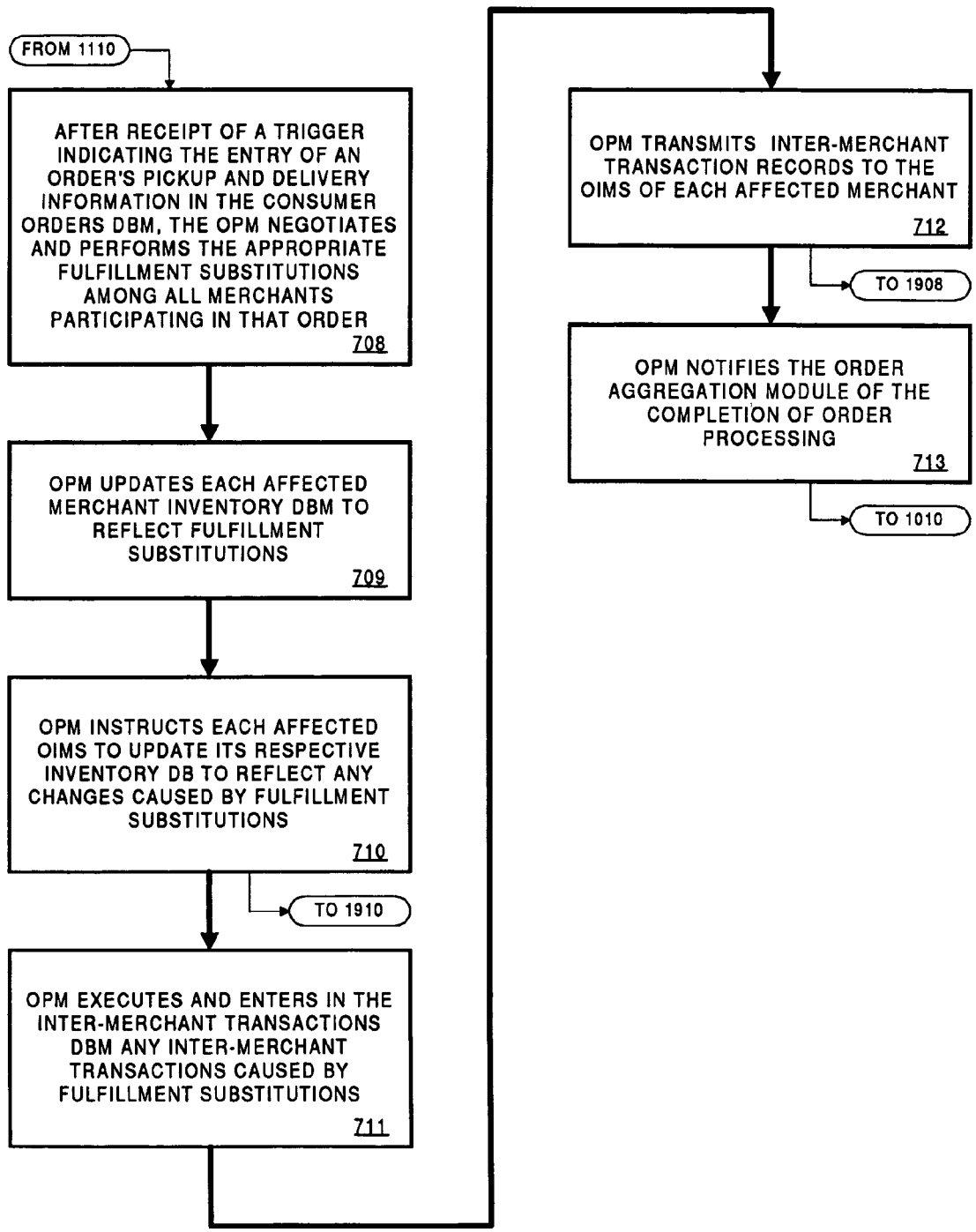
Figure 8A:
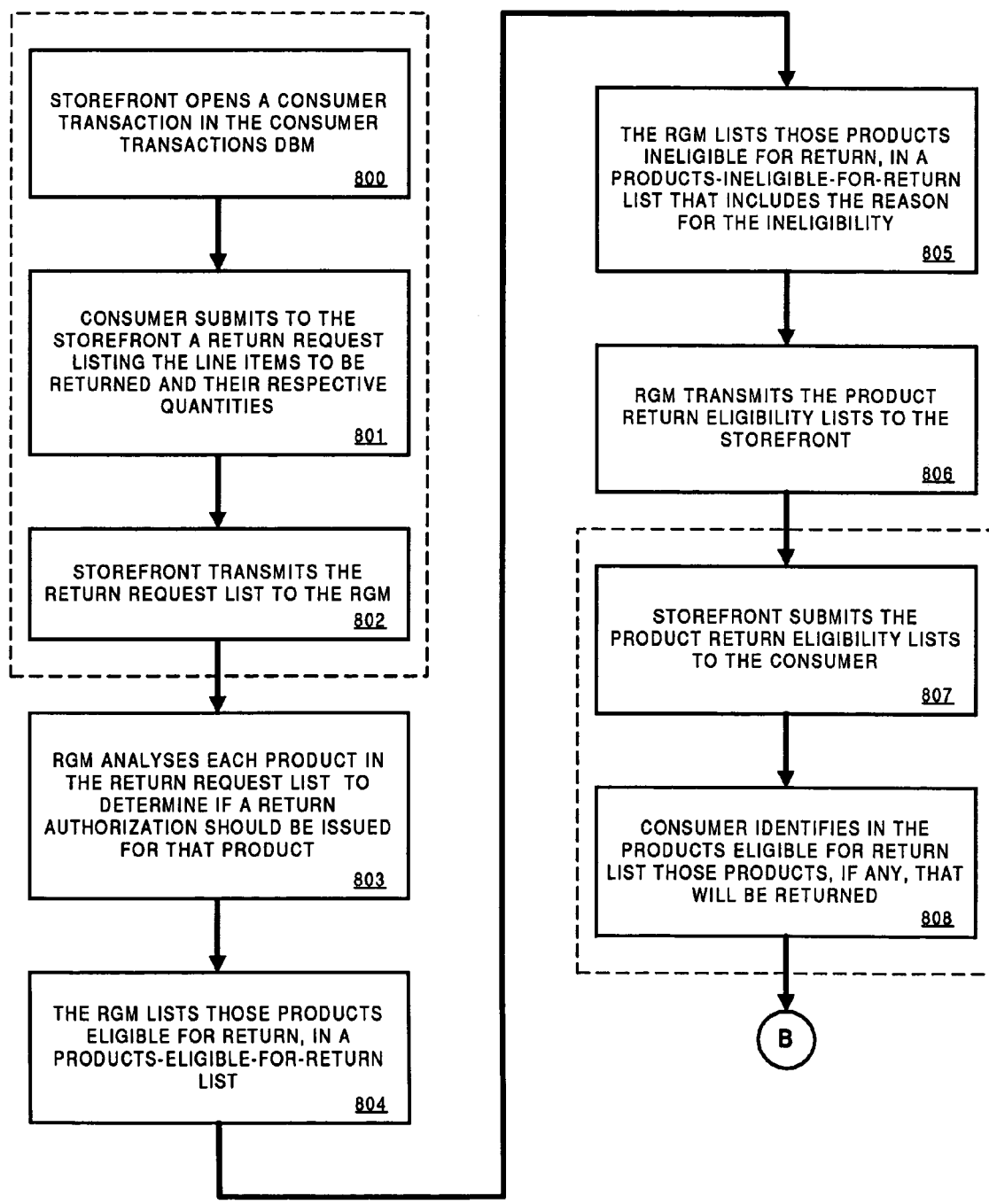
FIGS. 8A-E illustrate processes preferably performed by the Returns Generation Module.
Figure 8B:
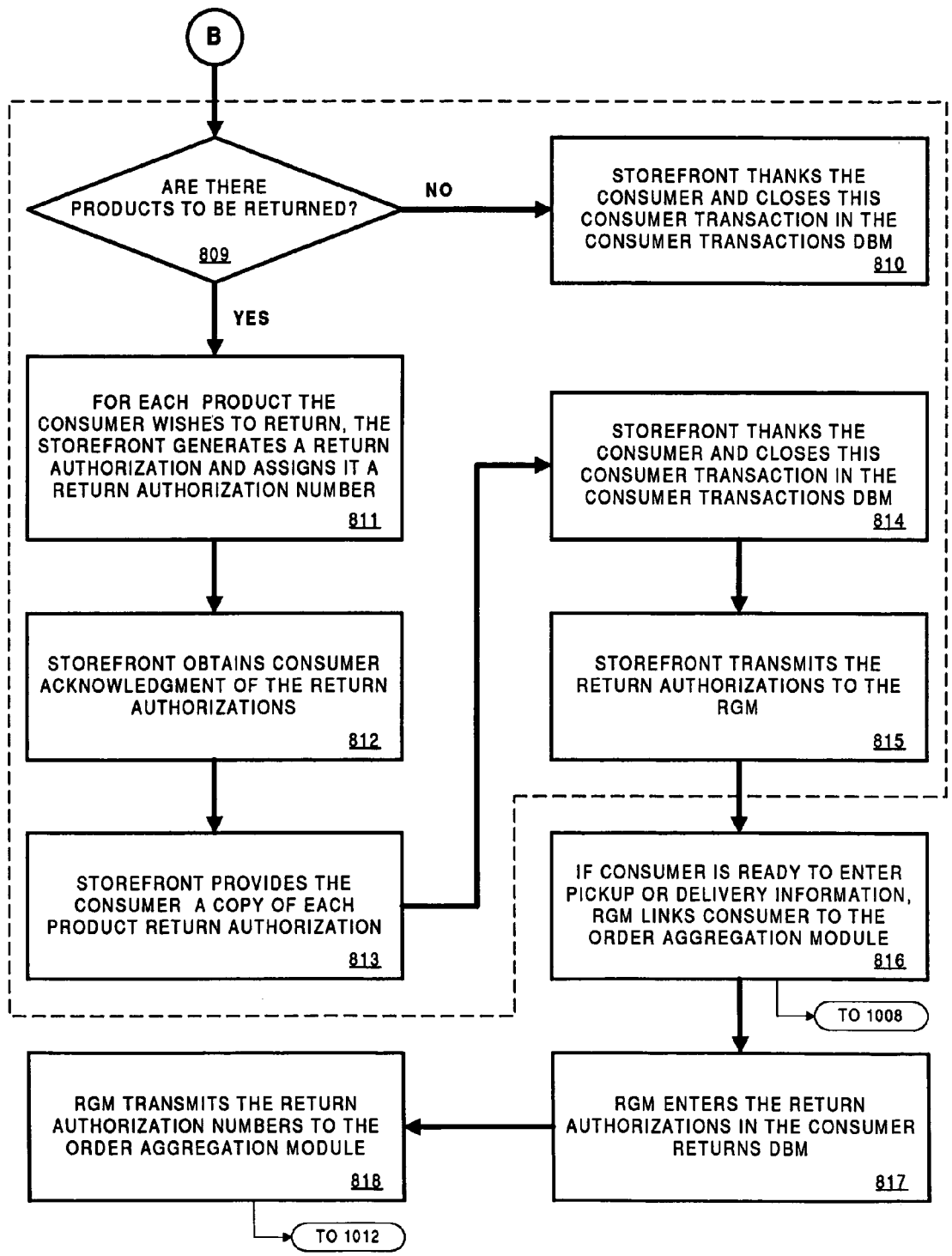
Figure 8C:
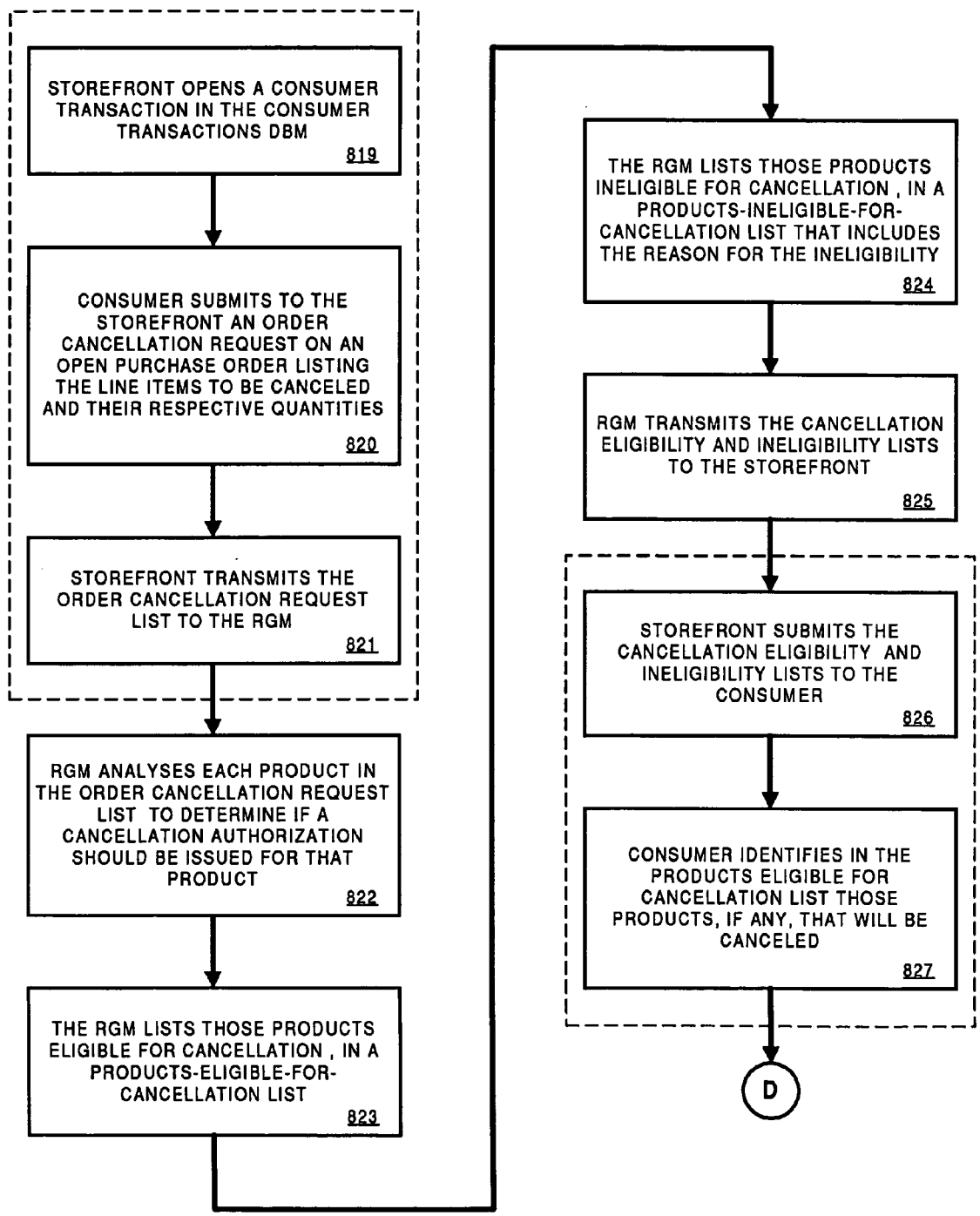
Figure 8D:
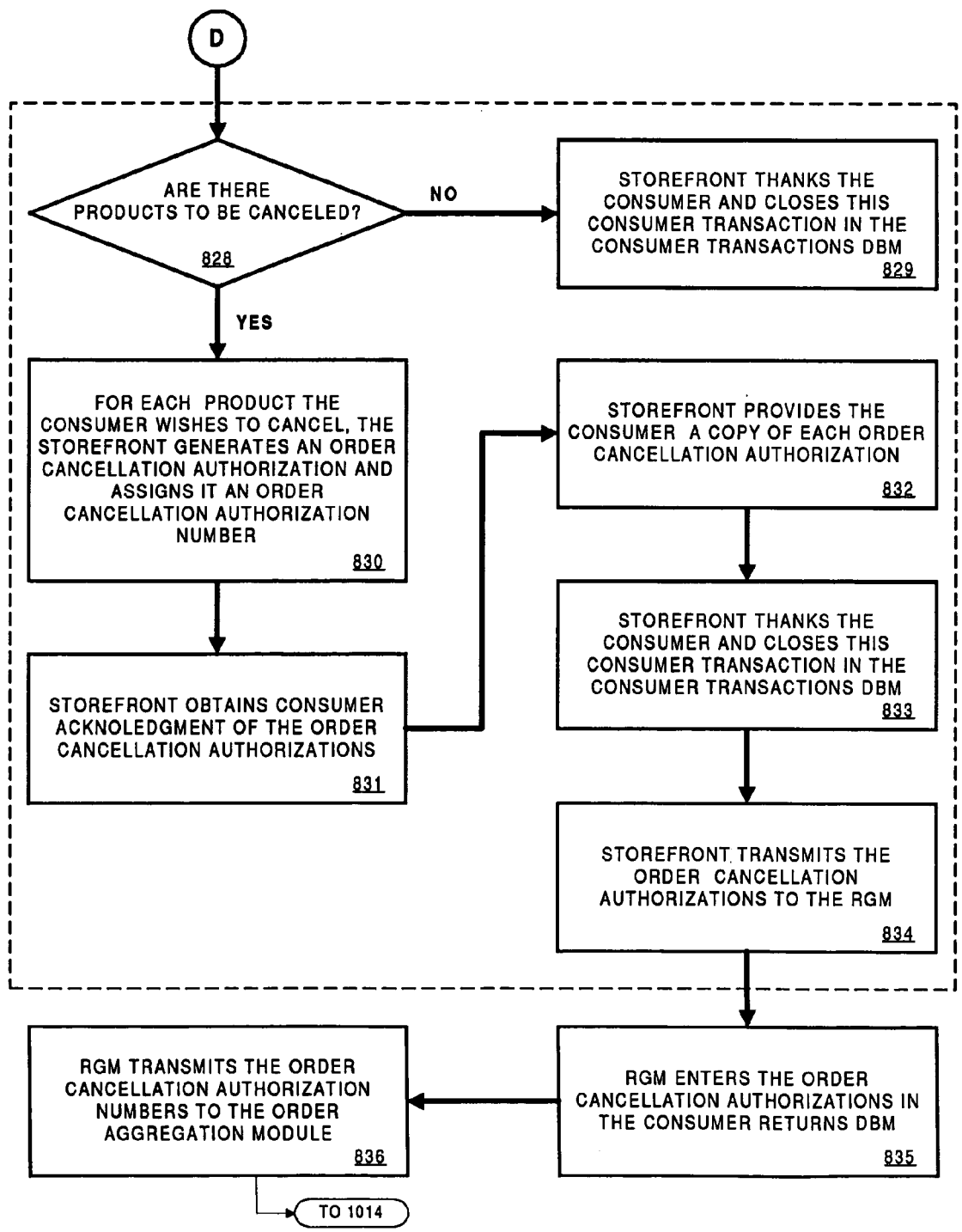
Figure 8E:
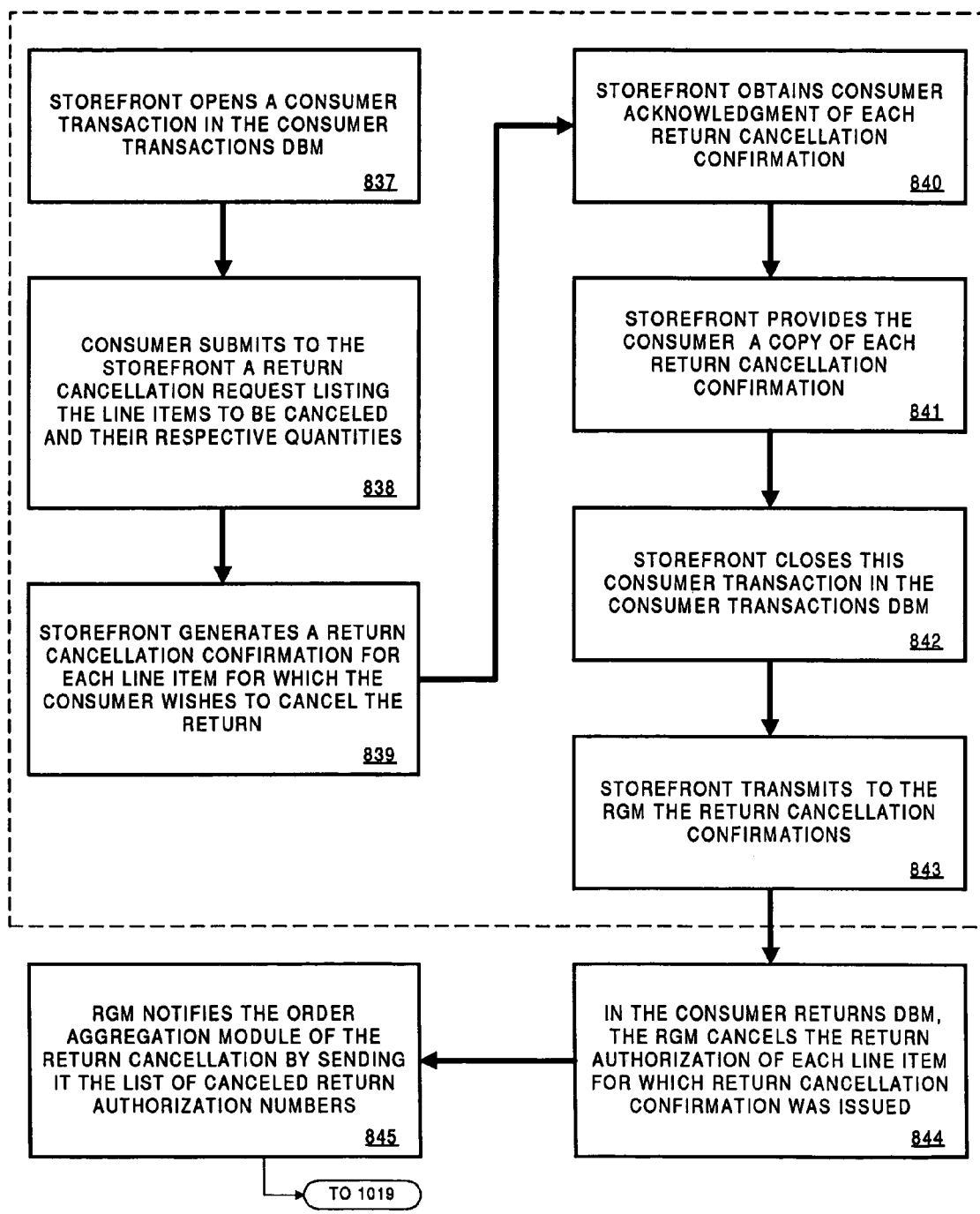

FIGS. 7A and 7B illustrate two sequential flow charts by which the Order Processing Module (OPM) 212 can be configured to process consumer orders. The first flow chart includes steps 700-707. At step 707 the process stops and waits for an event that causes the process to resume with the second flow chart which includes steps 708-713.

In the first flow chart (FIG. 7A), at step 700, the OPM 212 receives a purchase order number from the Order Generation Module 211 or a replacement order from the Exception and Recovery Module (ERM) 218. The receipt in the step 700 by the OPM 212 of a purchase order number from OGM 211 corresponds to the transmissions in the step 631 (FIG. 6D) by the OGM 211 and in step 1617 (FIG. 16B) by the ERM 218. Alternatively, the receipt in the step 700 by the OPM 212 of a replacement order from ERM 218 corresponds to the transmission in the step 1617 (FIG. 16B) by the ERM 218. At step 701, the OPM 212 analyzes the executable order and performs the appropriate order fulfillment allocations among participating merchants. Preferably, the order fulfillment allocations are based upon order fulfillment rules that can be imposed by the Consumer 120, by the merchants participating in the order or both. Order fulfillment rules imposed by the Consumer 120 can be general and apply to all orders, or can be order specific. General fulfillment rules imposed by consumers are preferably stored in the Consumer DBM 239 and specific fulfillment rules in the Consumer Orders DBM 234. An example of a general fulfillment rule imposed by the Consumer 120 is that all items in any purchase order can be supplied by any merchant except that fruit must always be supplied by a specific merchant designated by the Consumer 120. An example of a specific fulfillment rule imposed by the Consumer 120 is that the steaks on a specific order must be supplied by a specific merchant designated by the Consumer 120. Order fulfillment rules imposed by merchants, may be general and apply to all products, or may be product specific. General fulfillment rules imposed by merchants are preferably stored in the Merchant DBM 240 and specific fulfillment rules in the Inventory Provider DBM 232. An example of a general fulfillment rule imposed by the merchant generating the order is that the order is fulfilled first from that merchant's available inventory. For the remaining items, the order is fulfilled from the inventory of the merchant offering the best transfer price—the price one merchant charges another for a given item. Should more than one merchant offer the same transfer price, the rule can stipulate that the order be fulfilled from the inventory of the merchant whose Inventory Site 112 is closest to the Order Aggregation Site 400 selected for pickup or delivery. An example of a specific fulfillment rule imposed by the merchant generating the order is that all fresh produce in the order be fulfilled by a named merchant specializing in produce. This rule could be the result of a special contract for the supply of fresh produce negotiated between the two merchants.

At step 702, the OPM 212 updates the Virtual Inventory DBM 231 to reflect the items in the executable order that were sold. At step 703, the OPM 212 instructs each affected OIMS 111 to update its respective inventory database to reflect those items with which it participates in the executable order. At step 704, the OPM 212 executes and enters in the Inter-Merchant Transactions DBM 236 the applicable inter-merchant transactions that reflect the fulfillment allocations that may have been applied. At step 705, the OPM 212 transmits the inter-merchant transaction records to the OIMS 111 of each affected merchant. At step 706, if there is a short order, the OPM 212 updates the Virtual Inventory DBM 231 to reflect the short items in the short order. At step 707, if there is a short order, the OPM 212 instructs each affected OIMS 111 to update its respective inventory database to reflect the short items for which it is responsible. As with the executable order, the short order can be allocated among the participating retailers using rules similar to those used for executable orders.

The second flow chart, starting with step 708 (FIG. 7B) is preferably executed upon the occurrence of two events. The first event is the completion of step 707 that marks the end of the first flow chart for each purchase order received by the OPM 112. The second event is the receipt of a trigger indicating the entry of pickup and delivery information, related to that purchase order, in the Consumer Orders DBM 234. The receipt of the trigger in the step 708 by the OPM 212 corresponds to the update in the step 1110 (FIG. 11B) by the PDIM 216.

At step 708, the OPM 212 negotiates and performs any applicable Fulfillment-Substitutions among the merchants participating in the order. If the order is scheduled for pickup by the Consumer 120, the selection of the OAS 400 is made by the consumer; otherwise the selection is made by the VIMS 200. If the order is scheduled for delivery to the Consumer 120, the selection of the OAS 400 is preferably determined on the basis of geographic proximity to the delivery address.

It is possible that the selected OAS 400 may be located within a retail store that has an Inventory Site 112. In this case, it is further possible that certain items in the order, scheduled to be provided by a given Inventory Site 112, may also be available at the retail store that houses the OAS 400 selected for pickup or delivery. Should such circumstances occur for certain items in the order, the transport costs for such items can be eliminated by performing appropriate order Fulfillment-Substitutions between those merchants participating in the order.

At step 709, the OPM 212 updates each affected Inventory Provider DBM 232 to reflect applicable Fulfillment-Substitutions. At step 710, the OPM 212 instructs each affected OIMS 111 to update its respective inventory database to reflect any changes caused by Fulfillment-Substitutions. At step 711, the OPM 212 executes and enters in the Inter-Merchant Transactions DBM 236 those transactions caused by Fulfillment-Substitutions. At step 712, the OPM 212 transmits the inter-merchant transaction records to the OIMS 111 of each affected merchant. At step 713, the OPM 212 notifies the Order Aggregation Module (OAM) 215 of the completion of order processing.

3. Returns Generation Module

FIGS. 8A-E illustrate the flowcharts for three preferred processes by which the Returns Generation Module (RGM) 213 can be configured to generate consumer returns, order cancellations, and return cancellations. Preferably, steps 800-802, 807-815, 819-821, 826-834, and 837-843 occur at the Storefront 113 and serve as an interface with the Consumer 120. Steps 803-806, 816-818, 822-825, 835-836, and 844-845 preferably occur within the RGM 213. Steps occurring at the Storefront 113, in FIGS. 8A-D, are enclosed in dashed rectangles to distinguish them from the steps occurring in the RGM 213.

The generation of consumer returns is discussed with reference to steps 800-818. At step 800, the Storefront 113 opens a consumer transaction in the Consumer Transactions DBM 233. At step 801, the Consumer 120 submits to the Storefront 113 a return request listing the line items to be returned and their respective quantities. At step 802, the Storefront 113 transmits the return request list to the RGM 213.

At step 803, the RGM 213 analyzes each product in the return request list to determine if a return authorization should be issued for that product. At step 804, the RGM 213 lists those products eligible for return in a products-eligible-for-return list. At step 805, the RGM 213 lists those products ineligible for return, in a products-ineligible-for-return list that includes the reason for ineligibility. At step 806, the RGM 213 transmits the product return eligibility lists generated in steps 804 and 805 to the Storefront 113.

At step 807, the Storefront 113 submits the product return eligibility lists to the Consumer 120. At step 808, the Consumer 120 reviews the products-eligible-for-return list to identify those products, if any, to be returned. At step 809, the Storefront 113 analyzes the decision of the Consumer 120 to determine whether or not the Consumer 120 elected to return any products. If step 809 is not affirmative, at step 810, the Storefront 113 thanks the Consumer 120 and closes the respective consumer transaction in the Consumer Transactions DBM 233.

If step 809 is affirmative, at step 811, the Storefront 113 generates a return authorization for each product the Consumer 120 wishes to return and assigns it a return authorization number. At step 812, the Storefront 113 obtains consumer acknowledgment of the return authorizations. At step 813, the Storefront 113 provides the Consumer 120 a confirmation of each product return authorization. Such confirmation can be an electronic or hard copy of each return authorization, or any other form of confirmation appropriate for the way in which the transaction is executed. At step 814, the Storefront 113 thanks the consumer and closes the respective transaction in the Consumer Transactions DBM 233. At step 815, the Storefront 113 transmits the return authorizations to the RGM 213.

At step 816, if the Consumer 120 is ready to enter pickup or delivery information, the RGM 213 links the Consumer 120 to the OAM 215. At step 817, the RGM 213 enters the return authorizations in the Product Returns DBM 235. At step 818, the RGM 213 transmits the return authorization numbers to the OAM 215, thus completing the process for generating consumer returns.

The generation of order cancellations is described with reference to steps 819-836. At step 819, the Storefront 113 opens a consumer transaction in the Consumer Transactions DBM 233. At step 820, the Consumer 120 submits to the Storefront 113 an order cancellation request on an open purchase order listing the line items to be cancelled and their respective quantities. At step 821, the Storefront 113 transmits the order cancellation request list to the RGM 213.

At step 822, the RGM 213 analyzes each product in the order cancellation request list to determine if a cancellation authorization should be issued for that product. At step 823, the RGM 213 lists those products eligible for cancellation in a products-eligible-for-cancellation list. At step 824, the RGM 213 lists those products ineligible for cancellation in a products-ineligible-for-cancellation list that includes the reason for ineligibility. At step 825, the RGM 213 transmits the cancellation eligibility lists generated in steps 823 and 824 to the Storefront 113.

At step 826, the Storefront 113 submits the cancellation eligibility lists to the Consumer 120. At step 827, the Consumer 120 reviews the lists and identifies in the products-eligible-for-cancellation list those line items, if any, to be canceled. At step 828, the Storefront 113 analyzes the decision of the Consumer 120 to determine if the Consumer 120 elected to cancel any products. If step 828 is not affirmative, at step 829, the Storefront 113 thanks the Consumer 120 and closes the respective transaction in the Consumer Transactions DBM 233.

If step 828 is affirmative, at step 830, the Storefront 113 generates an order cancellation authorization for each line item the Consumer 120 wishes to cancel and assigns it an order cancellation authorization number. At step 831, the Storefront 113 obtains consumer acknowledgment of the order cancellation authorizations. At step 832, the Storefront 113 provides the Consumer 120 a confirmation of each order cancellation authorization. Such confirmation can be an electronic or hard copy of each cancellation authorization, or any other form of confirmation appropriate for the way in which the transaction is executed. At step 833, the Storefront 113 thanks the Consumer 120 and closes the respective consumer transaction in the Consumer Transactions DBM 233. At step 834, the Storefront 113 transmits the order cancellation authorizations to the RGM 213.

At step 835, the RGM 213 enters the order cancellation authorizations in the Product Returns DBM 235. At step 836, the RGM 213 transmits the order cancellation authorization numbers to the OAM 215, thus completing the process for generating order cancellations.

The generation of return cancellations is discussed with reference to steps 837-845. A return cancellation occurs when the consumer elects not to return a particular line item after having obtained a return authorization for that item. At step 837, the Storefront 113 opens a consumer transaction in the Consumer Transactions DBM 233. At step 838, the Consumer 120 submits to the Storefront 113 a return cancellation request listing the line items to be canceled and their respective quantities. At step 839, the Storefront 113 generates a return cancellation confirmation for each line item for which the Consumer 120 wishes to cancel the return. At step 840, the Storefront 113 obtains consumer acknowledgment of each return cancellation confirmation. At step 841, the Storefront 113 provides the Consumer 120 a confirmation of each return cancellation confirmation. Such confirmation can be an electronic or hard copy of each return cancellation, or any other form of confirmation appropriate for the way in which the transaction is executed. At step 842, the Storefront 113 closes the respective transaction in the Consumer Transactions DBM 233. At step 843, the Storefront 113 transmits to the RGM 213 the return cancellation confirmations.

At step 844, the RGM 213 cancels, in the Product Returns DBM 235, the return authorization of each line item for which a return cancellation confirmation was issued. At step 845, the RGM 213 notifies the OAM 215 of the return cancellations by sending it the list of canceled return authorization numbers, thus completing the process for the generation of return cancellations.

4. Returns Processing Module

Figure 9A:
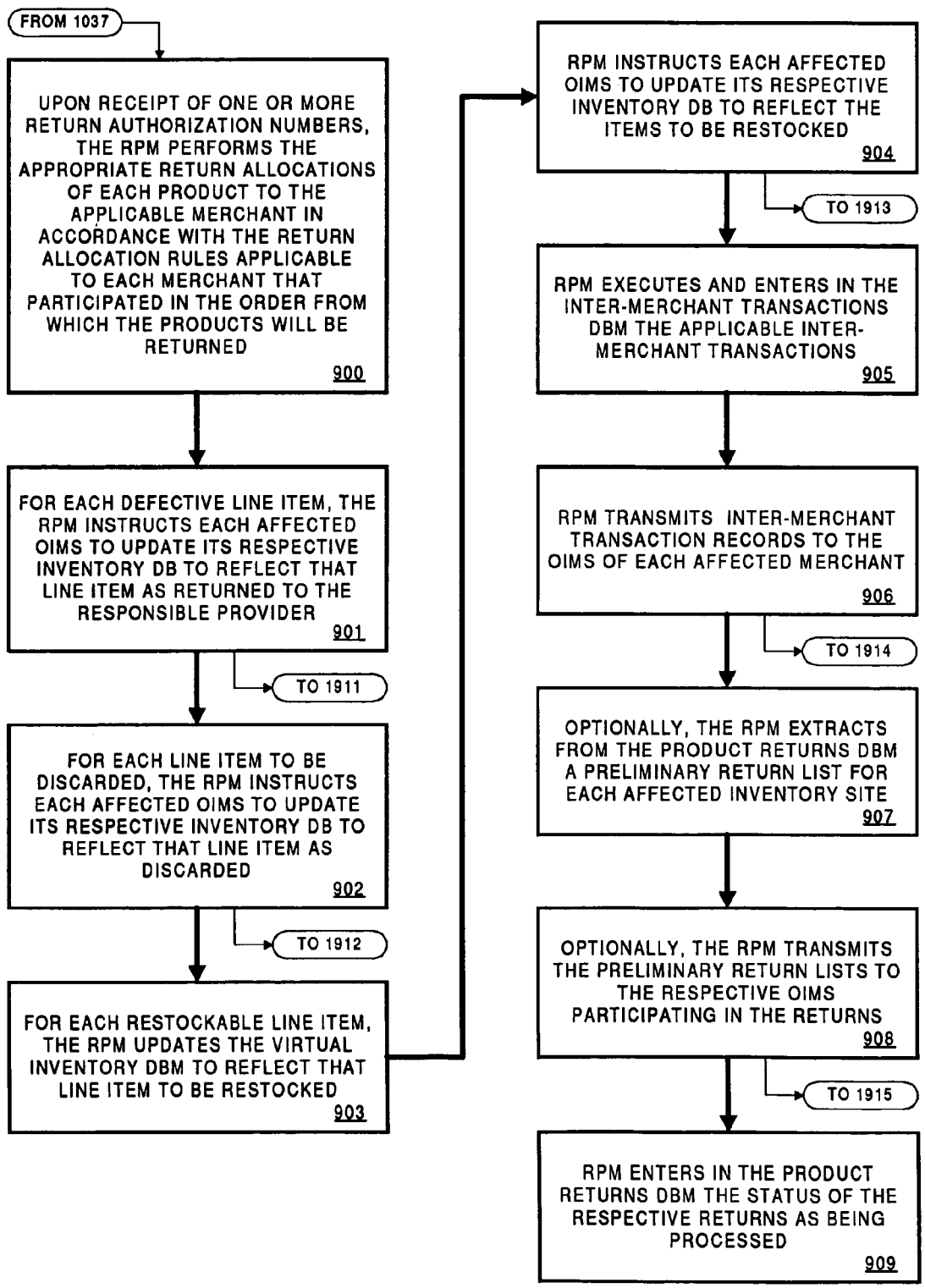
FIGS. 9A-B illustrate processes preferably performed by the Returns Processing Module.
Figure 9B:
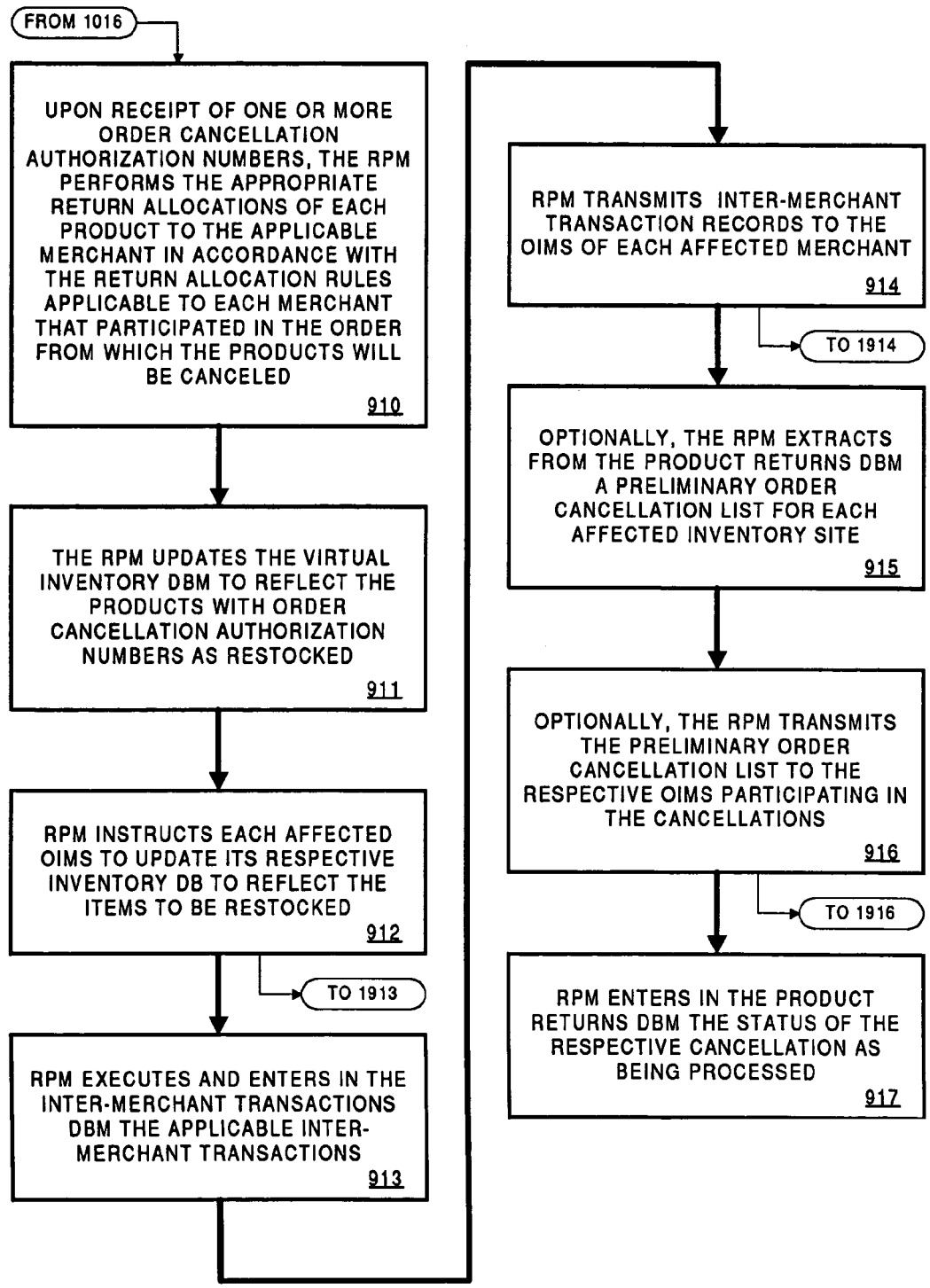

FIGS. 9A and 9B illustrate the flowcharts for two preferred process by which the Returns Processing Module (RPM) 214 can be configured to process returns and order cancellations.

Processing returns is described with reference to steps 900-909. At step 900, after receipt of one or more return authorization numbers, the RPM 214 analyzes the return authorizations and performs the appropriate return allocations among participating merchants. The receipt in the step 900 by the RPM 214 corresponds to the transmission in the step 1037 (FIG. 10D) by the OAM 215. Preferably, return allocations performed in step 900 are based upon rules imposed by merchants participating in the PDMS 100. Return allocation rules may be general and apply to all line items, or may be specific and apply to specific line items. Preferably, general return allocation rules are stored in the Merchant DBM 240 and specific return allocation rules in the Inventory Provider DBM 232. An example of a general return allocation rule imposed by a retailer is that a line item will be returned to the store that generated the order from which the line item is being returned. An example of a specific return allocation rule is that all fresh produce must be returned to the retailer that generated the order irrespective of the Inventory Site 112 that provided the produce.

In steps 901-903, the process preferably distinguishes three categories of returns which include defective line items requiring return to the manufacturer or responsible supplier, spoiled line items that must be discarded, and line items in restockable condition requiring return to inventory. In the case of a line item to be discarded, disposal can be handled directly by the receiving OAS 400, thus eliminating unnecessary transportation to an Inventory Site 112. For a line item that can be restocked, and where the OAS 400 to which it is returned is also an Inventory Site 112, transport costs can be eliminated by restocking the line item at that Inventory Site 112.

At step 901, for each defective line item, the RPM 214 instructs each affected OIMS 111 to update its respective inventory database to reflect that line item as returned to the responsible provider. At step 902, for each line item to be discarded, the RPM 214 instructs each affected OIMS 111 to update its respective inventory database to reflect that line item as discarded. At step 903, for each restockable line item, the RPM 214 updates the Virtual Inventory DBM 231 to reflect that line item to be restocked.

The process for handling restockable items continues at step 904. At step 904, the RPM 214 instructs each affected OIMS 111 to update its respective inventory database to reflect the items to be restocked. At step 905, the RPM 214 executes and enters in the Inter-Merchant Transactions DBM 236 the applicable inter-merchant transactions that may occur as a result of the return of restockable items. At step 906, the RPM 214 transmits the respective inter-merchant transaction records to the OIMS 111 of each affected merchant. At step 907, the RPM 214 provides the option for extracting from the Product Returns DBM 235 a preliminary list of returns for each affected Inventory Site 112. At step 908, the RPM 214 provides the option for transmitting the preliminary list of returns to the respective OIMS 111 participating in the returns. At step 909, the RPM 214 enters in the Product Returns DBM 235 the status of the respective returns as having been processed, thus completing the returns process.

Processing of order cancellations is described with reference to steps 910-917. At step 910, after receipt of one or more order cancellation authorization numbers, the RPM 214 analyzes the cancellation authorizations and performs the appropriate return allocations among participating merchants. The receipt in the step 910 by the RPM 214 corresponds to the transmission in the step 1016 (FIG. 10B) by the OAM 215. Preferably, the return allocations performed in step 910 are based upon return allocation rules similar to the rules discussed with reference to step 900.

At step 911, the RPM 214 updates the Virtual Inventory DBM 231 to reflect the line items with order cancellation authorization numbers as restocked. At step 912, the RPM 214 instructs each affected OIMS 111 to update its respective inventory database to reflect the items to be restocked. At step 913, the RPM 214 executes and enters in the Inter-Merchant Transactions DBM 236 the applicable inter-merchant transactions that may occur as a result of the order cancellations. At step 914, the RPM 214 transmits the inter-merchant transaction records to the OIMS 111 of each affected merchant. At step 915, the RPM 214 provides the option for extracting from the Product Returns DBM 235 a preliminary order cancellation list for each affected Inventory Site 112. At step 916, the RPM 214 provides the option for transmitting the preliminary order cancellation lists to the respective OIMS 111 participating in the cancellations. At step 917, the RPM 214 enters in the Product Returns DBM 235 the status of the respective cancellation as being processed, thus completing the order cancellation process.

5. Order Aggregation Module

FIGS. 10A-E illustrate eleven distinct processes in accordance with which the OAM 215 can be configured to coordinate the following activities:

(1) Input of pickup and delivery information.
(2) Operation of the Product Transport Module (PTM) 217 for orders and returns.
(3) Executions of product returns, order cancellations, and return cancellations.
(4) Execution of pick-and-pack operations at store inventory sites 112.
(5) Operation of the Product Transport Support Service (PTSS) 300.
(6) Operation of the OAS's 400.

Steps 1000-1009 describe a process related to events that can trigger the entry of pickup and delivery information. At step 1000, the OAM 215 receives an internal alert from the Consumer Orders DBM 234 indicating that the age of a consumer order or return lacking pickup and delivery information has reached a level that triggers a reminder to the respective Consumer 120. At step 1001, the OAM 215 receives an alert from the Consumer Orders DBM 234 indicating that the age limit has been exceeded on a consumer order or return lacking pickup and delivery information. At step 1002, the OAM 215 receives notification from a local OAS 400 of the arrival of an out-of-the-region consumer order, addressed to that local Order Aggregation Site 400, that lacks pickup and delivery information. The receipt in the step 1002 by the OAM 215 corresponds to the transmission in the step 1803 (FIG. 18) by the OAS 400. From steps 1000-1002 the process preferably continues with step 1003.

At step 1003, the OAM 215 attempts to contact each Consumer 120 with an order or return lacking pickup and delivery information. At step 1004, the OAM 215 analyzes the outcome of the attempt to contact the Consumer 120 for any of the conditions set forth in steps 1000-1002 to determine if such attempt was successful. If step 1004 is not affirmative, and if further the age limit has been exceeded on the respective consumer order, at step 1005, the OAM 215 generates an exception status report. At step 1006, the OAM 215 notifies the Exception and Recovery Module (ERM) 218 of the exception and sends it the exception status report. If step 1004 is affirmative, the process preferably continues at step 1009.

At step 1007, the OAM 215 receives a link to a specific Consumer 120 upon that consumer's unsolicited contact. For example, a Consumer 120 can contact a storefront or an OAS 400 to inquire about the status of an order. When this contact occurs, the VIMS 200 automatically reads the consumer identification and checks the Consumer DBM for any flags indicating the need to contact the Consumer 120. If such flags are present, step 1007 is automatically executed. At step 1008, the OAM 215 receives from the OGM 211 or the RGM 213 a link to a specific consumer for the entry of pickup and delivery information. The receipt in the step 1008 by the OAM 215 corresponds to transmissions in steps 628 (FIG. 6D) by the OGM 212 and 816 (FIG. 8B) by the RGM 213. From steps 1007 and 1008, the process preferably continues with step 1009. At step 1009, for any of the conditions set forth in steps 1007, 1008, or the affirmative outcome of step 1004, the OAM 215 invokes the Pickup and Delivery Information Module (PDIM) 216 by sending it the identification reference for the respective Consumer 120.

Steps 1010-1011, 1012-1013, 1014-1018, and 1019 (a single-step process) describe four processes related to the coordination of orders, returns, order cancellations, and return cancellations, respectively. At step 1010, the OAM 215 receives from the OPM 212 a notice of the completion of order processing for a specific order. The receipt in the step 1010 by the OAM 215 corresponds to the transmission in the step 713 (FIG. 7B) by the OPM 212. At step 1011, the OAM 215 updates the Consumer Orders DBM 234 to indicate that product transport may be required and notifies the Product Transport Module 217. At step 1012, the OAM 215 waits for the occurrence of two events relative to a given product return. The first event is the receipt of the respective return authorization number; the second event is a trigger from the Product Returns DBM 235 indicating the entry of the respective pickup and delivery information in the Product Returns DBM 235. The receipt in the step 1012 by the OAM 215 corresponds to transmissions in steps 818 (FIG. 8B) by the RGM 213 and 1110 (FIG. 11B) by the PDIM 216. At step 1013, the OAM 215 updates the Product Returns DBM 235 to indicate that product transport may be required and notifies the Product Transport Module 217.

At step 1014, the OAM 215 receives an order cancellation authorization number. The receipt in the step 1014 by the OAM 215 corresponds to the transmission in the step 836

(FIG. 8D) by the RGM 213. At step 1015, the OAM 215 changes the status of the canceled item in the Consumer Orders DBM 234 to "canceled." At step 1016, the OAM 215 transmits the order cancellation authorization number to the RPM 214. At step 1017, the OAM 215 examines the Product Transport DBM 237 to determine if any product transport is required on the canceled item. When this step is executed, if the line item is still at the Inventory Site 112 from which it was to be supplied, no transport is required. Otherwise, product transport may be required to return the line item to the respective Inventory Site 112 from which it was supplied. However, other alternatives are possible relative to the cancellation of an item on a purchase order that has already been transported from its Inventory Site 112. For example, if the product has been transported to an OAS 400 that is also an Inventory Site 112, the RPM 214 could execute an inter-merchant transaction to transfer the product to the inventory site of the OAS 400 holding it. This alternative would be viable and would save the costs of transportation if the receiving Inventory Site 112 has a reasonable opportunity for selling the canceled item. At step 1018, if any product transportation is required on the canceled item the OAM 215 updates the Consumer Orders DBM 234 to indicate that product transportation is required and notifies the Product Transport Module 217.

At step 1019, upon receipt of a return cancellation notice accompanied by the respective return authorization numbers, the OAM 215 cancels the applicable entries in the Product Returns DBM 235 and no further action is required. The receipt in the step 1019 by the OAM 215 corresponds to the transmission in the step 845 (FIG. 8E) by the RGM 213.

Steps 1020-1027 describe a process related to the coordination and scheduling of pick-and-pack, product transport, and order aggregation. At step 1020, the OAM 215 receives from the PTM 217 a notice of update of the product transport instructions, schedules, and itineraries. The receipt in the step 1020 by the OAM 215 corresponds to the transmission in the step 1204 (FIG. 12) by the PTM 217. At step 1021, the OAM 215 analyzes the Product Transport DBM 237 to determine if the update affects pick-and-pack or aggregation of any consumer order. If affirmative, the process continues with steps 1022-1026. If not affirmative, the process jumps directly to step 1026.

At step 1022, for each purchase order, the OAM 215 extracts from the Consumer Orders DBM 234, if applicable, a pick-and-pack list and schedule for each OIMS 111 participating in the order. At step 1023, for each purchase order, the OAM 215 transmits, if applicable, the pick-and-pack lists and schedules to the respective OIMS 111 participating in the order for further transmission to the appropriate Inventory Site 112. At step 1024, the OAM 215 extracts from the Consumer Orders DBM 234, if applicable, Order Aggregation lists and schedules for each OAS 400 participating in the affected orders. At step 1025, the OAM 215 transmits the Order Aggregation lists and schedules, if applicable, to the respective OAS's 400. At step 1026, the OAM 215 extracts from the Product Transport DBM 237 product transport instructions, schedules and itineraries. At step 1027, the OAM 215 sends the notice of update of the product transport instructions, schedules, and itineraries to the PTSS 300 and to each affected OIMS 111 and OAS 400.

Steps 1028-1034 describe a process related to product transports and the closing of order and return transactions and steps 1035, 1036, and 1037 describe single step processes related to recording and reporting closed of transactions. At step 1028, the OAM 215 receives a notice of successful execution of a product transport. The receipt in the step 1028 by the OAM 215 corresponds to the transmission in the step 1703 (FIG. 17) by the PTSS 300. From this step, the process for consumer orders preferably continues with steps 1029-1032. At step 1029, for each order, the OAM 215 updates the Consumer Orders DBM 234 to reflect successful product transportation. Then, at step 1030, the OAM 215 analyzes the Consumer Orders DBM 234 to identify delivered orders and preferably updates the status of such orders to "closed." At step 1031, the OAM 215 analyzes the Consumer Orders DBM 234 to identify aggregated orders scheduled for pickup. For such orders, it updates the Consumer Orders DBM 234 to reflect the status as "ready-for-pickup" and records the respective date and time. At step 1032, for each order showing a status of "ready-for-pickup," the OAM 215 sends a courtesy notice to the respective Consumer 120 confirming order readiness.

From step 1028, the process for consumer returns continues with steps 1033 and 1034. At step 1033, for each return, the OAM 215 updates the Product Returns DBM 235 to reflect the successful product transportation. At step 1034, the OAM 215 analyzes the product returns DBM to identify returns picked-up by the PTSS 300 and preferably updates the status of such returns to "closed."

At step 1035, upon receipt from an OAS 400 of a notice of pickup of an order by the respective Consumer 120, the OAM 215 updates the status of such order in the Consumer Orders DBM 234 to "closed." The receipt in the step 1035 by the OAM 215 corresponds to the transmission in the step 1800 (FIG. 18) by the OAS 400.

At step 1036, upon receipt of notice of delivery of a return by the respective Consumer 120 to the designated OAS 400, the OAM 215 updates the Product Returns DBM 235 to reflect the status of such return to "closed." The receipt in the step 1036 by the OAM 215 corresponds to the transmission in the step 1801 (FIG. 18) by the OAS 400.

At step 1037, upon changing a return status to "closed," the OAM 215 notifies the RPM 214 by sending it the respective return authorization number.

Steps 1038-1040 (FIG. 10E) relate to scheduled orders and returns that may have been forgotten or ignored by the respective Consumer 120. At step 1038, the OAM 215 receives an alert from the Consumer Orders DBM 234 indicating that the age of a consumer order waiting for consumer pickup or a return waiting for consumer delivery has reached the level that triggers the need to remind the respective Consumer 120. At step 1039, the OAM 215 attempts to contact the Consumer 120 associated with such order or return. At step 1040, if the attempt to contact the Consumer 120 is successful, the OAM 215 reminds the Consumer 120 of the applicable time limits for pickup and delivery.

Steps 1041-1043 (FIG. 10E) relate to expired orders and returns. At step 1041, the OAM 215 receives an alert from the Consumer Orders DBM 234 indicating that the age of a consumer order waiting for consumer pickup or a return waiting for consumer delivery has expired. At step 1042, the OAM 215 generates an exception status report on the expired order or return. At step 1043, the OAM 215 notifies the ERM 218 of the exception and sends it the exception status report.

6. Pickup and Delivery Information Module

Figure 11A:
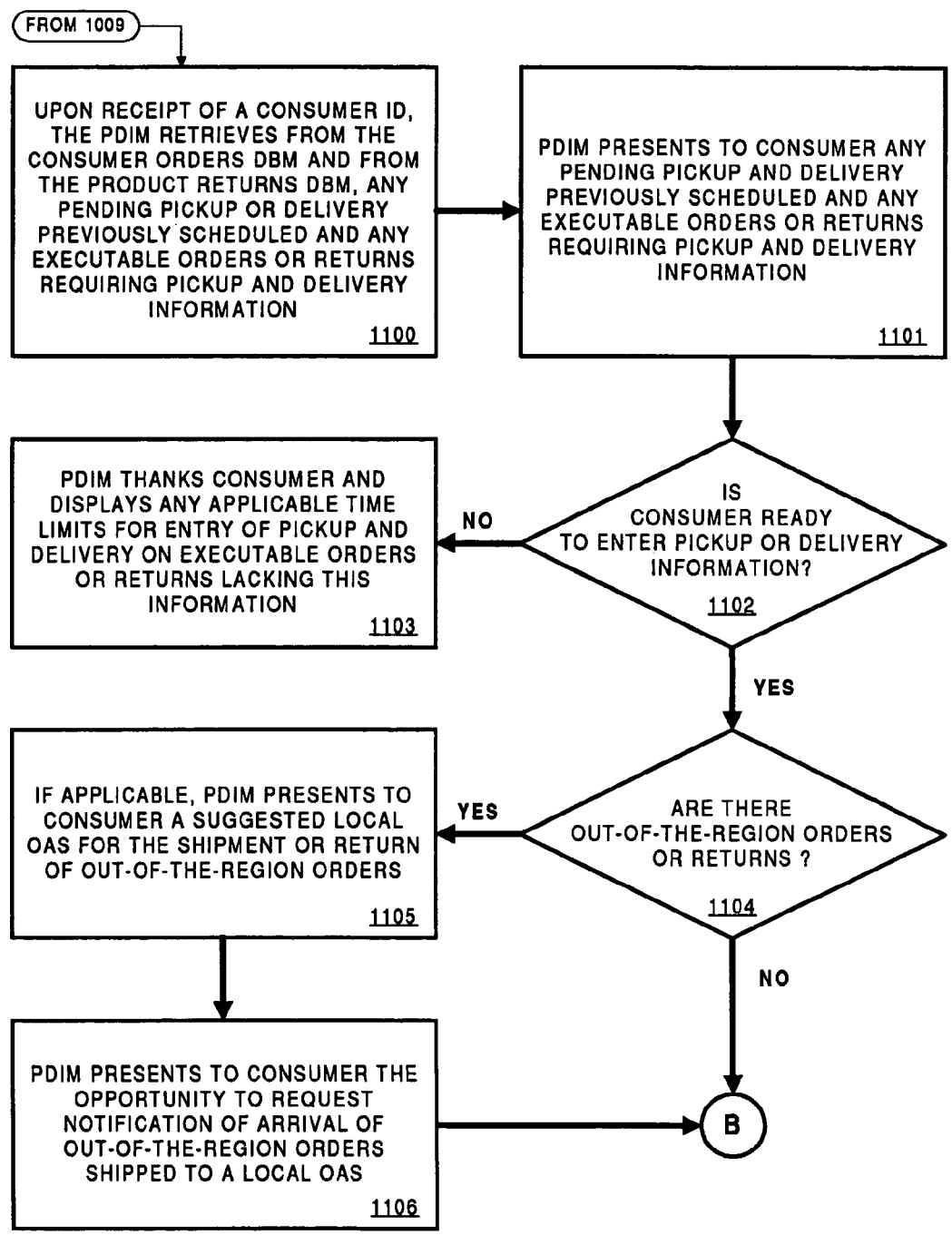
FIGS. 11A-B illustrate a process preferably performed by the Pickup and Delivery Information Module.
Figure 11B:
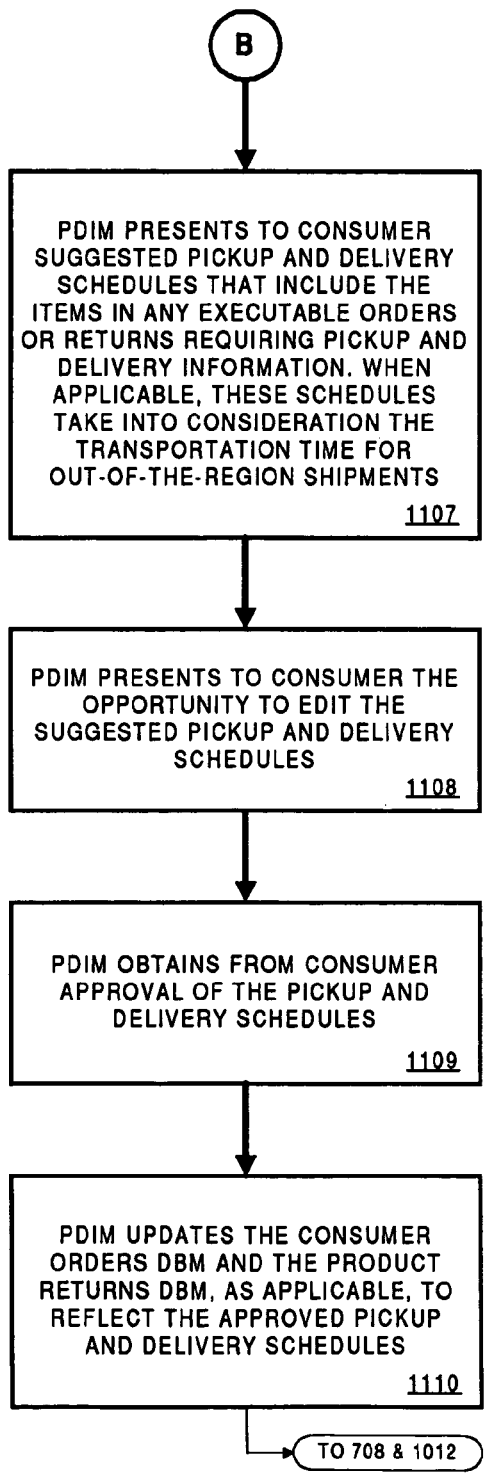

FIGS. 11A and 11B illustrate the flowchart for a preferred process by which the Pickup and Delivery Information Module (PDIM) 216 can be configured to collect from a Consumer 120 pickup and delivery information on an order or return.

Figure 10A:
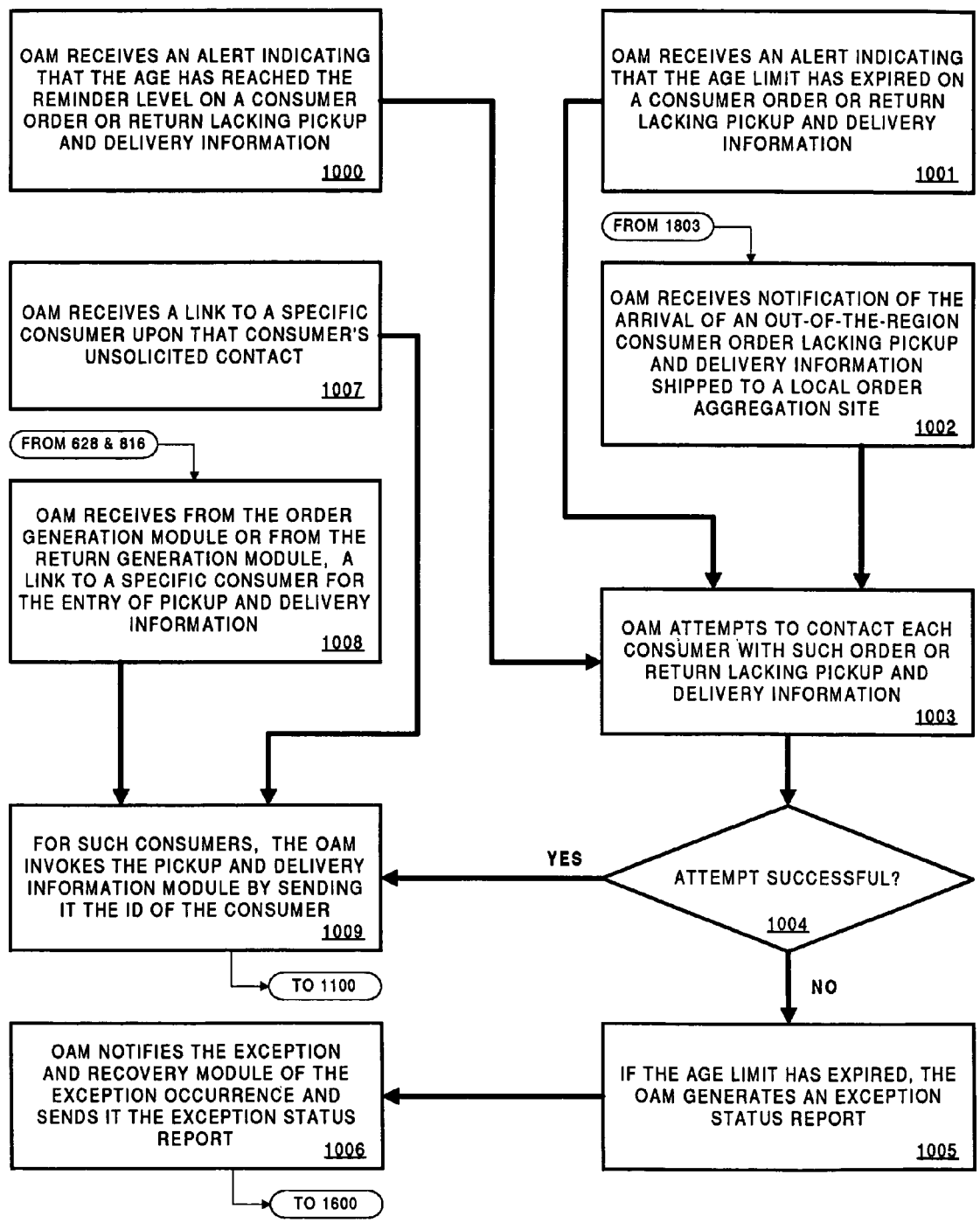
FIGS. 10A-E illustrate processes preferably performed by the Order Aggregation Module.
Figure 10B:
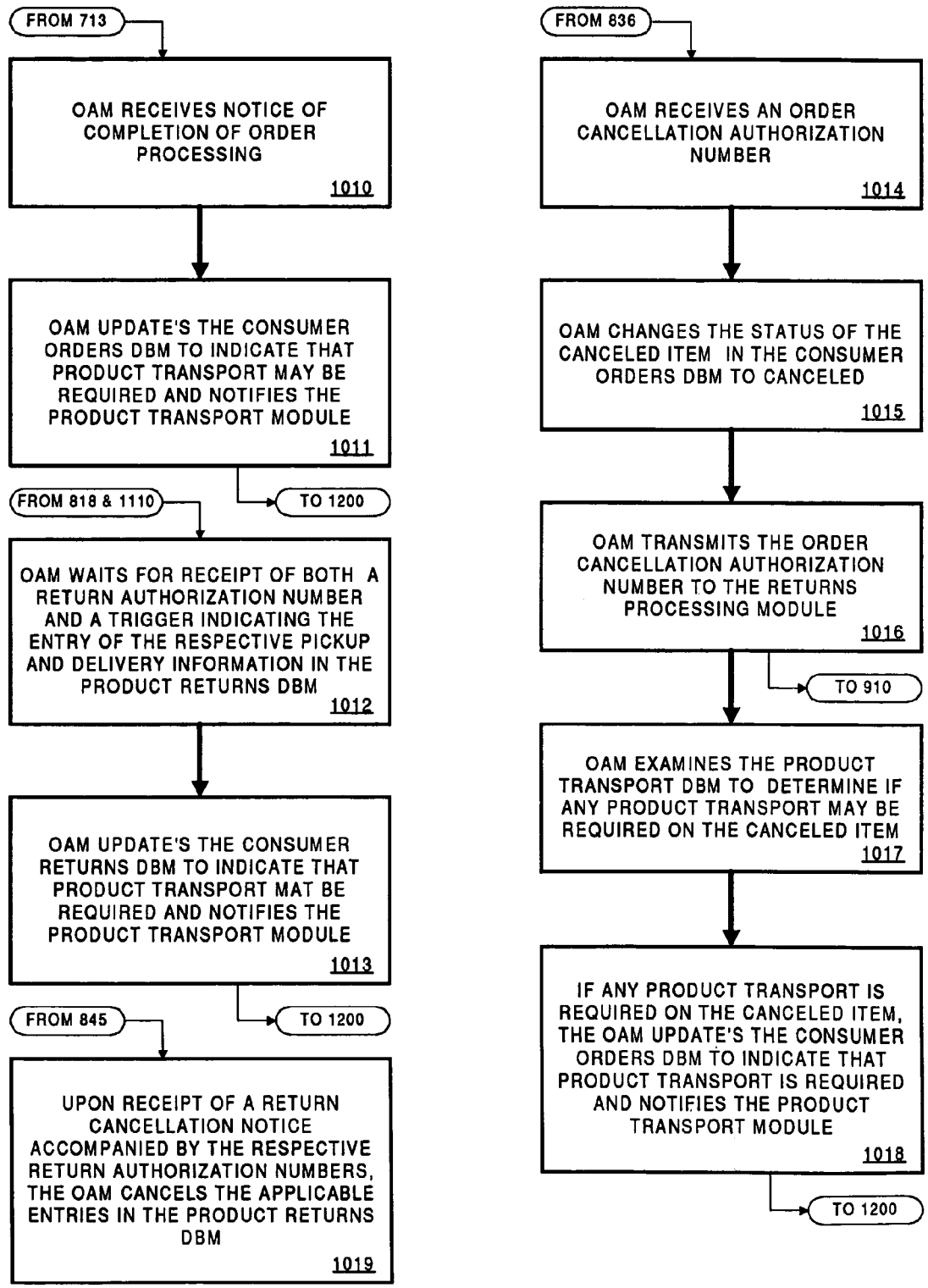
Figure 10C:
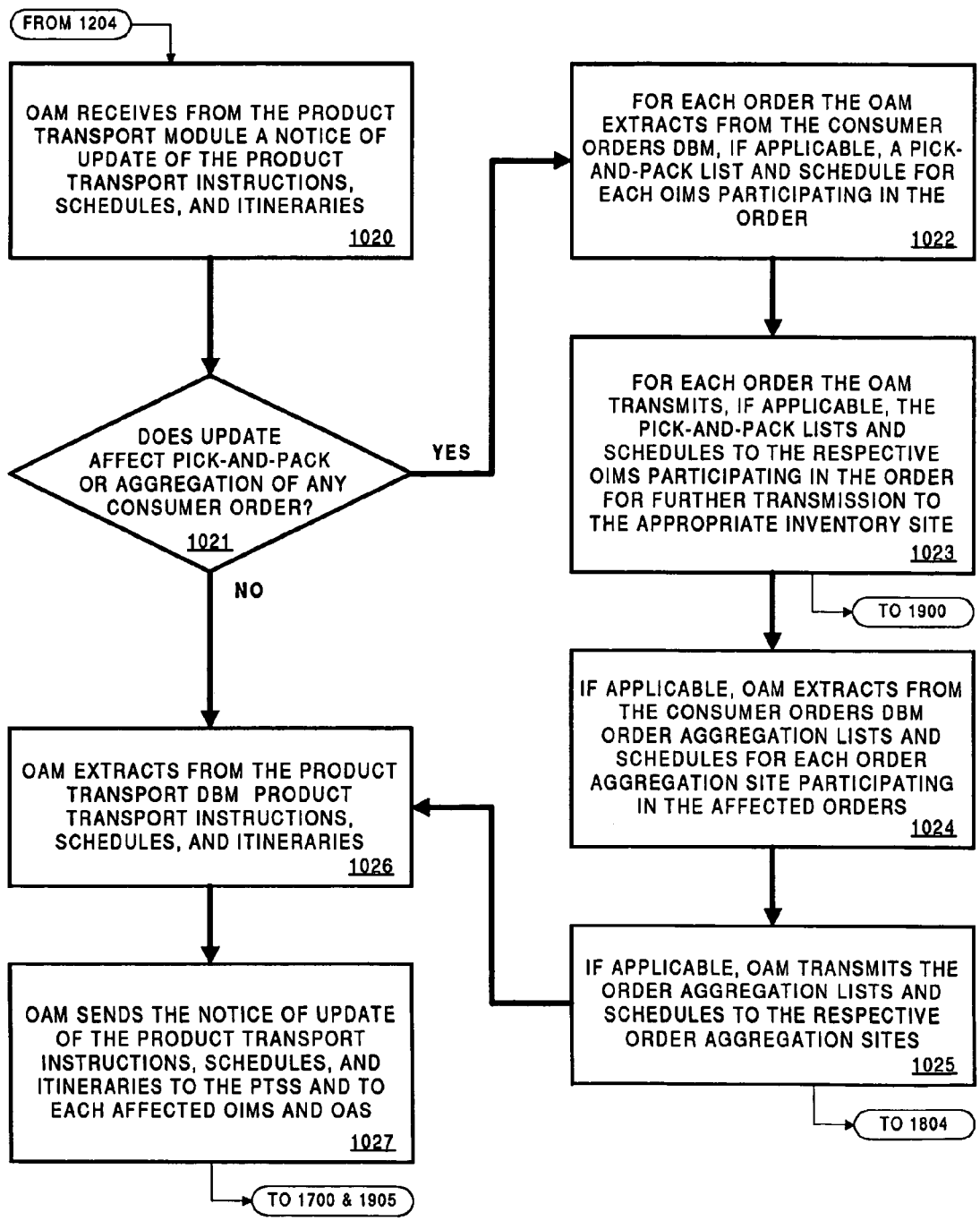
Figure 10D:
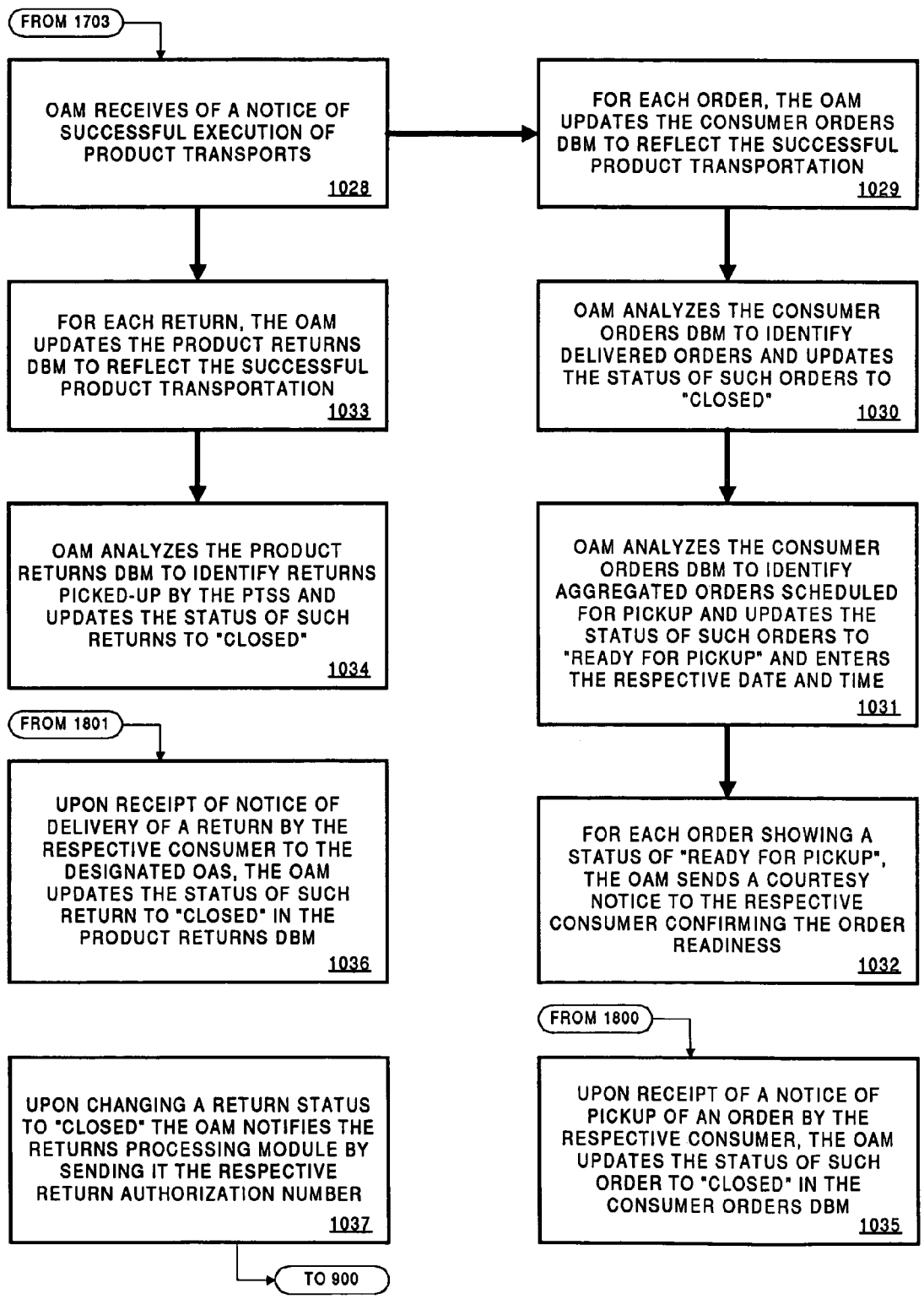
Figure 10E:
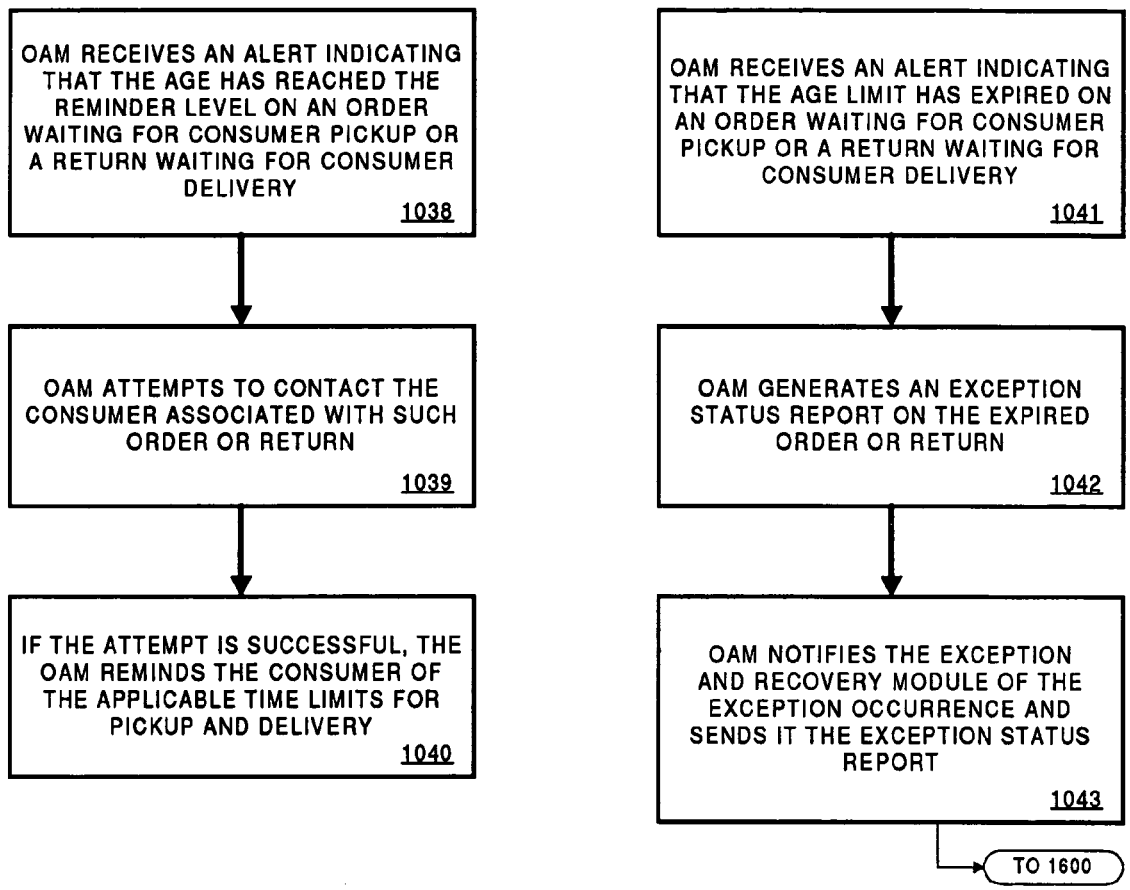

The PDIM 216 is invoked from step 1009 in the flowchart of FIG. 10A. The PDIM 216 preferably presents to the Consumer 120 various options including the following:

(1) Pickup an aggregated order at a consumer designated OAS 400.

(2) Deliver an aggregated order to a consumer designated address.

(3) Pickup a product scheduled for return from a consumer designated address.

(4) Deliver a product scheduled for return to a consumer selected OAS 400.

When presented with these selections, if appropriate, the Consumer 120 is given the opportunity to designate the desired selection in accordance with steps 1100-1110.

At step 1100, upon receipt of an identification reference for a Consumer 120, the PDIM 216 retrieves from the Consumer Orders DBM 234 and from the Product Returns DBM 235, any pending pickup or delivery previously scheduled and any executable orders or returns requiring pickup and delivery information. At step 1101, the PDIM 216 presents to the Consumer 120 the pending pickup or delivery previously scheduled and any executable orders or returns requiring pickup and delivery information retrieved during step 1100.

At step 1102, the Consumer 120 decides, based upon the information presented by the PDIM 216, whether or not to enter pickup and delivery information. If step 1102 is not affirmative, the process continues with step 1103. At step 1103, the PDIM 216 thanks the Consumer 120 and displays any applicable time limits for entry of pickup and delivery on executable orders or returns lacking that information. If step 1102 is affirmative, the process continues with step 1104. At step 1104, the PDIM 216 analyzes the orders retrieved from the Consumer Orders DBM 234 to determine if such orders include any out-of-the-region orders or returns. If step 1104 is affirmative, the process continues with steps 1105 through 1107. At step 1105, the PADIM 216 presents to the Consumer 120 a suggested local OAS 400 for the shipment or return of out-of-the-region orders. At step 1106, the PADIM 216 presents to the Consumer 120 the opportunity to request notification of the arrival of any out-of-the-region orders shipped to a local OAS 400.

If step 1104 is not affirmative, the process proceeds directly to step 1107. At step 1107, the PDIM 216 presents to the Consumer 120 suggested pickup and delivery schedules that include those items in any executable orders or returns requiring pickup and delivery information. When applicable, these schedules can take into consideration the transportation time for out-of-the-region shipments. If the Consumer 120 has any pending pickup or delivery previously scheduled, the PDIM 216 can suggest aggregating new orders with a pending pickup or delivery. If not, the PDIM 216 preferably obtains interactively from the Consumer 120 the selection of pickup or delivery. If the Consumer 120 selects pickup, preferably the PDIM 216 obtains interactively from the Consumer 120 the selection of an OAS 400 and a suitable schedule. If the Consumer 120 selects delivery, the PDIM 216 obtains from the Consumer 120 the selection of a delivery address (which can be a default address) and a suitable schedule.

At step 1108, the PDIM 216 presents to the Consumer 120 the opportunity to edit the suggested pickup and delivery schedules. At step 1109, after the Consumer 120 completes the editing step, the PDIM 216 obtains from the Consumer 120 approval of the pickup and delivery schedules. Finally, at step 1110, the PDIM 216 updates the Consumer Orders DBM 234 and the Product Returns DBM 235, as applicable, to reflect the approved pickup and delivery schedules.

7. Product Transport Module

Figure 12:
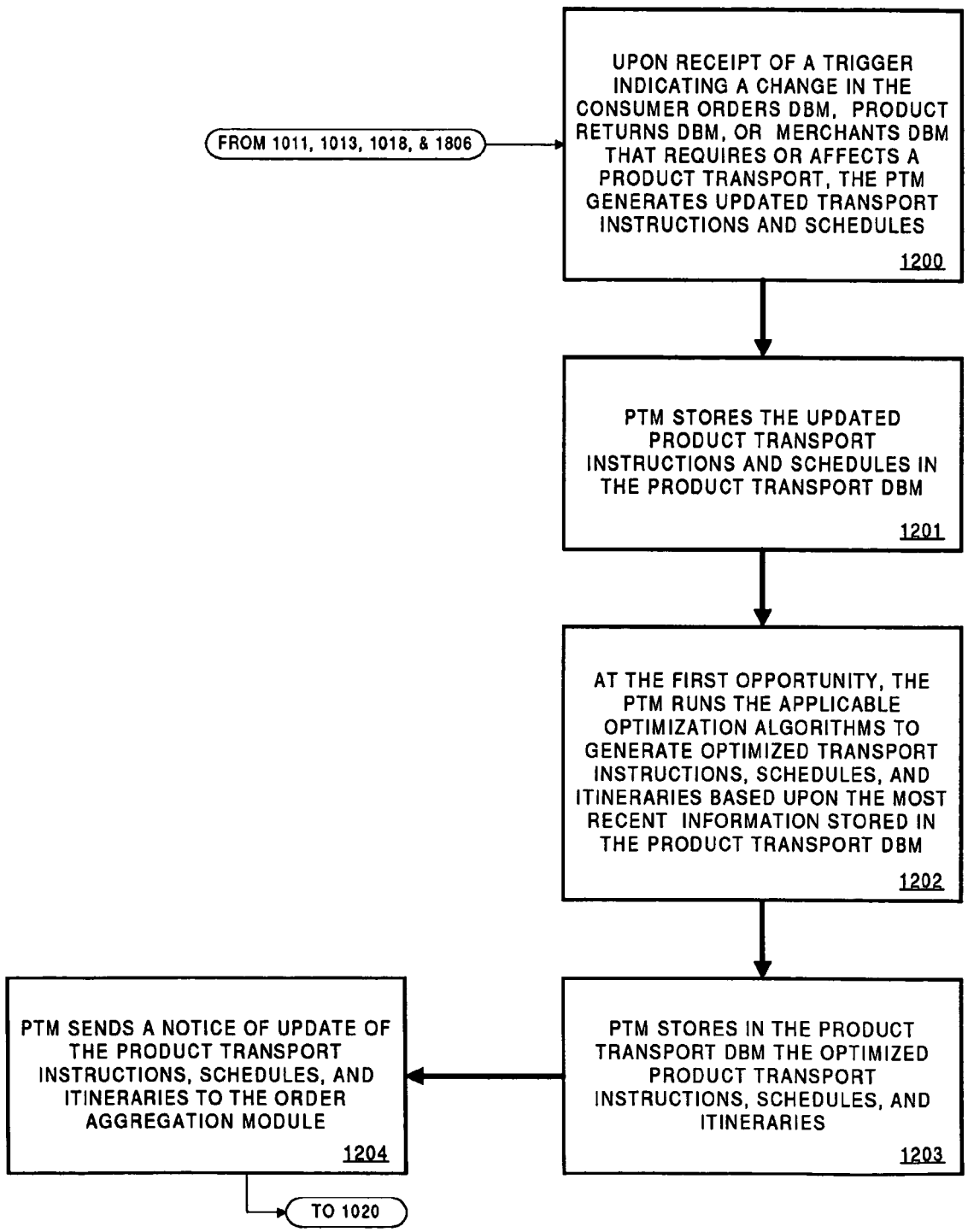
FIG. 12 illustrates a process preferably performed by the Product Transport Module.

FIG. 12 illustrates the flowchart of a preferred process by which the Product Transport Module (PTM) 217 can be configured to generate product transport instructions, schedules, and itineraries to control the operation of the PTSS 300. This process is preferably triggered by certain changes in the Consumer Orders DBM 234, in the Product Returns DBM 235, or in the Merchant DBM 240 that indicate the need to update product transport instructions, schedules, and itineraries.

Figure 18:
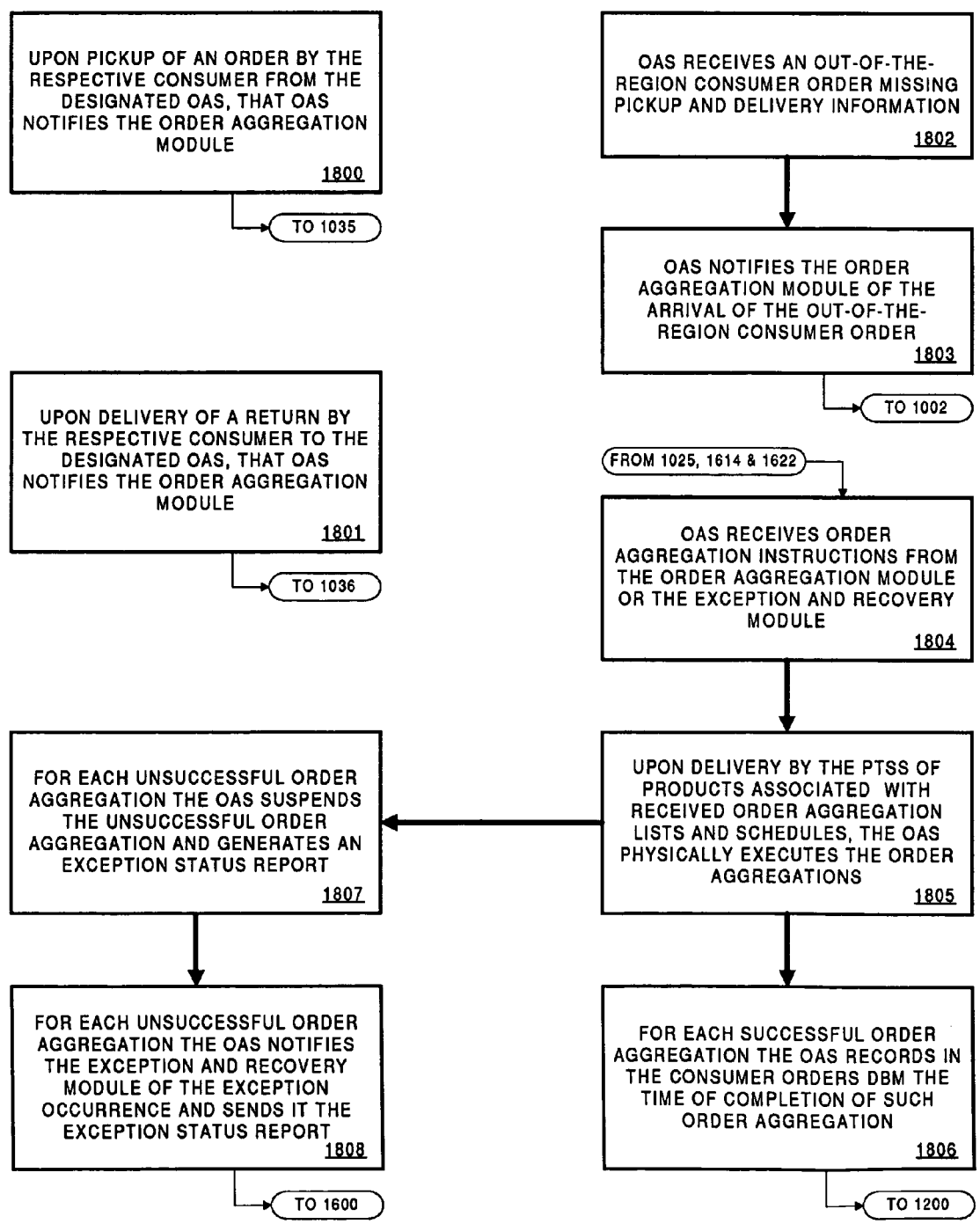
FIG. 18 illustrates processes preferably performed by the Order Aggregation Site.

At step 1200, upon receipt of a trigger indicating a change in the Consumer Orders DBM 234, Product Returns DBM 235, or Merchant DBM 240 that requires or affects a product transport, the PTM 217 generates updated transport instructions and schedules. The receipt in the step 1200 by the PTM 217 corresponds to transmissions by the OAM 215 in steps 1011, 1013 and 1018 (FIG. 10B) and by the OAS 400 in step 1806 (FIG. 18). At step 1201, the PTM 217 stores the updated product transport instructions and schedules in the Product Transport DBM 237. At step 1202, preferably at the first opportunity, the PTM 217 runs the applicable optimization algorithms to generate optimized transport instructions, schedules, and itineraries based upon the most recent information stored in the Product Transport DBM 237. At step 1203, the PTM 217 stores in the Product Transport DBM 237 the optimized product transport instructions, schedules, and itineraries. At step 1204, the PTM 217 sends a notice of update of the product transport instructions, schedules, and itineraries to the OAM 215.

8. Customer Service Module

Figure 13A:
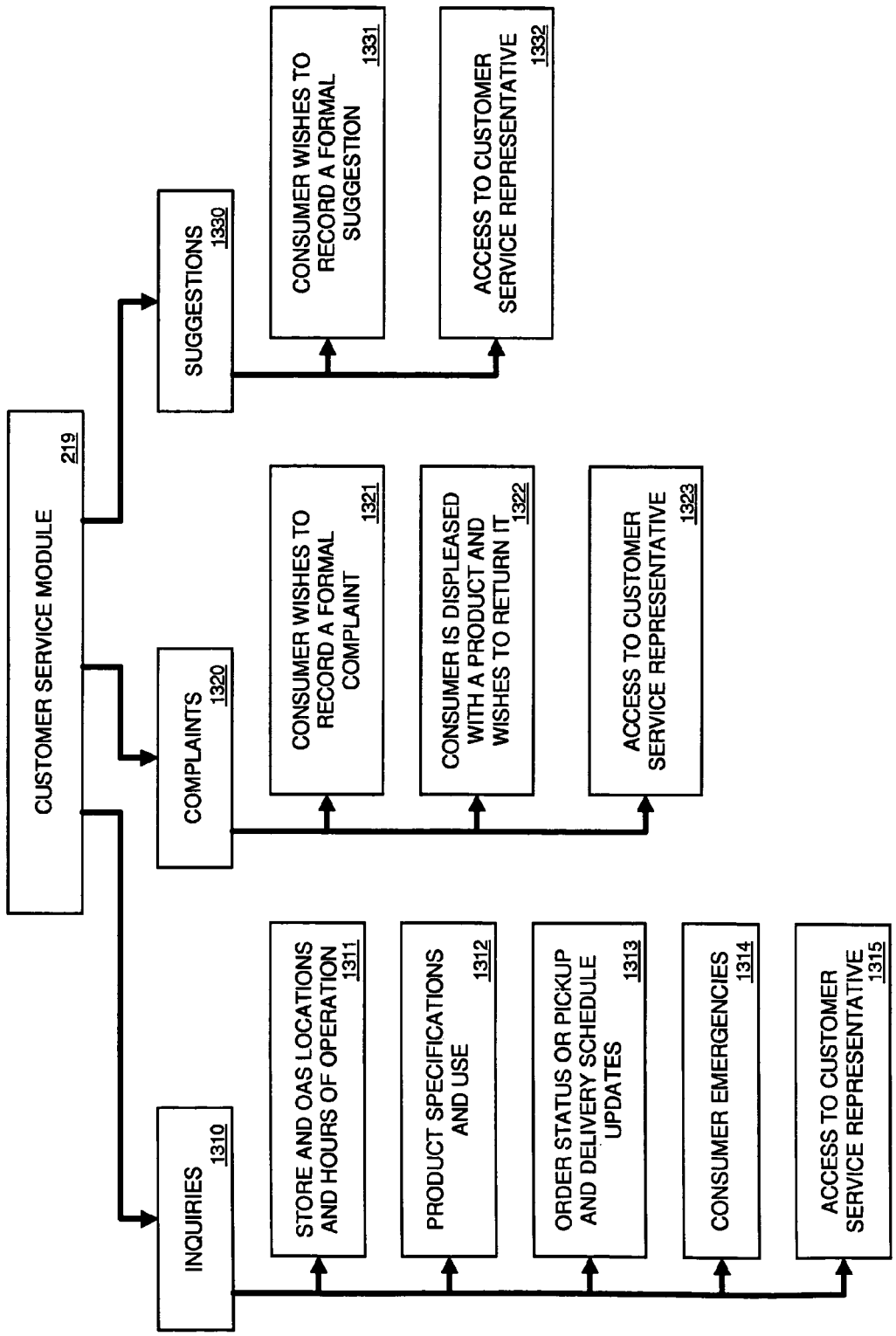
FIG. 13A illustrates a preferred configuration of the Customer Service Module.

FIG. 13A is a diagram showing how the Customer Service Module (CSM) 219 can be configured to provide efficient and cost-effective customer service to Consumers 120. The CSM 219 is preferably subdivided in three sections designated as inquiries 1310, complaints 1320, and suggestions 1330.

The inquiries 1310 section can include the following distinct types of inquiries:

(1) Store and OAS locations and hours of operation 1311.

(2) Product specifications and use 1312.

(3) Order status or pickup and delivery schedule updates 1313.

(4) Consumer emergencies 1314.

(5) Access to customer service representative 1315.

The complaints 1320 section can include the following distinct types of complaints:

(1) Consumer wishes to record a formal complaint 1321.

(2) Consumer is displeased with a product and wishes to return it 1322.

(3) Access to customer service representative 1323.

The suggestions 1330 section can include the following distinct types of suggestions:

(1) Consumer wishes to record a formal suggestion 1331.

(2) Access to customer service representative 1332.

The cases represented by blocks: 1311-1313, 1321-1322, and 1331 can be automated through a web site or a telephone answering system. The case represented by block 1314 is preferably directed to an emergency response center that can respond to consumer emergencies by linking the Consumer 120 with an emergency representative within a configurable time window such as 60 seconds, for example.

The cases represented by blocks 1315, 1323, and 1332 require human intervention and can be serviced by a customer service representative qualified in the respective section of the Customer Service Module (CSM) 219. Preferably, customer service representatives that provide technical support are organized in teams of experts whereby each team specializes in at least one category of products or equipment. Since different brands of a given category of products or equipment tend to share many similarities, it is cost-effective to cross train support technicians to support a variety of brands. The VIMS 200 can provide a special applications program to coordinate the operation of collaborative Virtual Technical Support Centers, whereby a plurality of participating providers of product and equipment share a pool of technical support technicians. The larger the number of participants the more efficient and cost-effective the system will be. The technicians need not be all at one central location. Instead, through the use of Internet and voice communication technologies, Virtual Technical Support Centers can be deployed whereby the technicians can be physically distributed over a plurality of geographic locations. The coordination of the operation of such Virtual Technical Support Centers can be performed by the CSM 219 in accordance with the process outlined below with reference to FIG. 13B.

In the past, access to customer service has used various conventional approaches such as regular mail, facsimile, electronic mail, instant messaging, and initiating a phone call to a customer service center. An alternate approach is by appointment.

According to one embodiment of the present invention, access to customer service by appointment is preferably facilitated through an Internet based system that schedules customer service communications. This system hosts a CSM 219 web site through which the user can schedule an appointment to communicate with a customer service representative. The user accesses the web site through a web browser running on a user computer capable of accessing and displaying web pages. The user computer can be, for example, a personal computer, a palmtop device configured with a web browser, or a wireless device that may access web pages using Wireless Applications Protocol (WAP). The CSM 219 web site can provide web pages where the user can be guided through a few simple steps to select a convenient time slot and the option of initiating or receiving a call at the selected time. After completing these steps the consumer can be guaranteed contact with a customer service representative within a narrow window of the selected time such as 60 seconds, for example.

Figure 13B:
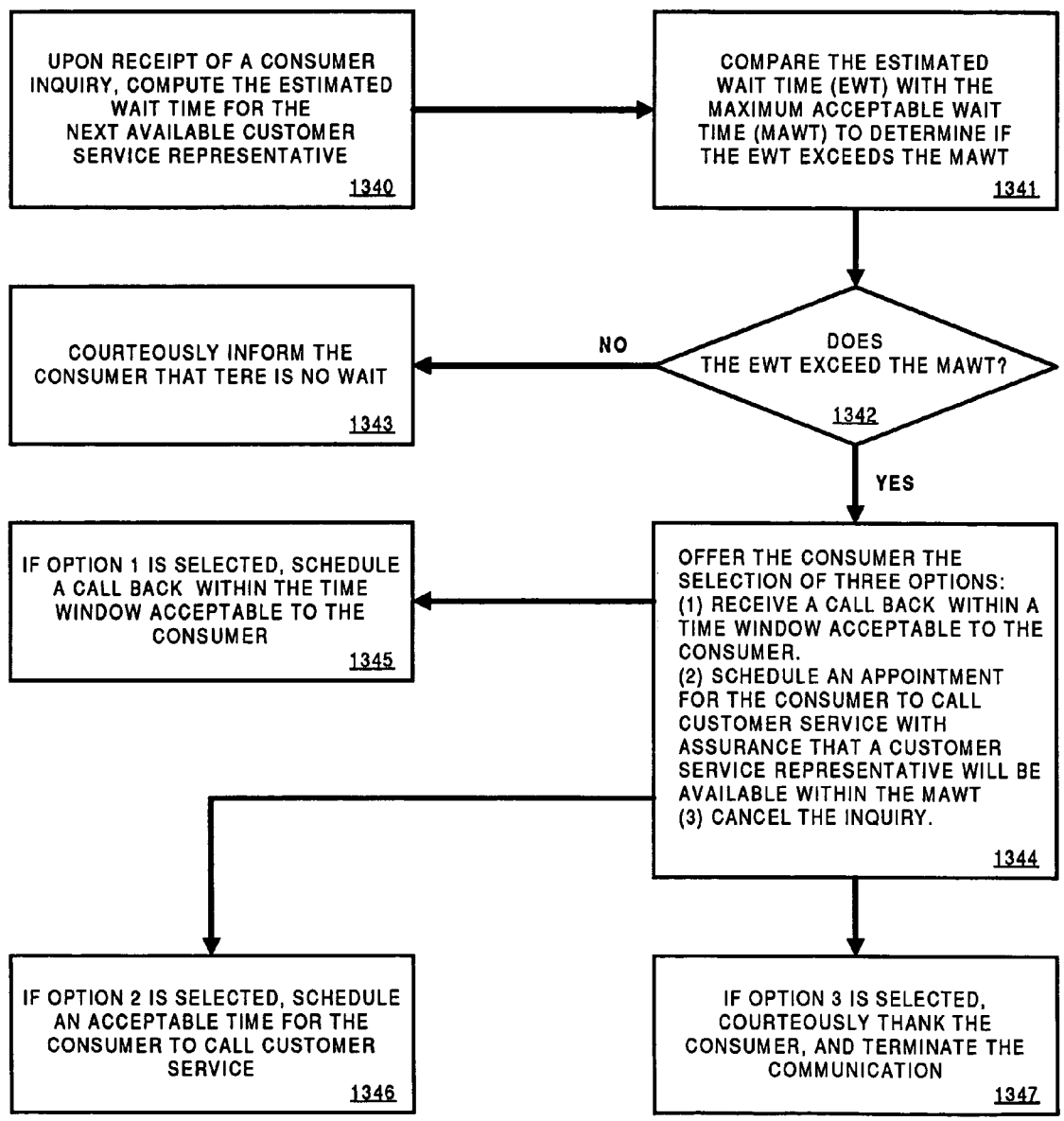
FIG. 13B illustrates a process preferably performed by the Customer Service Module.

To coordinate and optimize customer service appointments, the Customer Service Module 219 can use a scheduling and optimizing algorithm. A preferred process describing this type of algorithm is shown in FIG. 13B with reference to steps 1340-1347. The algorithm uses two parameters for its operation. The first, called the Estimated Wait Time (EWT), represents the estimated time until a customer service representative is next available. The second, called the Maximum Acceptable Wait Time (MAWT), is a configurable parameter to express the maximum time a user may have to wait before obtaining access to a customer service representative. The MAWT can be set at 1 minute, for example.

The scheduling and optimizing algorithm can be configured with two customer service representative response-queues. The first can be a fast-response-queue, where the MAWT is set to a very small value, such as one minute, for example. The second can be a standard-response-queue, where the MAWT is set to a very large value, such as one hour, for example. According to this invention, the number of representatives assigned to the fast-response-queue is dynamically adjusted, as needed, to maintain the MAWT within specification. This dynamic adjustment reduces potential deviations between the actual wait time and the EWT to a level where it becomes possible to schedule the fast-response-queue within the specified MAWT. Such dynamic adjustment can be implemented by a reallocation of the available personnel between the fast-response-queue and the standard-response-queue. When the fast-response-queue needs additional representatives it takes them from the standard-response-queue. Naturally, this makes the standard-response-queue slower, which will encourage the Consumers 120 to preferentially select the option of scheduling an appointment versus placing a conventional phone call to a customer service center. A positive effect of this strategy is that the scheduling algorithm becomes more efficient as more Consumers 120 select the option of scheduling appointments.

At step 1340, upon receipt of a consumer inquiry, the Customer Service Module 219 computes the Estimated Wait Time (EWT). Specialized algorithms for performing such computation are well understood by those skilled in the art and will not be further described.

At step 1341, the Customer Service Module 219 compares the EWT with the MAWT to determine if the EWT exceeds the MAWT. At step 1342, the Customer Service Module 219 analyses the outcome of the comparison to determine if the EWT exceeds the MAWT. If step 1341 is not affirmative, at step 1343 the Customer Service Module 219 courteously informs the Consumer 120 that there is no wait. If step 1341 is affirmative, the process preferably continues with step 1344.

At step 1344, the Customer Service Module 219 offers the Consumer 120 the following options:

(1) Receiving a call back from a customer service representative within a time window of a target time acceptable to the Consumer 120. Such time window can be specified by a beginning time and an ending time or by a beginning time and a time span. The target times and the time window can be specified in configurable time increments. For example, the Customer Service Module 219 can set the time increment to 5 minutes and the time window to 2 minutes. With such settings a consumer could select call back times in 5-minute increments, such as 10:35 AM, 10:40 AM, 10:45 AM, etc. and expect a call back within 2 minutes of the selected time.

(2) Scheduling an appointment whereby the Consumer 120 would select a convenient time to call customer service with assurance of having a customer service representative available within the MAWT. When the consumer schedules the appointment, the CSM 219 scheduling web page can interactively provide the consumer a reference code. Later, when the consumer calls customer service at the scheduled time, the reference code is used to link the consumer to a customer service representative in accordance with the scheduled appointment. The reference code can be communicated through the phone keypad or a voice recognition system.

(3) Canceling the inquiry.

If option (1) is selected, at step 1345 the Customer Service Module 219 schedules a call back by a customer service representative within the time window selected by the Consumer 120.

If option (2) is selected, at step 1346 the Customer Service Module 219 schedules an appointment for the Consumer 120 to call customer service. Under this option, the appointment time window can be selected by the Consumer 120, subject to the availability determined by the scheduling algorithm.

If option (3) is selected, at step 1347 the Customer Service Module 219 courteously thanks the Consumer 120 and terminates the communication.

9. Statistical Analysis Module

Figure 14:
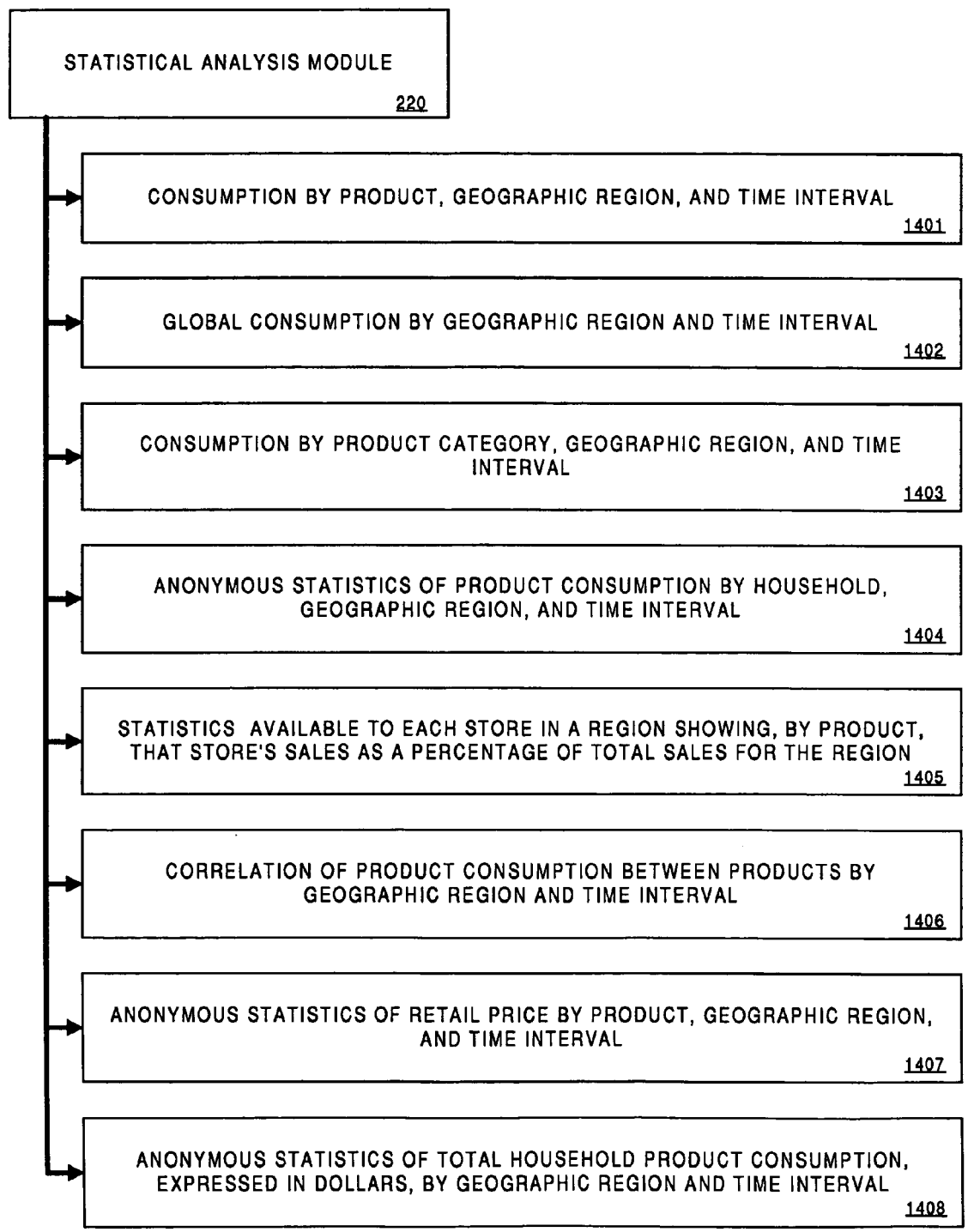
FIG. 14 illustrates a preferred configuration of the Statistical Analysis Module.

FIG. 14 is a diagram showing how the Statistical Analysis Module (SAM) 220 can be configured to provide a service for the benefit of Inventory Providers 130, Retailers 110, economic research organizations, government agencies interested in product consumption and pricing data, etc.

For example, the SAM 220 can be subdivided into 8 statistical analysis categories as follows:

(1) Consumption by product, geographic region, and time interval 1401.

(2) Global consumption by geographic region and time interval 1402.

(3) Consumption by product category, geographic region, and time interval 1403.

(4) Anonymous statistics of product consumption by household, geographic region, and time interval 1404.

(5) Statistics available to each Retailer in a region showing, by product, that Retailer's sales as a percentage of total sales for the region 1405.

(6) Correlation of product consumption between products by geographic region and time interval 1406.

(7) Anonymous statistics of retail price by product, geographic region, and time interval 1407.

(8) Anonymous statistics of total household product consumption, expressed in dollars, by geographic region and time interval 1408.

The configuration of the SAM 220 presented above and shown in FIG. 14 is to be understood as merely illustrative and not restrictive on the many other possible configurations or statistical analyses that may be performed on the data collected by the VIMS 200 by different implementations of this invention.

10. Accounting and Billing Module

Figure 15:
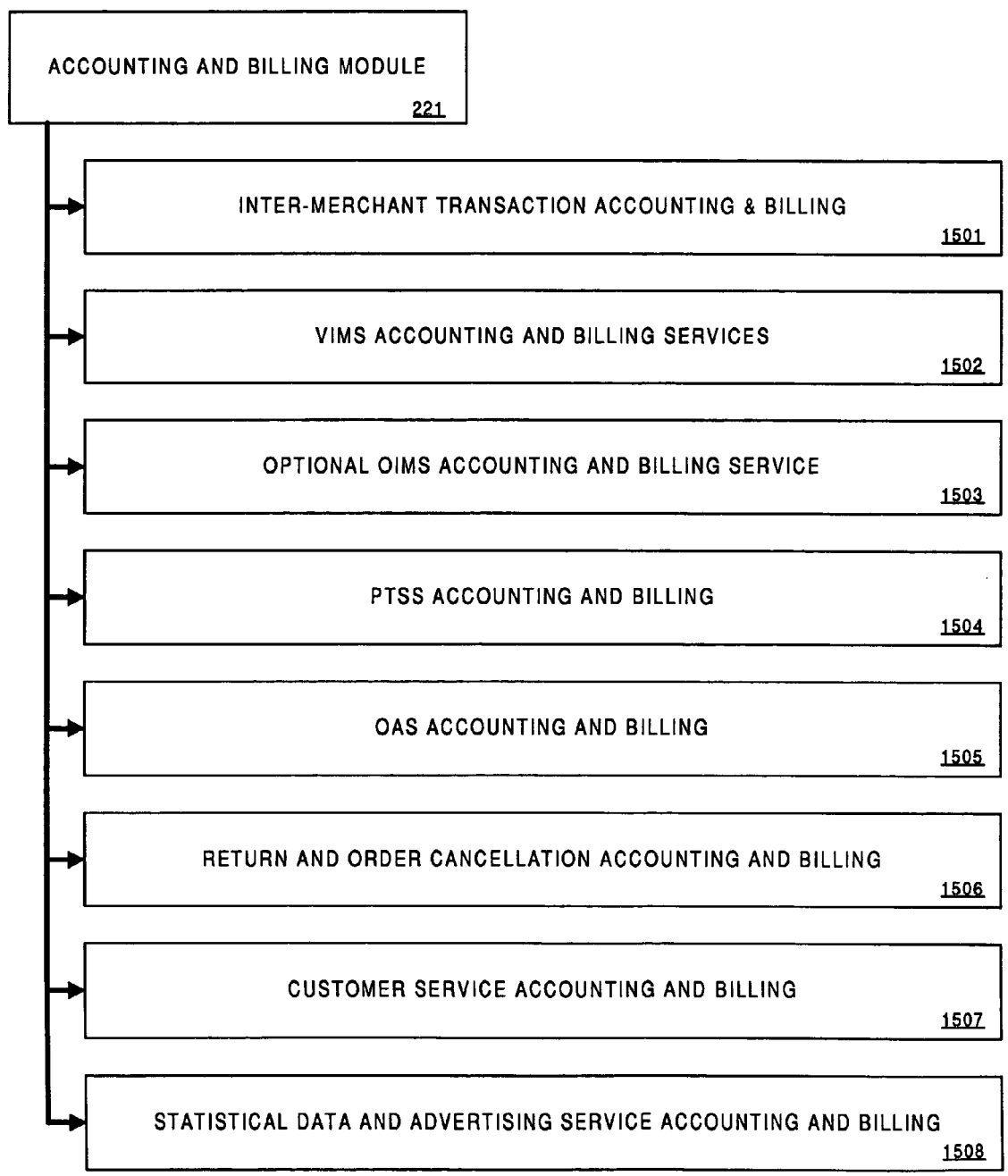
FIG. 15 illustrates a preferred configuration of the Accounting and Billing Module.

FIG. 15 illustrates how the Accounting and Billing Module (ABM) 221 can be configured to support the operation of the PDMS 100.

For example, the ABM 221 can be subdivided into the 8 following sections:

(1) Inter-merchant transaction accounting and billing 1501—applicable to participating merchants.

(2) VIMS accounting and billing services 1502—reflecting the allocation of charges and credits to participating merchants.

(3) Optional OIMS accounting and billing service 1503—applicable to those merchants electing to have the PDMS 100 provide these services.

(4) PTSS accounting and billing 1504—applicable to each merchant participating in the PDMS 100.

(5) OAS accounting and billing 1505—providing allocation of charges to each merchant participating in the PDMS 100.

(6) Return and order cancellation accounting and billing 1506—for credits and debits applicable to each merchant participating in the PDMS 100.

(7) Customer service accounting and billing 1507—providing allocation of charges to each merchant for the operation of the CSM 219.

(8) Statistical data and advertising service accounting and billing 1508—charged to those entities using these services.

The configuration of the ABM 221 presented above and shown in FIG. 15 is to be understood as merely illustrative and not restrictive on the many other possible configurations that may be used by different implementations of this invention.

11. Exception and Recovery Module

Figure 16A:
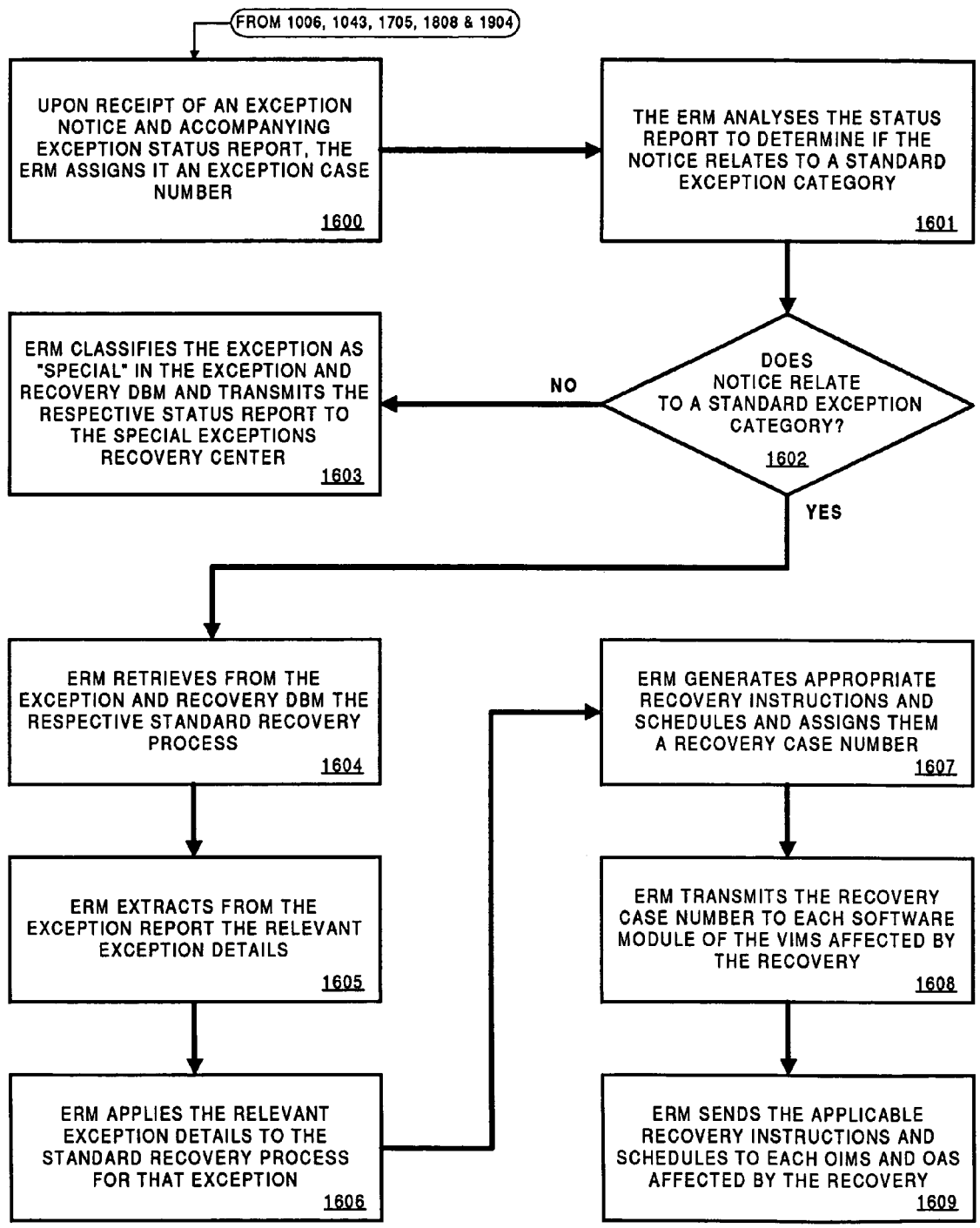
FIGS. 16A-C illustrate processes preferably performed by the Exception and Recovery Module.

FIG. 16A illustrates a general flowchart for a preferred process by which the Exception and Recovery Module (ERM) 218 can be configured to coordinate the recovery from exception conditions that may occur during the operation of the PDMS 100. Exception conditions are typically the result of accidents, delays, negligence, misunderstandings, or other unexpected events likely to disrupt normal operation of the PDMS 100.

Preferably, the ERM 218 classifies exceptions in two categories: those for which a standard procedure can be used for recovery, called "standard exceptions"; and those due to unusual circumstances for which human intervention is required for recovery, called "special exceptions."

Preferably the standard exceptions are listed in a library of standard exceptions in the Exception and Recovery DBM 241. For each standard exception, a standard recovery process specifically designed for that exception is also preferably stored in the Exception and Recovery DBM 241. This configuration allows the ERM 218 to respond to standard exceptions without human intervention. Preferably, the standard exception library is configured to cover the majority of exceptions encountered in most implementations of the PDMS 100, thus reducing overhead costs. To recover from special exceptions, the ERM 218 preferably uses a special-exceptions-recovery-center staffed with trained experts that use their best judgment to determine for each special exception an appropriate recovery process. Preferably, the special-exceptions-recovery-center should serve a large territory, if not the entire country, to take advantage of economies of scale and operate at the highest level of efficiency.

Figure 19A:
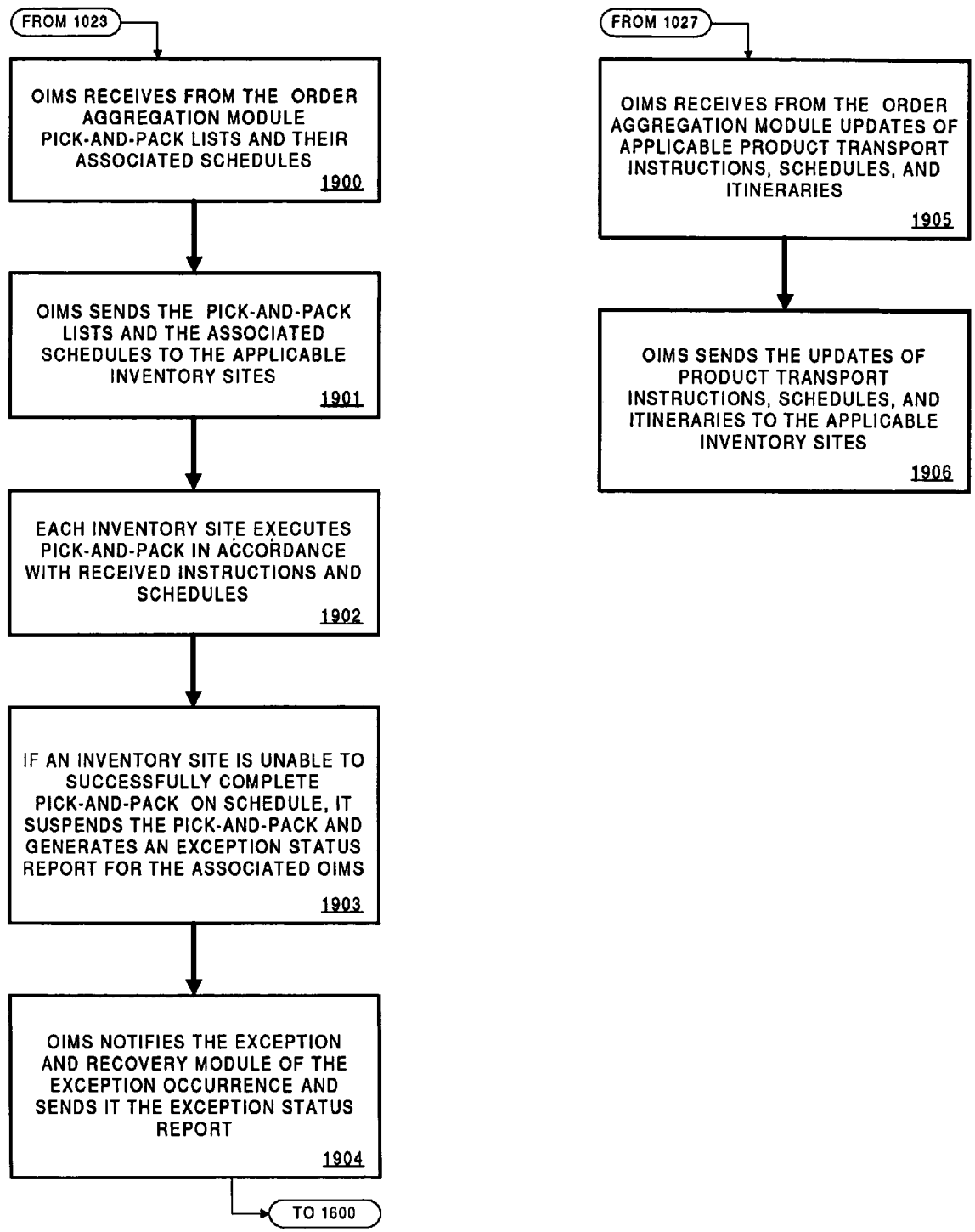
FIGS. 19A-B illustrate processes preferably performed by the Order and Inventory Management System.

With reference to FIG. 16A, at step 1600, upon receipt of an exception notice and accompanying exception status report, the ERM 218 assigns it an exception case number. The receipt in the step 1600 by the ERM 218 corresponds to transmissions by the OAM 215 in steps 1006 (FIG. 10A) and 1043 (FIG. 10E), the PTSS 300 in step 1705 (FIG. 17), the OAS 400 in step 1808 (FIG. 18) and the OIMS 111 in step 1904 (FIG. 19A). At step 1601, the ERM 218 analyzes the status report to determine if the notice relates to a standard exception category.

At step 1602 the outcome of the analysis is established. If step 1602 is not affirmative, at step 1603, the ERM 218 classifies the exception as "special" in the Exception and Recovery DBM 241 and transmits the respective status report to the special-exceptions-recovery-center for human intervention.

If step 1602 is affirmative, the process preferably continues with step 1604. At step 1604, the ERM 218 retrieves from the Exception and Recovery DBM 241 the respective standard recovery process. At step 1605, the ERM 218 extracts from the exception report the relevant exception details. At step 1606, the ERM 218 applies the relevant exception details to the standard recovery process for that exception. At step 1607, the ERM 218 generates appropriate recovery instructions and schedules and assigns them a recovery case number. At step 1608, the ERM 218 transmits the recovery case number to each software module of the VIMS 200 affected by the recovery. At step 1609, the ERM 218 sends the applicable recovery instructions and schedules to each OIMS 111 and OAS 400 affected by the recovery, thus completing the recovery process.

Figure 16B:
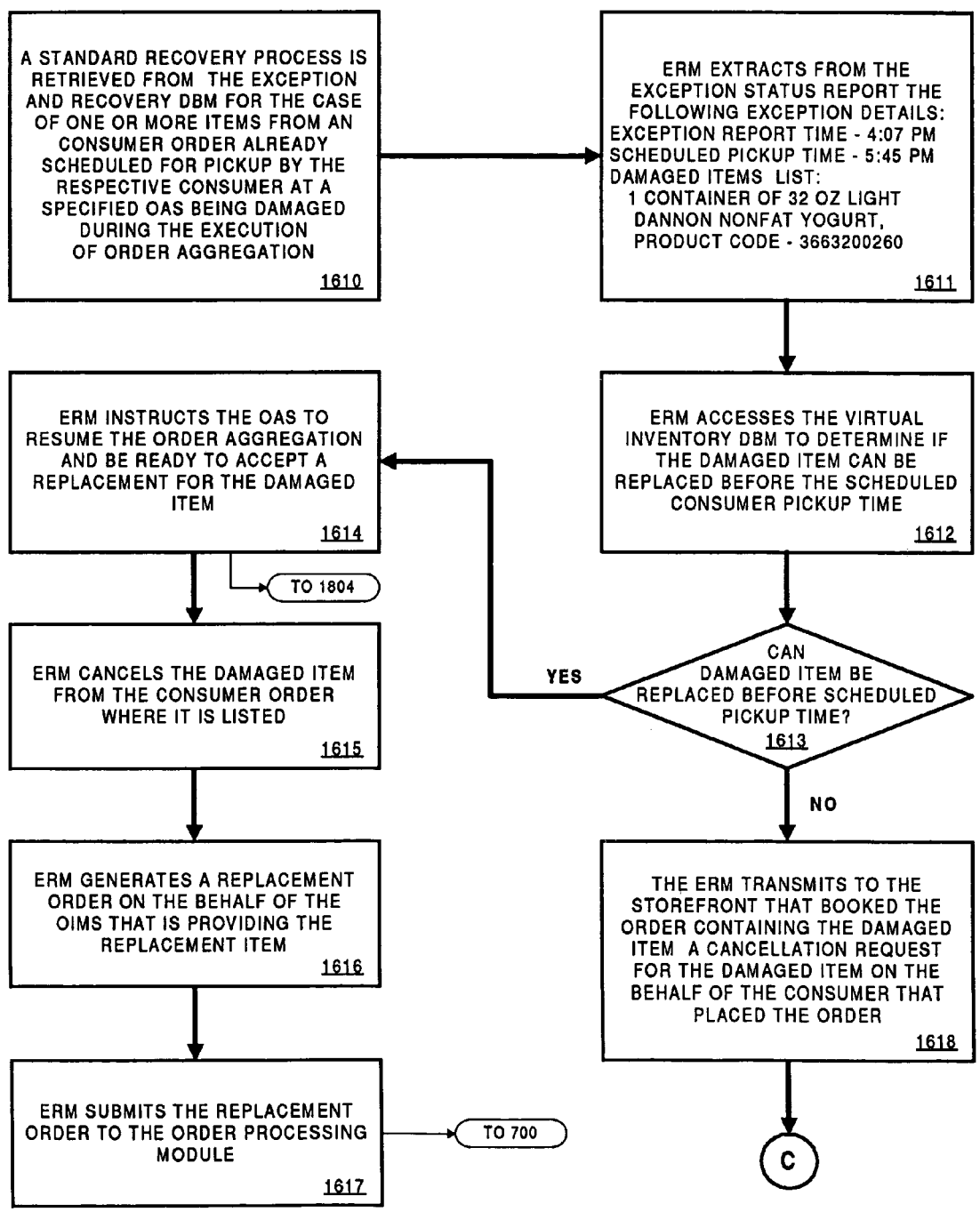
Figure 16C:
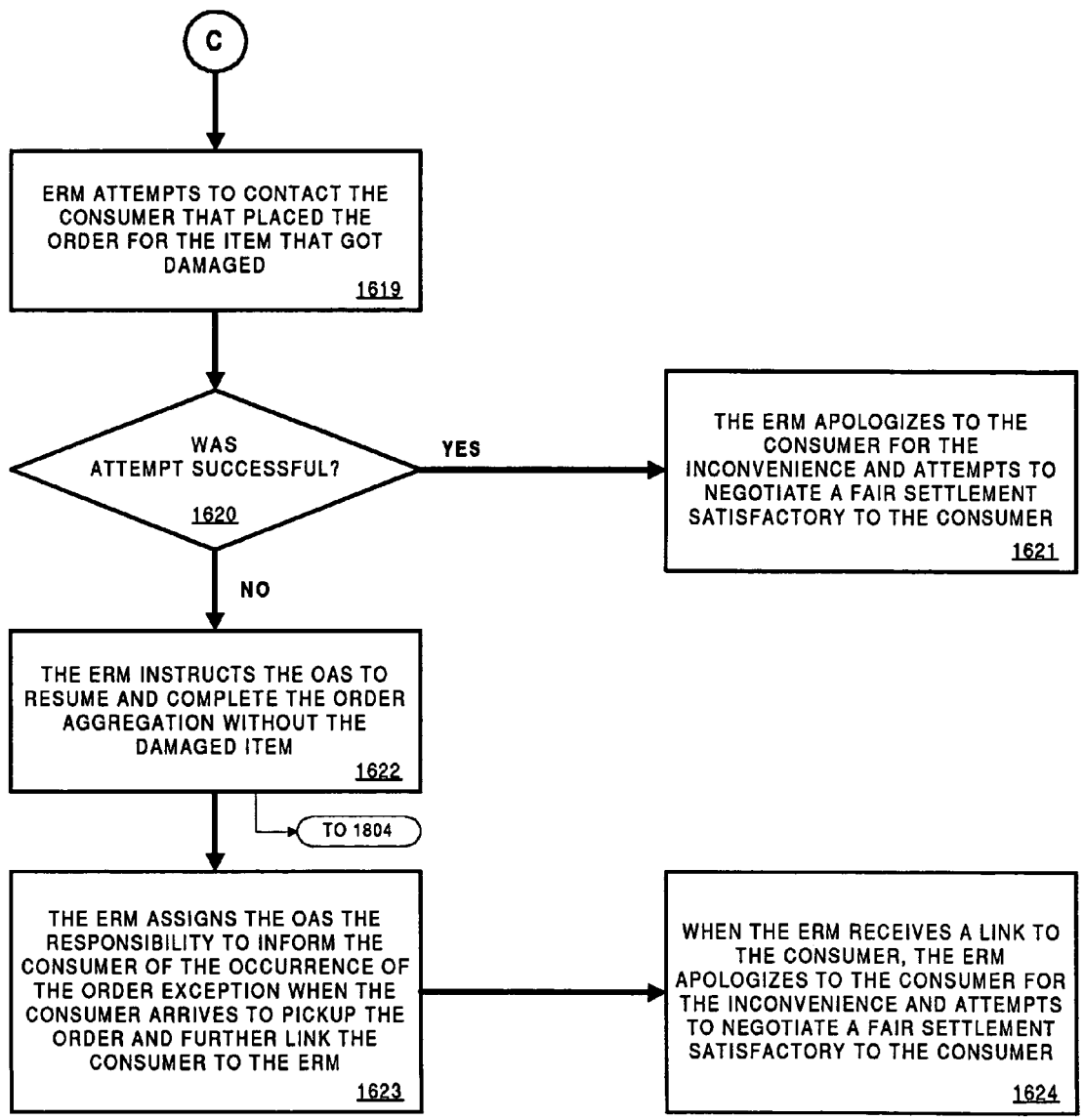

FIGS. 16B and 16C show the flowchart for an example process that illustrates the operation of the ERM 218 in the case of a standard exception. For purposes of the example, assume the following exception status report is received from a specific OAS 400 in connection with exception case number 7,621,839:

Exception report time—4:07 PM.
Scheduled pickup time—5:45 PM.
Damaged items list: 1-quart container of Light Dannon nonfat yogurt, Product code—3663200260.

Upon receipt of the exception report, the ERM 218 analyzes the Exception and Recovery DBM 241 to identify the standard exception applicable to this specific case. The applicable case pertains to one or more items from a consumer order already scheduled for pickup by the respective Consumer 120, being damaged during the execution of order aggregation. For further purposes of illustration, assume the exception in this example is covered by standard exception 2435E for which the standard recovery process is 2435R.

At step 1610, in response to standard exception 2435E, standard recovery process 2435R is retrieved from the library. At step 1611, the ERM 218 extracts the details from the exception status report and applies them to the standard recovery process 2435R.

At step 1612, the ERM 218 accesses the Virtual Inventory DBM 231 to determine if the damaged item can be replaced before the scheduled consumer pickup time. If step 1613 is affirmative, the process continues with step 1614. At step 1614, the ERM 218 instructs the OAS 400 to resume the Order Aggregation and be ready to accept a replacement for the damaged item. At step 1615, the ERM 218 cancels the damaged item from the consumer order where it is listed. At step 1616, the ERM 218 generates a replacement order for the damaged item on behalf of the OIMS 111 that is providing the replacement item. At step 1617, the ERM 218 submits the replacement order to the OPM 212, thus completing the recovery process in the case where the damaged item can be replaced before the scheduled consumer pickup time.

If step 1613 is not affirmative, the process preferably continues with step 1618. At step 1618, the ERM 218 transmits to the Storefront 113 that booked the order containing the damaged item a cancellation request for the damaged item on behalf of the consumer that placed the order. At step 1619, the ERM 218 attempts to contact the Consumer 120 that placed the order for the damaged item.

At step 1620, if the attempt to contact the consumer is successful the process continues with step 1621. At step 1621, the ERM 218 apologizes to the Consumer 120 for the inconvenience and attempts to negotiate a fair settlement satisfactory to the Consumer 120. Step 1621 completes the recovery process in the case where the damaged item cannot be replaced before the scheduled consumer pickup time but an attempt to reach the Consumer 120 is successful.

At step 1620, if the attempt to contact the consumer is not successful the process continues with step 1622. At step 1622, the ERM 218 instructs the OAS 400 to resume and complete the Order Aggregation without the damaged item. At step 1623, the ERM 218 assigns the OAS 400 the responsibility to inform the Consumer 120 of the occurrence of the order exception when the Consumer 120 arrives to pickup the order and further link the Consumer 120 to the ERM 218. At step 1624, when the ERM 218 receives a link to the Consumer 120, the ERM 218 apologizes to the Consumer 120 for the inconvenience and attempts to negotiate a fair settlement satisfactory to the Consumer 120. Step 1624 completes the recovery process in the case where the damaged item cannot be replaced before the scheduled consumer pickup time and an attempt to reach the Consumer 120 before pickup time is unsuccessful.

C. Operation of the Product Transport Support Service

Figure 17:
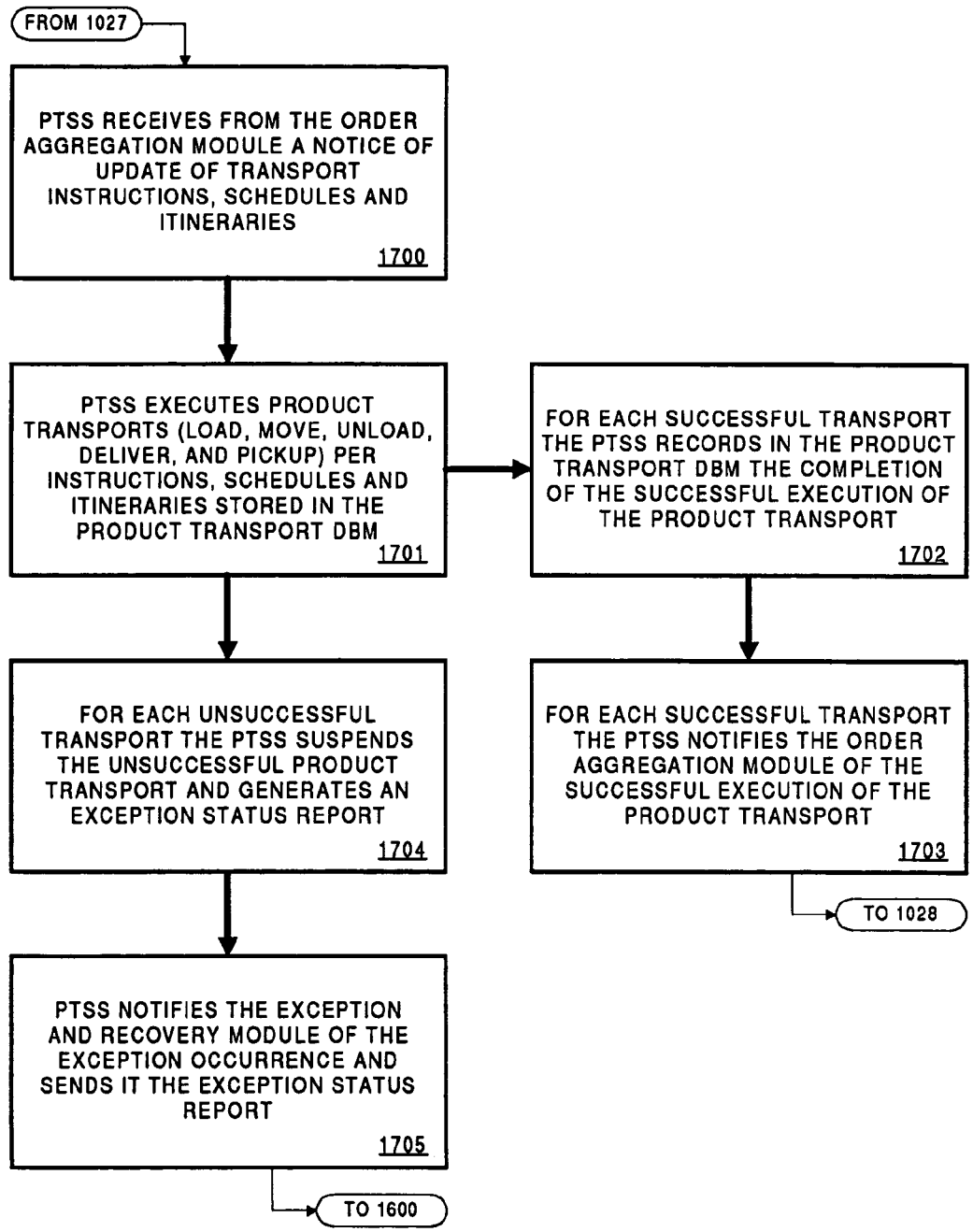
FIG. 17 illustrates a process preferably performed by the Product Transport Support Service.

FIG. 17 illustrates the flowchart for a preferred process by which the Product Transport Support Service (PTSS) 300 can be configured to execute the transport of products in accordance with instructions, schedules, and itineraries preferably stored in the Product Transport DBM 237.

At step 1700, the PTSS 300 receives from the OAM 215 a notice of update of transport instructions, schedules, and itineraries. The receipt in the step 1700 by the PTSS 300 corresponds to the transmission in the step 1027 (FIG. 10C) by the OAM 215. At step 1701, the PTSS 300 retrieves from the Product Transport DBM 237 updated instructions, schedules, and itineraries and executes the transport of products—load, move, unload, deliver, and pickup—in accordance with such instructions, schedules, and itineraries. At this step, there are two possible outcomes for each product transport. The product transport may be successful, which causes the process to continue with step 1702; or the product transport may be unsuccessful, which causes the process to continue with step 1704.

At step 1702, for each successful transport the PTSS 300 records in the Product Transport DBM 237 the completion of the successful transport of products. At step 1703, for each successful transport the PTSS 300 notifies the OAM 215 of the successful product transport.

At step 1704, for each unsuccessful transport the PTSS 300 suspends the unsuccessful product transport and generates an exception status report. At step 1705, the PTSS 300 notifies the ERM 218 of the exception and sends it the exception status report.

D. Operation of the Order Aggregation Site

FIG. 18 illustrates the flowchart for a preferred process by which an Order Aggregation Site 400 can be configured to perform its operations under the coordination of the OAM 215. Steps 1800 and 1801 are single-step processes, steps 1802 and 1803 represent a two-step process, and steps 1804-1808 represent a five-step process. Each process is triggered by the occurrence of an event unique to that process.

At step 1800, upon pickup of an order by the respective Consumer 120 from the designated OAS 400, that OAS 400 notifies the OAM 215.

At step 1801, upon delivery of a return by the respective Consumer 120 to the selected OAS 400, that OAS 400 notifies the OAM 215.

At step 1802, the OAS 400 receives an out-of-the-region consumer order lacking pickup and delivery information. At step 1803, the OAS 400 notifies the OAM 215 of the arrival of the out-of-the-region consumer order.

At step 1804, the OAS 400 receives Order Aggregation instructions from the OAM 215 or from the Exception and Recovery Module (ERM) 218. The aggregation instructions received from the OAM 215 consist, in most part, of lists and schedules for the aggregation of consumer orders in accordance with the normal functions performed by an OAS 400. The aggregation instructions received from the ERM 218 consist of occasional updates or changes that may be required for the recovery of an exception condition. The receipt in the step 1804 by the OAS 400 corresponds to the transmissions in the step 1025 (FIG. 10C) by the OAM 215, and steps 1614 (FIG. 16B) and 1622 (FIG. 16C) by the ERM 218. At step 1805, upon delivery by the PTSS 300 of the products associated with the Order Aggregation lists and schedules received from the OAM 215, the OAS 400 executes the physical order aggregations. The order aggregations may be successful which causes the process to continue with step 1806, or the order aggregations may be unsuccessful which causes the process to continue with step 1807.

At step 1806, for each successful order aggregation, the OAS 400 records in the Consumer Orders DBM 234 the time of completion of such order aggregation.

At step 1807, for each unsuccessful order aggregation, the OAS 400 suspends the unsuccessful Order Aggregation and generates an exception status report. At step 1808, for each unsuccessful order aggregation, the OAS 400 notifies the ERM 218 of the exception and sends it the exception status report.

E. Operation of the Order and Inventory Management System

Figure 19B:
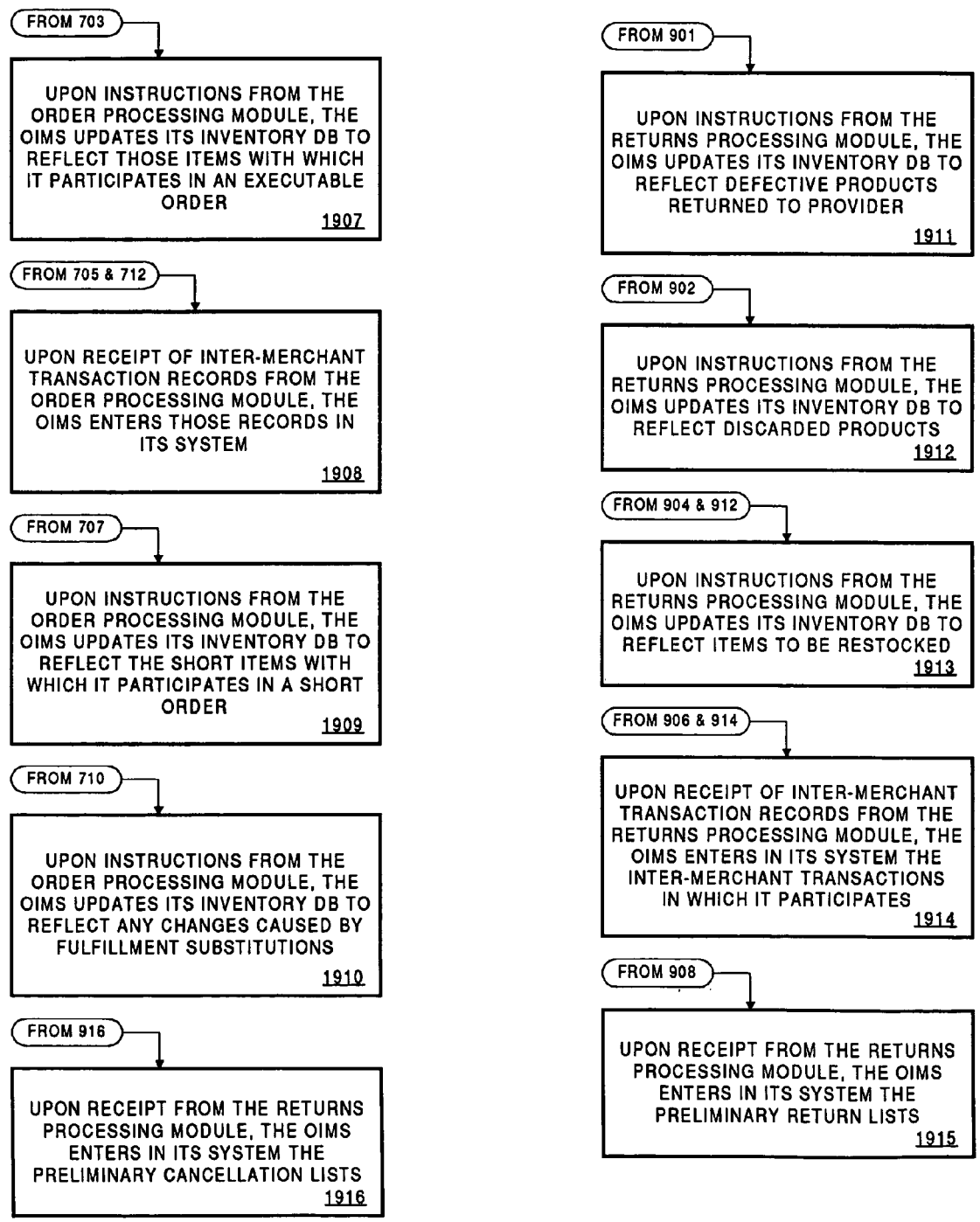

FIGS. 19A and 19B illustrate the flowcharts for preferred processes by which the Order and Inventory Management System 111 of each participating merchant can be configured to benefit from the advantages offered by the PDMS 100. Steps 1900-1904 describe a process for coordinating pick-and-pack operations. Steps 1905-1906 describe a two-step process for coordinating schedules. The remaining steps, 1907-1916, are single-step processes triggered by the occurrence of an event unique to the corresponding step.

At step 1900, an OIMS 111 receives from the OAM 215 pick-and-pack lists and their associated schedules. The receipt in the step 1900 by the OIMS 111 corresponds to the transmission in the step 1023 (FIG. 10C) by the OAM 215. At step 1901, the OIMS 111 sends the pick-and-pack lists and their associated schedules to the applicable Inventory Sites 112. At step 1902, each Inventory Site 112 preferably executes the pick-and-pack operations in accordance with the instructions and schedules received from the OAM 215. At step 1903, if an Inventory Site 112 is unable to successfully complete a pick-and-pack operation on schedule, it preferably suspends that pick-and-pack operation and generates an exception status report for the associated OIMS 111. At step 1904, the OIMS 111 notifies the ERM 218 of the exception occurrence and sends it the exception status report.

At step 1905, the OIMS 111 receives from the OAM 215 updates of applicable product transport instructions, schedules, and itineraries. The receipt in the step 1905 by the OIMS 111 corresponds to the transmission in the step 1027 (FIG. 10C) by the OAM 215. At step 1906, the OIMS 111 sends the received updates for the product transport instructions, schedules, and itineraries to the applicable Inventory Sites 112.

At step 1907, upon receipt of instructions from the OPM 212, the OIMS 111 updates its inventory database to reflect those items with which it participates in an executable order. The receipt in the step 1907 by the OIMS 111 corresponds to the transmission in the step 703 (FIG. 7A) by the OPM 212.

At step 1908, upon receipt of inter-merchant transaction records from the OPM 212, the OIMS 111 enters those records in its system. The receipt in the step 1908 by the OIMS 111 corresponds to the transmissions in the steps 705 (FIG. 7A) and step 712 (FIG. 7B) by the OPM 212.

At step 1909, upon receipt of instructions from the OPM 212, the OIMS 111 updates its inventory database to reflect the short items with which it participates in a short order. The receipt in the step 1909 by the OIMS 111 corresponds to the transmission in the step 707 (FIG. 7A) by the OPM 212.

At step 1910, upon receipt of instructions from the OPM 212, the OIMS 111 updates its inventory database to reflect any changes caused by Fulfillment-Substitutions. The receipt in the step 1910 by the OIMS 111 corresponds to the transmission in the step 710 (FIG. 7B) by the OPM 212.

At step 1911, upon receipt of instructions from the RPM 214, the OIMS 111 updates its order management database to reflect defective products returned to the provider. The receipt in the step 1911 by the OIMS 111 corresponds to the transmission in the step 901 (FIG. 9A) by the RPM 214.

At step 1912, upon receipt of instructions from the RPM 214, the OIMS 111 updates its inventory database to reflect discarded products. The receipt in the step 1912 by the OIMS 111 corresponds to the transmission in the step 902 (FIG. 9A) by the RPM 214.

At step 1913, upon receipt of instructions from the RPM 214, the OIMS 111 updates its inventory database to reflect items to be restocked. The receipt in the step 1913 by the OIMS 111 corresponds to the transmissions in the steps 904 (FIG. 9A) and step 912 (FIG. 9B) by the RPM 214.

At step 1914, upon receipt of inter-merchant transaction records from the RPM 214, the OIMS 111 enters in its system the inter-merchant transactions in which it participates. The receipt in the step 1914 by the OIMS 111 corresponds to the transmissions in the steps 906 (FIG. 9A) and step 914 (FIG. 9B) by the RPM 214.

At step 1915, upon receipt of preliminary return lists from the RPM 214, the OIMS 111 enters in its system the preliminary return lists. The receipt in the step 1915 by the OIMS 111 corresponds to the transmission in the step 908 (FIG. 9A) by the RPM 214.

At step 1916, upon receipt of preliminary cancellation lists from the RPM 214, the OIMS 111 enters in its system the preliminary cancellation lists. The receipt in the step 1916 by the OIMS 111 corresponds to the transmission in the step 916 (FIG. 9B) by the RPM 214.

V. EXAMPLE SYSTEM IMPLEMENTATION

Figure 20:
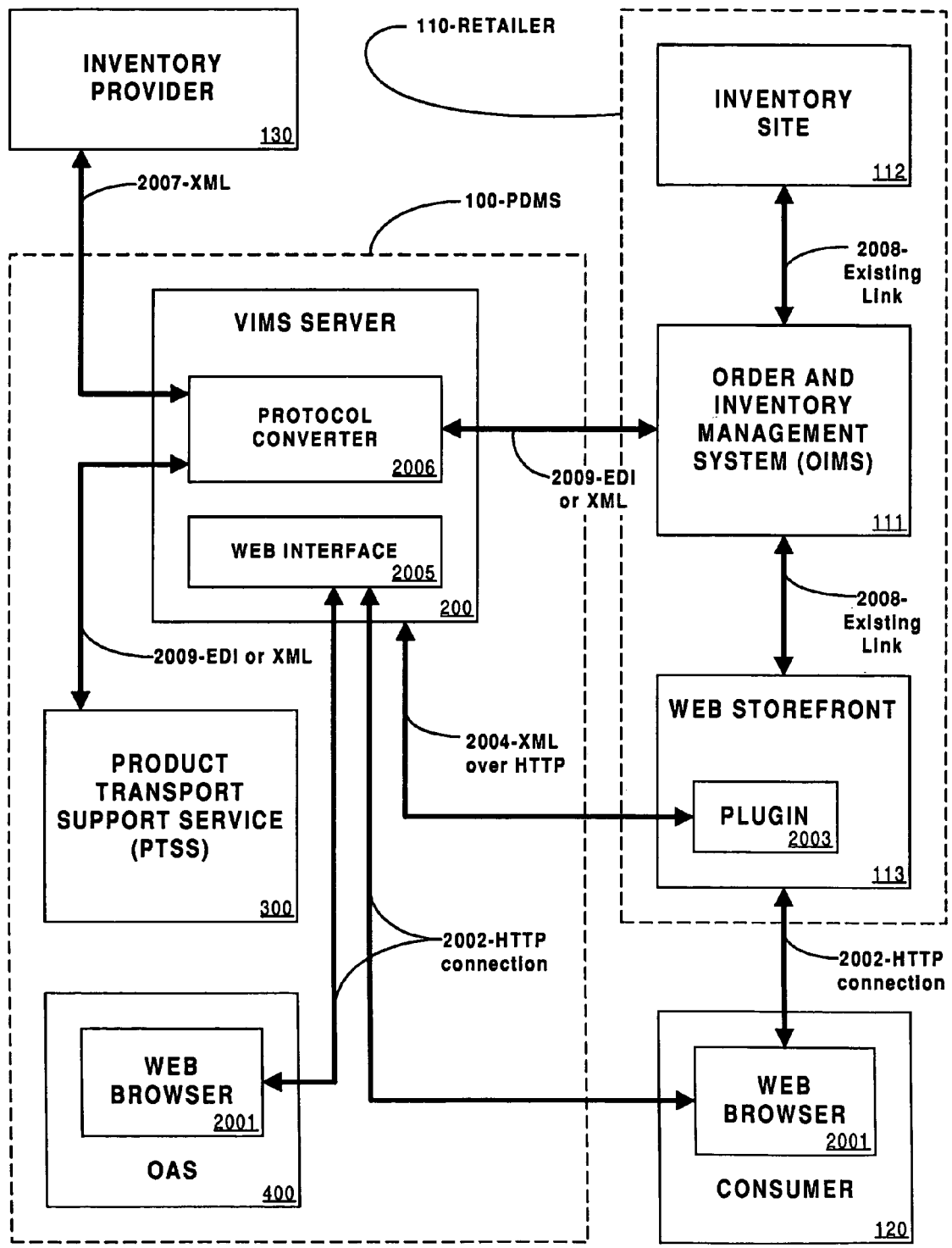
FIG. 20 is a block diagram illustrating an example implementation of the Product Distribution Management System.

This Section describes, with reference to FIG. 20, a set of tools and technologies for an example implementation of this invention as a set of inter-operating data processing systems. It will be understood by those skilled in the art that this is only one of many possible implementations of this invention.

In this example implementation, Consumers 120 use readily available web browsers 2001 such as Netscape Navigator or Internet Explorer to connect to web based Storefronts 113 using an HTTP connection 2002 to place orders, check on order status, request refunds, etc. Consumers can also connect to the VIMS 200 using an HTTP connection 2002 to a web interface 2005 for checking on aggregated orders, updating pickup-and-delivery schedules, accessing customer service, etc. Web based Storefronts 113 can use software such as Microsoft SiteServer, Open Market Transact, or similar systems that are typically employed for such purposes. Web based Storefronts 113 generally have an extensible architecture that allows them to call other servers—for credit card authorization, for example—through a plug-in architecture. In this example implementation, web based Storefronts 113 are equipped with additional plug-ins 2003 that communicate orders to the VIMS 200. Because of the multitude of existing web storefront technologies and the need to implement a multitude of matching plug-ins, preferably this communication uses a well-understood and easily extensible protocol such as XML or CORBA. For illustrative purposes in this example, an XML over HTTP 2004 is employed.

Technologies for implementing transaction logic are readily available. For example, Sun Microsystems produces a set of tools known as the Java 2 Enterprise Edition that allows the implementation of systems that receive service requests via XML or CORBA by using the Java programming language to implement the transaction logic and utilizing databases for storing persistent information.

For purposes such as server load balancing or geographical distribution, the VIMS 200 can be implemented as a set of distributed servers. Such implementations—employing, for example, the Java 2 Enterprise Edition architecture—are well understood by those skilled in the art. For simplicity of exposition, the VIMS 200 is described as conceptually being a single server, leaving it understood that an implementation may choose a distributed solution involving multiple servers.

For ease of transaction tracking, it is preferable that there are unique names for the various participants and transactions that allow all participants to unambiguously look up and correlate information in the VIMS 200. For participant names, technologies for effecting the uniqueness and currency of such names are well understood by those skilled in the art, and it is assumed that the VIMS 200 enforces a unique naming scheme on all participants. For transaction identification, each participant can label particular transactions with its own identification scheme, and the VIMS 200 can, for the convenience of all participants, provide a correlation service, impose its own identification scheme, or both. These identifications need to be communicated, either automatically or manually, as orders are processed. This description assumes that such a technique for the unambiguous identification of participants and transactions has been employed, and that transaction identifications are propagated through the system as transactions are processed.

The VIMS 200 gives maximum benefit to the participants if all participants supply it with complete order and return information, in real-time, as orders and returns are processed. However, recognizing that such real-time processing requires significant integration between computer systems, the VIMS 200 is able to manage partial information and allow gradual integration of participants' computer systems. It can supply significant benefits even if not all participants supply order and return information or if such information is not supplied in real-time. In particular, if participating computing systems cannot be relied upon to establish "24-7" communication, any of a number of messaging systems, such as the Sun Microsystems Java Messaging Service, can be employed to safely store messages until they are delivered to their intended recipient. This description does not further analyze message delivery but simply assumes that a technology for guaranteed delivery has been deployed.

In addition to exposing a transaction protocol, the VIMS 200 makes information available to authorized subscribers. There are a number of methods through which subscribers may access that information. One possibility is a web interface 2005 through which customers, retailers, shippers, etc., can log into the VIMS 200 to track the status of an order or query aspects of the product distribution process. This information is only accessible to the degree that the data is known to the VIMS 200 and the participant has the right to query the data. Another possibility is a protocol converter 2006. For example, Inventory Providers 130, such as manufacturers and distributors, can retrieve statistical information via XML 2007 linked to this protocol converter.

The VIMS 200 preferably manages all order and return transactions until orders and returns are complete. To reliably store transaction information, database systems such as those offered by Oracle are readily available. However, data volume can increase dramatically and, at some point, may exhaust database system capacity. To avoid this potential problem, completed orders can, after some amount of time, be archived or summarized to reduce the storage capacity required. These archiving mechanisms are well understood by those skilled in the art and will not be further described.

To fulfill orders that are placed by customers, products need to be picked from Inventory Sites 112 and packed for shipping. The Inventory Sites 112 of modern retailers typically receive pick-and-pack instructions from their respective OIMS 111 through an existing link 2008 to automate the pick-and-pack process. Sometimes, a single order may involve pick-and-pack from multiple Inventory Sites 112. The web based Storefronts 113 of these modern retailers can also have an existing link 2008 to the OIMS 111 that manages the Inventory Sites 112 employed for order fulfillment. However, older retailers can employ a manual process in which orders are communicated to Inventory Sites 112 by telephone, facsimile, etc.

There are several ways in which the OIMS 111 can interface with the VIMS 200. If there is an existing link 2008 between a web based Storefront 113 and an OIMS 111, then the OIMS 111 is already notified of new orders and merely may want to query the VIMS 200 for additional order information. For example, the OIMS 111 may need schedule updates for shipments to an OAS 400 in case the consumer selects pickup of the order at an OAS 400 through the mechanism that is a part of this invention. If there is no such preexisting automatic connection, the VIMS 200 can notify the OIMS 111 of new orders using a protocol such as EDI or XML 2009 in conjunction with the protocol converter 2006. This alternative can relieve the storefront of the burden of manually transmitting order information to the OIMS 111. Preferably, the OIMS 111 will notify the VIMS 200 of order status—such as completion of pick-and-pack, split orders, short ordered items, etc.

The PTSS 300 preferably employs computing systems to manage the transport operations. These systems preferably communicate with the VIMS 200 to send and receive information related to product transports using a protocol such as EDI or XML 2009 in conjunction with the protocol converter 2006. For example, the PTSS 300 can transmit to the VIMS 200 either shipping status or at least a tracking number that enables the lookup of shipping status in the PTSS 300 computing system or the PTSS 300 can receive from the VIMS 200 transport instructions and schedules.

An OAS 400 can have its own computer system that integrates with the VIMS 200 or it can simply avail itself of a web browser 2001 to communicate with the VIMS 200 using an HTTP connection 2002, both of which have been discussed previously. However, some OAS's 400 may be reluctant to invest the time and capital for setting up information systems to participate in the PDMS 100. In such cases, the VIMS 200 can provide simple templates for web servers for these OAS's 400 or it can provide interfaces that allow third-party application service providers to host such web servers. There are well-known web technologies for both approaches.

VI. THE COLLABORATIVE INVENTORY SHARING PROCESS

Collaborative Inventory Sharing was introduced in the "Summary of the Invention" as some aspect that is preferably included in the Product Distribution Management System (PDMS) 100 and illustrative examples of its operation were provided in Section II.A.1.

Figure 21:
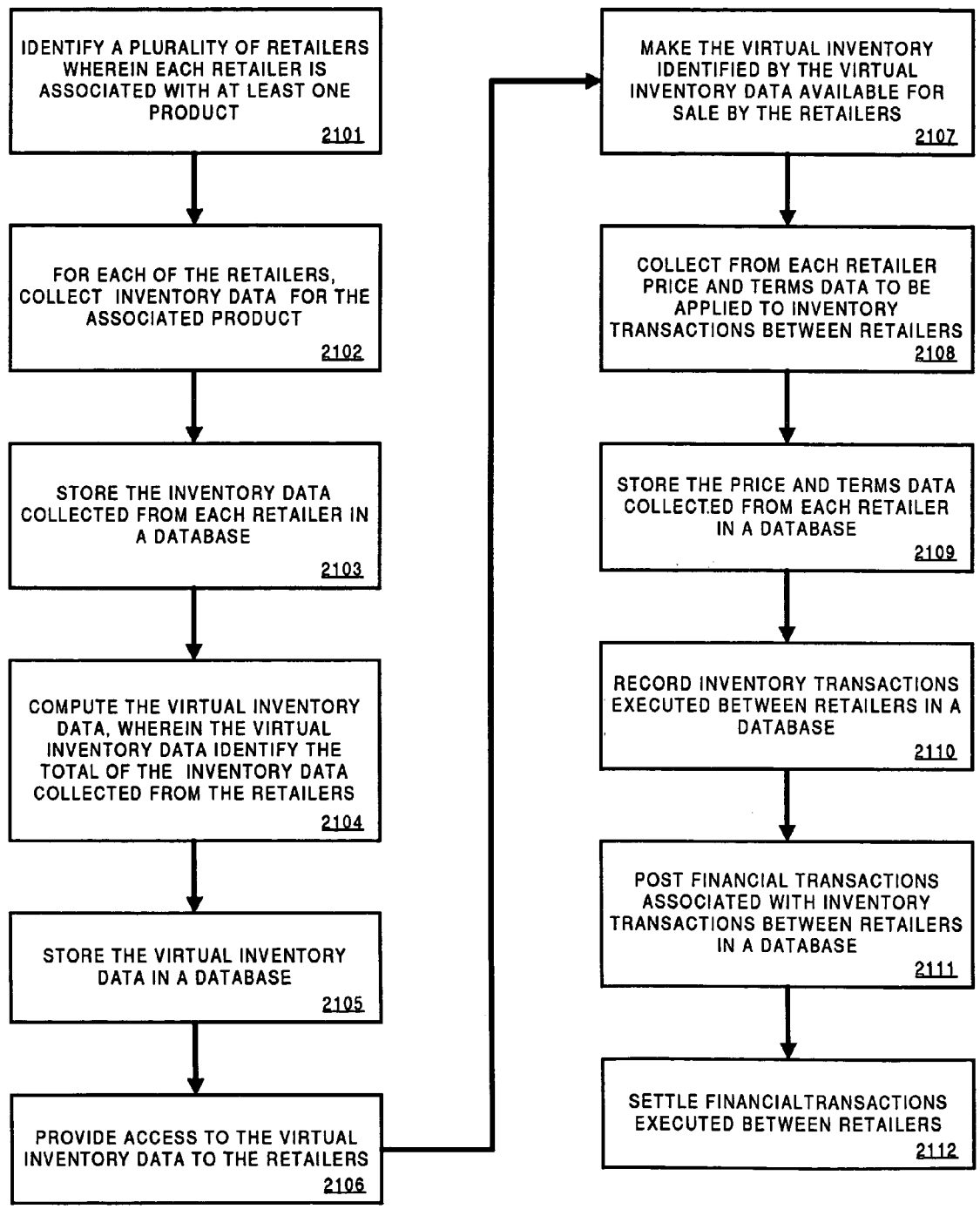
FIG. 21 illustrates a preferred method for collaborative inventory sharing.

This Section describes, with reference to FIG. 21, method 2100 by which the VIMS 200 can be configured to support Collaborative Inventory Sharing. Most steps in the method 2100 are described with respect to the sharing of inventory among several retailers. However, the method 2100 can also be applied more broadly to the sharing of inventory between merchants in general.

The VIMS 200 is preferably configured to support real-time processing whereby Collaborative Inventory Sharing generates maximum benefit for the participating merchant if the transactions associated with the steps in method 2100 are processed in real-time. However, a participating merchant may not be equipped with computing systems that support the level of integration with the VIMS 200 required for real-time processing. Under such circumstances, the VIMS 200 is able to manage and process partial and delayed information and can supply significant benefits to such merchant, as discussed in Section V.

At step 2101 a plurality of Retailers 110 willing to participate in Collaborative Inventory Sharing are identified, wherein each Retailer 110 is associated with at least one product. The product(s) with which each Retailer is associated are preferably those products for which the Retailer is an inventory provider. Preferably each Retailer 110 will participate (and be associated) with its entire inventory. However, a Retailer 110 can participate with only one product and with only a portion of the inventory quantity held on that product. The administration of the PDMS 100 involves identifying Retailers 110 interested in participating in the system and securing subscription contracts from such Retailers 110. To secure such contracts, PDMS 100 account representatives can employ conventional marketing and sales techniques, similar to those used by vendors of software platforms designed to improve the productivity of business enterprises.

At step 2102, for each of the Retailers 110, inventory data for the associated product(s) is collected. This step is preferably executed, in real-time, through the VIMS 200 computing system. The inventory data preferably identify the inventory items and quantity with which that Retailer 110 elects to participate in Collaborative Inventory Sharing and such inventory data may indicate that, at a particular moment, the quantity of an inventory item with which the Retailer is associated is zero.

At step 2103, the inventory data collected from each Retailer 110 is stored in a database. Preferably, an Inventory Provider DBM 232 is allocated, in the VIMS 200, to each Inventory Site 112 from which a Retailer 110 can provide inventory data. The inventory data collected from each Retailer 110 is preferably organized by Inventory Site 112 and is stored in the respective Inventory Provider DBM 232 assigned to the Inventory Site 112 from which that Retailer 110 provides inventory data. When a Retailer 110 has multiple inventory site locations, the organization of collected inventory data by Inventory Site 112 allows the VIMS 200 to quickly locate needed products and make the desirable fulfillment allocations and substitutions as described in Section IV.B.2 with reference to FIGS. 7A and 7B.

At step 2104, the Virtual Inventory data is computed, wherein the Virtual Inventory data identify the total of the inventory data collected from each of the participating Retailers 110. At step 2105 the Virtual Inventory data is preferably stored in the Virtual Inventory DBM 231. At step 2106, access to the Virtual Inventory data is provided to each of the participating Retailers 110. When steps 2102 through 2105 are executed in real-time, a participating Retailer 110 can query the Virtual Inventory DBM 231 to obtain the actual inventory available at the moment the query is submitted. Current inventory data can be a significant factor in providing Retailers 110 the opportunity to improve productivity and better serve consumers. To provide for the participation of merchants not able to support real-time execution, the VIMS 200 can distinguish, in the Virtual Inventory DBM 231, real-time data from non real-time data and treat the respective transactions accordingly.

At step 2107, the Virtual Inventory identified by the Virtual Inventory data is made available for sale by the participating Retailers 110, to fulfill orders. As previously stated, use of the Virtual Inventory will enable each Retailer 110 to significantly reduce inventory space and cost while considerably expanding the size of the product selections offered.

With Collaborative Inventory Sharing, the variety of products offered by a Retailer 110 is limited not by the range of products available in the Virtual Inventory DBM 231, but rather by the ability of the Retailer 110 to support its product offerings with qualified personnel. The expectation is for metropolitan areas to be served by many Retailers 110 with specialized product selections and rural or very small size communities to be served by only a few, or possibly just one, Retailer 110 with a broad product selection. The Retailers 110 with broad product selections can serve a purpose similar to the "General Store" that served the small communities of yesteryear.

At step 2108, price and terms data to be applied to inventory transactions between Retailers 110 is collected from each participating Retailer 110. This price and terms data identifies the price to be charged and terms to be applied to an inter-merchant transaction, whereby another Retailer 110 uses an item from the inventory provided by the Retailer 110 that supplied the price and terms data, to fulfill an order. Since price and terms data may depend upon the Inventory Site 112, this information is preferably organized by Inventory Site 112.

At step 2109, the price and terms data collected from each participating Retailer 110 at step 2108 is stored in databases. Preferably, the price and terms data are stored in databases in the form of order fulfillment rules. Order fulfillment rules can be set by each participating merchant to specify the terms and conditions under which such merchant agrees to conduct business with other merchants. They may be general, applying to all products, or may be specific, applying to specific products. As stated in Section III with reference to FIGS. 7A and 7B, the general fulfillment rules are preferably stored in the Merchant DBM 240 and the specific fulfillment rules in the Inventory Provider DBM 232.

Typically, steps 2102 through 2105, 2108, and 2109 involve an initial setup component and a maintenance component. The initial setup component includes the data collected from the Retailer 110 when that Retailer 110 first subscribes to the PDMS 100. This data represents the initial inventory the Retailer 110 agrees to contribute to the Virtual Inventory and the respective price and terms. The maintenance component reflects the changes in the data initially collected from the Retailer 110. It consists of additions, deletions, and changes that may occur during the normal conduct of business by each participating Retailer 110. An example of the maintenance component is the update of the Virtual Inventory DBM 231 to reflect sales transactions conducted by each participating Retailer 110. Another example is the change by any Retailer 110 of price and terms data stored in the Merchant DBM 240 or in the Inventory Provider DBM 232 of that Retailer 110. Preferably, the maintenance component is executed in real-time through an EDI or XML 2009 data link and is continuously updated to keep the Virtual Inventory DBM 231, Inventory Provider DBM 232, and Merchant DBM 240 current.

At step 2110, inventory transactions executed between participating merchants are recorded in the Inter-Merchant Transactions DBM 236. An example of an inventory transaction between participating merchants is an order fulfillment substitution involving the inventory listed in the Virtual Inventory DBM 231 whereby one Retailer 110 books the order and another Retailer 110 fulfills the order. Another example is an inventory transfer between Inventory Providers 130, to balance inventories or make inventory adjustments to compensate for consumer demand.

At step 2111, the financial transactions associated with inventory transactions between participating merchants are posted in the Accounting and Billing DBM 243. For example, each time a first Retailer 110 executes a sale against inventory contributed by a second Retailer 110, an amount representing the inputted value of the item sold is debited to the account of the first Retailer 110 and credited to the account of the second Retailer 110. The amount representing the inputted value of the items sold is determined by pricing the items in accordance with the fulfillment rules agreed upon by the participating merchants as discussed with reference to step 2109, above.

At step 2112, the financial transactions associated with inventory transactions between participating merchants are settled. In accordance with current practice, the settlement of financial transactions between commercial institutions is not executed in real-time, but rather on a periodic basis such as for example, daily, weekly, or monthly. However, the configuration of the VIMS 200 can support real-time settlement of financial transaction whenever financial institutions adopt such practice.

VII. THE ORDER AGGREGATION PROCESSES

Order Aggregation was introduced in the "Summary of the Invention" as one aspect that is preferably included in the Product Distribution Management System (PDMS) 100 and illustrative examples of its operation were provided in Section II.A.6.

This Section describes, with reference to FIGS. 22A-C, 23, and 24 methods 2200, 2220, 2230, 2240, 2250, 2300, and 2400 Order Aggregation strategies by which the VIMS 200 can be configured to support Order Aggregation.

Figure 22A:
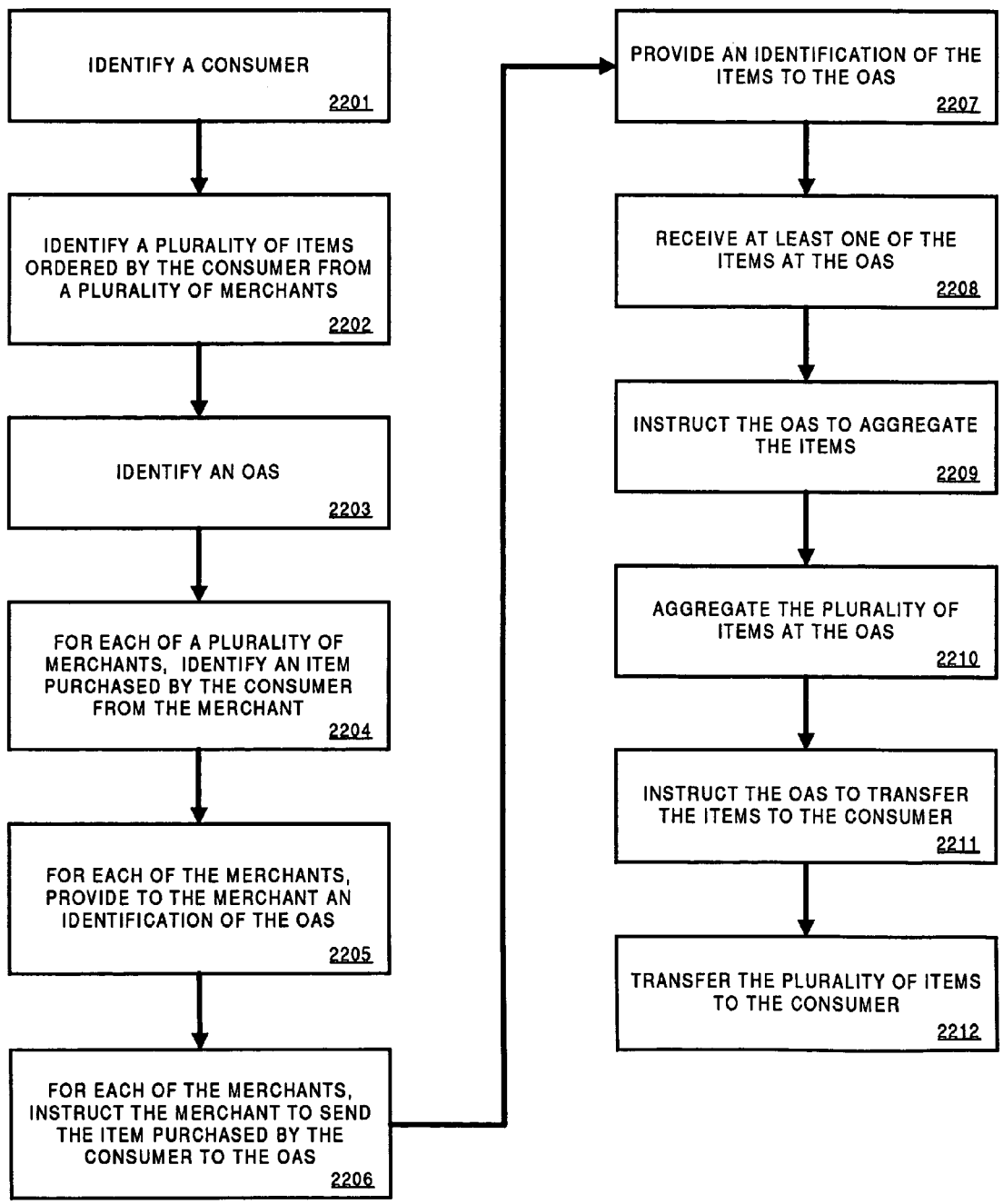

Steps 2201 through 2212 of FIG. 22A describe method 2200. At step 2201 a consumer is identified. Preferably, the consumer is identified by the unambiguous identification system used by the VIMS 200 to identify the users and transactions. At step 2202 a plurality of items ordered by the consumer from a plurality of merchants is identified. Preferably, the items ordered are uniquely identified by appropriate product identification codes. At the same time, the VIMS 200 has the capability to associate each item with the merchant that booked the order and the merchant that supplies the item, which may not be the same.

At step 2203 an OAS 400 is identified. Preferably, if the consumer elects to pickup an aggregated order, the OAS 400 is selected by the consumer, and if the consumer elects to have an aggregated order delivered, the OAS 400 is selected by the VIMS 200. For example, the selection of the OAS 400 by the VIMS 200 can be made by the Product Transport Module (PTM) 217. In making the selection of an OAS 400, the PTM 217 can take into consideration the proximity of the delivery address to each of the potential OAS's 400 where the orders can be aggregated for delivery to the consumer.

At step 2204, for each of a plurality of merchants, an item purchased by the consumer from the merchant is identified. At step 2205, for each of the merchants, an identification of the selected OAS 400 is provided to the merchant. At step 2206, for each of the merchants, the merchant is instructed to send the item purchased by the consumer to the selected OAS 400. Steps 2204-2206 can be executed by the software modules of the VIMS 200, as described in Section IV.B. In particular, each item purchased by the consumer from each of the merchants is fully identified and the information related to each purchase is stored in the Consumer Transactions DBM 233 and in the Consumer Orders DBM 234.

At step 2207 the selected OAS 400 is provided an identification of the items purchased by the consumer that will be aggregated at that OAS 400. At step 2208, at least one of the items purchased by the consumer is received at the OAS 400. Items purchased by the consumer may be received at the selected OAS 400 at different times depending upon the Inventory Site 112 providing the items and the transport schedules set by the Product Transport Module 217. Upon receipt, these items are placed in temporary storage at the storage facilities of the OAS 400. One function of the OAS 400 is to provide temporary storage to facilitate Order Aggregation and expeditious transfer of products to consumers. The OAS 400 is not intended to operate as a warehouse for long-term storage of products purchased by consumers. Preferably, the Product Transport Module 217 schedules the transport of the items purchased by the consumer to the selected OAS 400 to minimize the temporary storage time at the OAS 400. This strategy makes the most efficient use of the storage space at the OAS 400, which is typically premium space in a premium location.

At step 2209 the OAS 400 is instructed to aggregate the items purchased by the consumer and at step 2210 the OAS 400 performs the physical aggregation. The items to be aggregated can relate to orders spread over a period of time and can include multiple orders placed with the same merchant. The aggregation instructions are provided by the Order Aggregation Module 215 as described in Sections IV.B.5 and IV.B.6, with reference to FIGS. 10A-E, 11A and 11B.

At step 2211 the OAS 400 is instructed to transfer the items to the consumer and at step 2212 the OAS 400 physically executes this transfer.

Steps 2221 through 2225 of FIG. 22B describe method 2220 that defines one process for transferring an aggregated order to a consumer when the consumer elects to pickup the order at a selected OAS 400.

At step 2221 an OAS 400 for order pickup is identified and at step 2222 a schedule for order pickup is also identified. Preferably, identification of the OAS 400 and the pickup schedule are performed by the Pickup and Delivery Information Module (PDIM) 216, in accordance with the process discussed in Section IV.B.6, with reference to FIGS. 11A and 11B.

At step 2223, the aggregated order is made available for pickup at the identified OAS 400, in accordance with the identified schedule for pickup. This is a physical step that preferably involves placing the items in the aggregated order in one or more containers, each rated for the applicable storage temperature. For example items stored at room temperature can be placed in containers without insulation, items stored at cold or freezing temperatures are stored in containers with insulation appropriate for those temperatures. Each OAS 400 can make these order containers available to consumers to transport aggregated orders home in accordance with a recycling program. The use of order containers offers the benefit of maintaining the purchased items at the proper temperature during transport while eliminating the need for the customary plastic or paper bags. Step 2223 can be executed shortly before the scheduled time for consumer pickup and the containers with the items in the aggregated order can be kept in the temporary storage area for the respective temperature. Once the OAS 400 is notified of the eminent arrival of the consumer, the order containers can be taken to the Order Aggregation area 406, shown in FIG. 4, where they can be placed in an order transport cart 411. This cart can then moved Just-In-Time to the order loading deck 407 adjacent to the consumer-parking pad 408 where the consumer vehicle 409 is expected to park. Various technologies are currently available that can be used by consumers to update the expected time of arrival at the consumer parking pad 408. Examples of such technologies are cell phones, two-way pagers, and wireless Internet appliances. Using such technologies, the consumer can provide an accurate time of arrival to the OAS 400 and further reduce the expected time needed to complete order pickup.

At step 2224 the OAS 400 is instructed to deliver the aggregated items to the consumer and at step 2225 the OAS 400 physically delivers the aggregated items to the consumer. An OAS 400 can let the consumer transfer the order containers to a vehicle, or as an alternative provide the extra convenience of a courtesy valet service to execute the transfer. Step 2225 completes the process of transferring the aggregated order to the consumer when the consumer elects to pickup the aggregated order.

Steps 2231 through 2235 of FIG. 22B describe method 2230 that defines one process for transferring an aggregated order to a consumer when the consumer elects to have the aggregated order delivered to a designated address.

At step 2231 an OAS 400 from which the aggregated order will be delivered to the consumer is identified. At step 2232 an address for the delivery of the aggregated order is identified and at step 2233 a schedule for the delivery of the aggregated order is also identified. The selection of the OAS 400 can be made by the Product Transport Module 217, as discussed above with reference to step 2203. The identification of the delivery schedule can be performed by the Pickup and Delivery Information Module (PDIM) 216, in accordance with the process discussed in Section IV.B.6, with reference to FIGS. 11A and 11B.

At step 2234 a delivery service is instructed to pickup the aggregated order at the identified OAS 400 and to deliver it to the consumer at the identified delivery address in accordance with the identified delivery schedule. At step 2235, the aggregated order is delivered to the consumer at the identified delivery address in accordance with the identified delivery schedule. As described in Section IV.C with reference to FIG. 17, the PTSS 300 can execute the delivery in accordance with instructions received from the Order Aggregation Module 215. Step 2235 completes the process of transferring the aggregated order to the consumer when the consumer elects to have the aggregated order delivered.

Steps 2241 through 2245 of FIG. 22C describe method 2240 that defines a strategy in accordance with which an OAS 400 can be used to facilitate the receipt of a parcel by a receiver.

At step 2241, a receiver is identified. In this context, the receiver can be a consumer that expects to receive at least one item purchased from a retailer, an individual that expects to receive at least one item from an organization or company, an individual that expects to receive at least one item from another individual, etc. At step 2242, a sender is identified. In this context, the sender can be a retailer that expects to send at least one item to a consumer, an organization or company that expects to send at least one item to an individual, an individual that expects to send at least one item to another individual, etc.

At step 2243, the receiver is presented with the identification of at least one OAS 400 at which the receiver can receive the items. At step 2244, a selection of one of the OAS's 400 is obtained from the receiver. At step 2245, the sender is notified of the identity of the OAS 400 selected by the receiver. The intent of this process is to aggregate items sent by a sender to a receiver with other items the receiver expects to be available for pickup or delivery at the selected OAS 400.

Steps 2251 through 2253 of FIG. 22C describe method 2250 that defines a strategy in accordance with which an OAS 400 can be used to facilitate the sending of a parcel by a sender.

At step 2251, a plurality of OAS's 400 are identified. At step 2252, a receiver is associated with one of the OAS's 400. At step 2253, a plurality of senders is notified of the association established at step 2252. The intent of this process is to aggregate items sent by a plurality of senders to a receiver with other items the receiver expects to be available for pickup or delivery at the selected OAS 400. For example a consumer can purchase items from a number of out-of-the-region retailers equipped to send the respective items to any of the plurality of OAS's 400 identified. After an OAS 400 is selected for receiving the items, all the retailers are notified of the OAS 400 selection and can send their respective items to that OAS 400.

Figure 23:
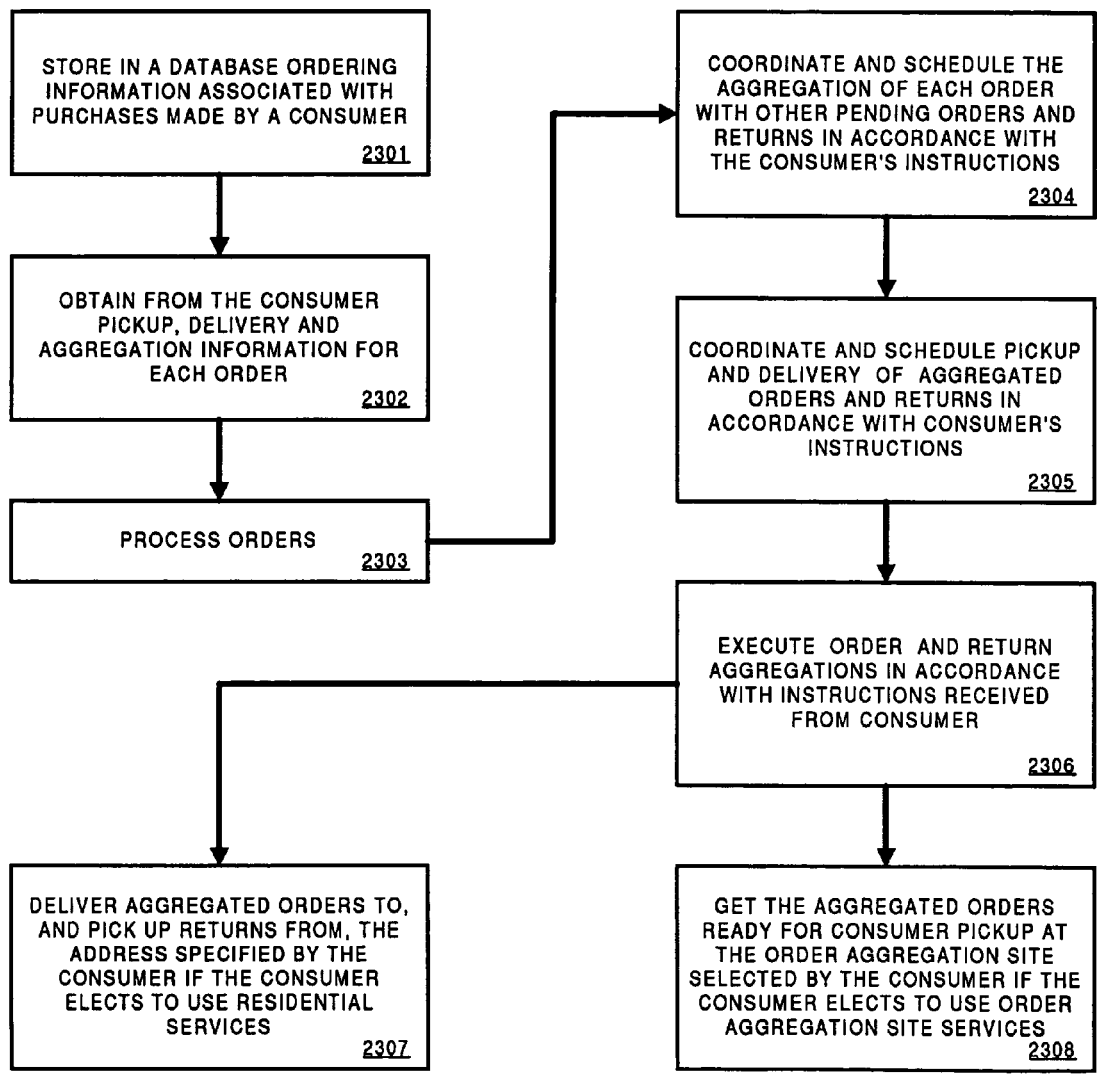
FIG. 23 illustrates a preferred method for order aggregation.

Steps 2301 through 2308 of FIG. 23 describe method 2300 that defines one order aggregating process associated with the Order Aggregation Module (OAM) 215 described in Section IV.B.5.

At step 2301, ordering information associated with purchases made by a consumer from any number of Retailers 110 is stored in a database. Preferably, this data is stored in the appropriate database modules of the VIMS 200 and in particular in the Consumer Transactions DBM 233 and in the Consumer Orders DBM 234.

At step 2302, pickup, delivery, and Order Aggregation information for each order is obtained from the consumer. This step can be executed in accordance with the processes described in Section IV.B.6 with reference to FIGS. 11A and 11B.

At step 2303, consumer orders are processed, preferably in accordance with the processes described in Section IV.B.2 with reference to FIGS. 7A and 7B.

At step 2304, the aggregation of each order with other pending orders and returns in accordance with the consumer's instructions is coordinated and scheduled. At step 2305, pickup and delivery of aggregated orders and returns in accordance with consumer's instructions is coordinated and scheduled. Steps 2304 and 2305 can be executed in accordance with the processes described in Section IV.B.5 with reference to FIGS. 10A through 10E.

At step 2306, order and return aggregations are executed in accordance with instructions received from the consumer. At step 2307, if the consumer elects to use residential services (where the transfer of goods occurs at consumer's residence), aggregated orders are delivered to, and returns picked-up from, the address specified by the consumer. At step 2308, if the consumer elects to use OAS 400 services, aggregated orders are prepared for consumer pickup at the OAS 400 selected by the consumer. Steps 2306 through 2308 can be executed in accordance with the processes described in Section IV.D with reference to FIG. 18.

Figure 24:
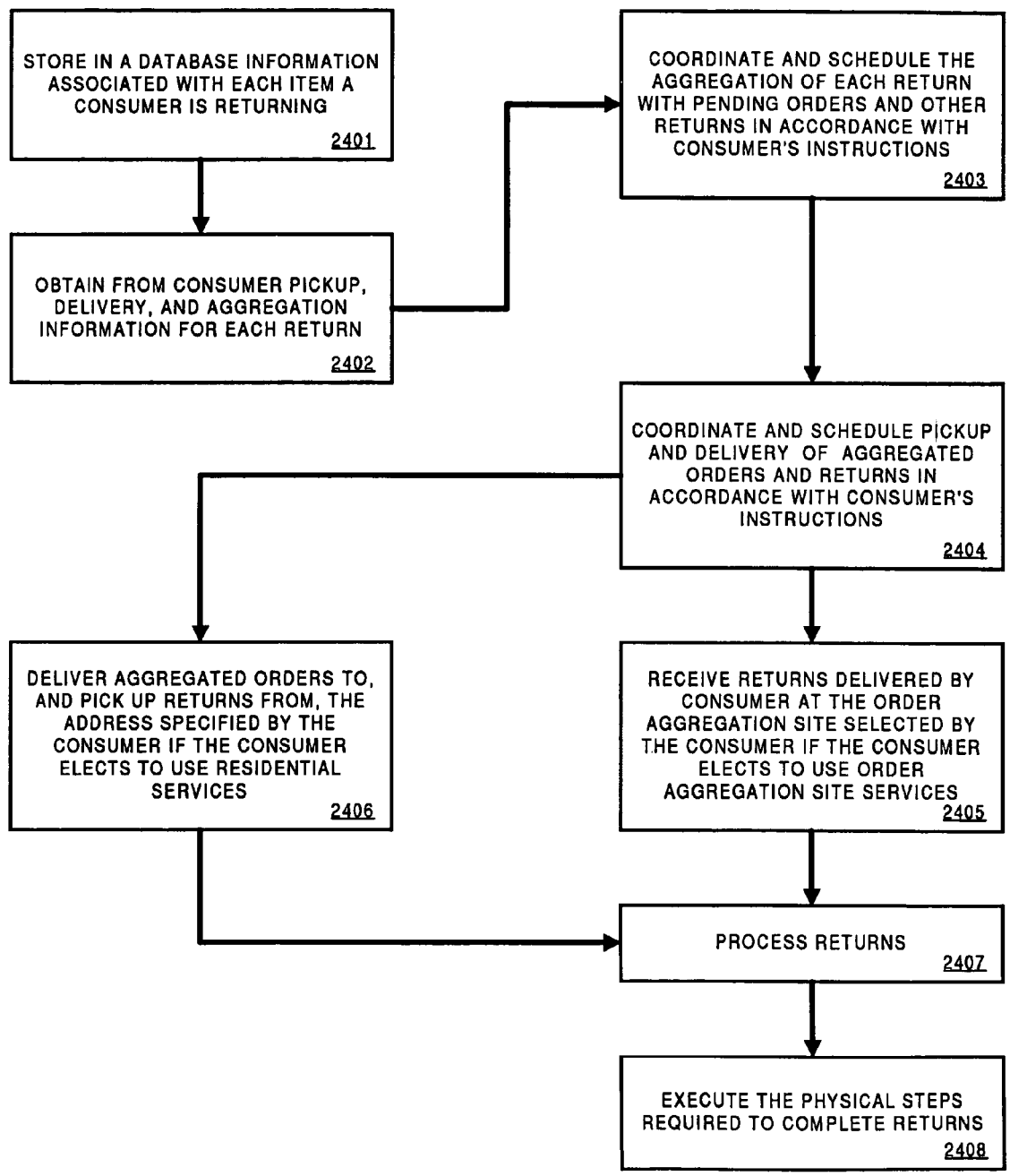
FIG. 24 illustrates a preferred method for aggregation of returns.

Steps 2401 through 2408 of FIG. 24 describe method 2400 that defines one return aggregating process associated with the Order Aggregation Module (OAM) 215 described in Section IV.B.5.

At step 2401, information associated with each item a consumer is returning is stored in a database. Preferably, this data is stored in the appropriate database modules of the VIMS 200 and in particular in the Consumer Transactions DBM 233 and the Product Returns DBM 235.

At step 2402, pickup, delivery, and aggregation information for each return is obtained from the consumer. This step can be executed in accordance with the processes described in Section IV.B.6 with reference to FIGS. 11A and 11B.

At step 2403, the aggregation of each return with other pending orders and returns in accordance with the consumer's instructions is coordinated and scheduled. At step 2404, pickup and delivery of aggregated orders and returns in accordance with consumer's instructions is coordinated and scheduled. Steps 2403 and 2404 can be executed in accordance with the processes described in Section IV.B.5 with reference to FIGS. 10A through 10E.

At step 2405, if the consumer elects to use OAS 400 services, the OAS 400 receives returns delivered by the consumer to the OAS 400 selected by the consumer. At step 2406, if the consumer elects to use residential services, aggregated orders are delivered to, and returns picked-up from, the address specified by the consumer. Steps 2405 and 2406 can be executed in accordance with the processes described in Section IV.D with reference to FIG. 18.

At step 2407, consumer returns are processed, preferably in accordance with the processes described in Section IV.B.4 with reference to FIGS. 9A and 9B. At step 2408 the physical steps required to complete the returns are executed. This step can be executed in accordance with instructions provided by the processes described in Section IV.B.4 with reference to FIGS. 9A and 9B.

The various aggregation processes described above can be performed to yield more than one aggregated order comprising items from the plurality of orders placed by the consumer. Preferably, the selection of the items to be placed in each aggregated order is left to the discretion of the consumer and is obtained from the consumer by the VIMS 200 as described in detail with reference to FIGS. 11A and 11B of Section IV.B.6. However, the VIMS 200 can present to the consumer logical combinations and recommendations to facilitate the consumer's decision process.

VIII. CONSUMER PREDICTIVE PURCHASING

Consumer Predictive Purchasing was introduced in the "Summary of the Invention" as one aspect that is preferably included in the Product Distribution Management System (PDMS) 100 and a brief description of its operation was provided in Section II.A.7. This Section describes, with reference to FIG. 28A, a preferred process for the operation of the Consumer Predictive Purchasing system. In addition, this Section describes, with reference to FIGS. 28B and 28C, a preferred system and method, called Consumption Cruise Control (CCC), for smoothing undesirable fluctuations in consumption.

A. Consumer Predictive Purchasing Process

The VIMS 200 can provide a system and method, based upon Consumer Predictive Purchasing, to collect and store in real-time the vast amounts of extremely valuable predictive consumption data normally stored in the minds of individual consumers. This consumption data is otherwise lost and serves no useful purpose.

In one embodiment, the VIMS 200 provides web based programs that operate with consumer specific historical consumption data stored in the Consumer DBM 239, to help consumers predict their future consumption needs. Using such programs, the Consumer 120 can obtain reasonable estimates of future household consumption and then use these estimates to place Predictive Purchase orders to fulfill consumption needs at some future time. To promote the use of Predictive Purchase orders, Retailers 110 can offer special incentive discounts to consumers that place Predictive Purchase orders scheduled for delivery at some future time to fulfill the predicted needs. These special incentive discounts provide a powerful vehicle for collecting predictive consumption data from consumers.

To support Predictive Purchasing, the VIMS can provide specialized application programs that estimate supply chain cost savings resulting from Predictive Purchasing and correlate such savings with the Predictive Purchase Delay (PPD). As used herein, Predictive Purchase Delay (PPD) is the time span between the time the consumer places a Predictive Purchase order and the time the consumer agrees to take possession of the goods purchased. The specialized application programs also correlate the PPD to the incentive price discounts offered to consumers to enable retailers to tailor incentive discounts to the markets they serve and the business models they use. In general, the longer the PPD is, the larger the achievable supply chain cost savings and the incentive price discounts are.

The use of Predictive Purchasing can bring major economic benefits to the entire supply chain, some of which can be passed to consumers in terms of incentive price discounts. For purposes of illustration, assume that based upon historical consumption records maintained by the VIMS 200 on the behalf of a specific consumer, Predictive Purchase orders for milk can be placed by that consumer with a PPD of 10 days. When the consumer places a Predictive Purchase order, preferably the ordering information becomes available in real-time to all the participants in the supply chain, from the dairy that processes the milk to the retailer that receives the order. Once a significant percentage of consumers adopt Predictive Purchasing, the dairy can accurately plan and schedule production and significantly improve productivity. Likewise, the distribution system can operate efficiently with Just-In-Time scheduling. Milk containers can be shipped from the dairy to regional distribution centers and within a few hours be transported by the PTSS 300 to each designated OAS 400 Just-In-Time to meet Order Aggregation schedules. Accordingly, the dairy-to-consumer distribution time and the total inventory of milk in the distribution pipeline can both be reduced to a minimum. In addition, the costs otherwise experienced by Retailers 110 for keeping milk in inventory in expensive shelf space, and other costs associated with handling, spoilage, and overhead can be eliminated. In general, similar productivity improvements for both perishable and non-perishable products can be achieved at most stages of the supply chain.

Figure 28A:
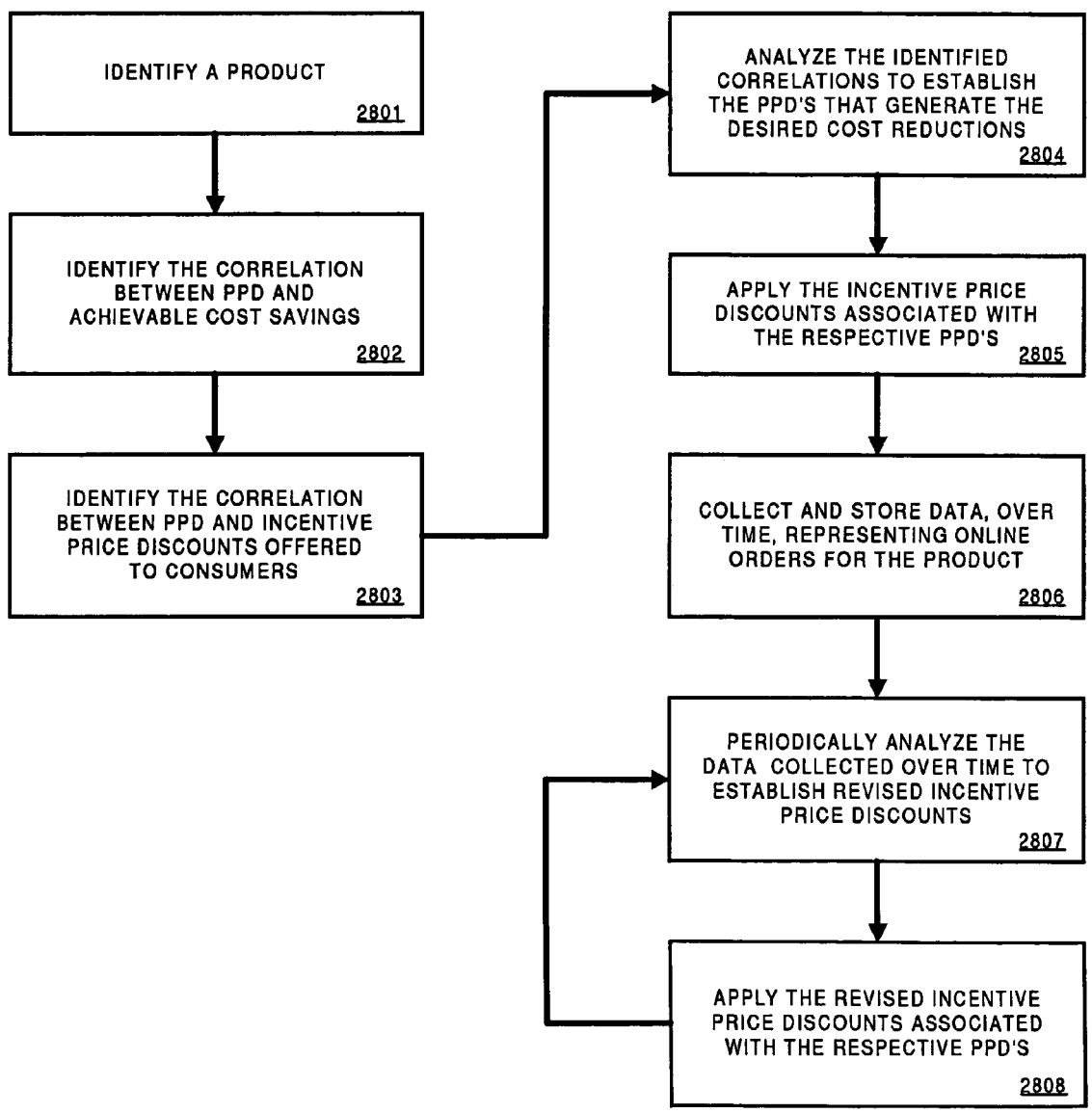
FIG. 28A illustrates a preferred method by the PDMS to correlate price discount to Predictive Purchase Delay.

FIG. 28A illustrates a method 2800 by which specialized application programs can estimate supply chain cost savings, correlate them with the PPD, and derive appropriate incentive price discounts for Predictive Purchases.

At step 2801, a product is identified. At step 2802, the correlation between PPD and achievable supply chain cost savings is identified. The supply chain cost savings may include a component associated with the manufacturing process and another component associated with the distribution process. For each increment of the PPD the corresponding supply chain cost savings can be estimated through computer modeling programs and the respective results recorded. Using these results, the correlation in step 2802 can be expressed, for example, as a plot of supply chain cost savings versus PPD.

At step 2803, the correlation between PPD and incentive price discounts offered to consumers is identified. This correlation can be established empirically by a set of statistical experiments using a range of PPD values and a range of incentive price discounts. A separate experiment is conducted for each PPD value whereby each experiment involves offering various incentive price discounts and recording the number of Predictive Purchase Orders placed by consumers that take advantage of each price discount. From this data the correlation between PPD and incentive price discounts can be statistically evaluated.

At step 2804, the correlations identified in steps 2802 and 2803 are analyzed to establish the incentive price discounts that generate the desired cost reductions. Various types of criteria can be used to perform this analysis. For example, a criterion can be maximizing profitability after accounting for price discounts. At step 2805, the incentive price discounts associated with the respective PPDs are applied. At step 2806, data representing online orders for the product is collected and stored over time. This data extends to the full range of PPD values and their respective incentive price discounts and includes the case where the PPD is zero.

At step 2807, the data collected over time is periodically analyzed to establish revised incentive price discounts. At step 2808, the revised incentive price discounts associated with the respective PPD values are applied to the product. After step 2808, the process loops back to step 2807 and remains in an infinite loop, which over time periodically revises the incentive price discounts to obtain optimum performance in accordance to a specified criterion. For example, the long-term average price paid by consumers for the specific product is maintained at a minimum to control inflation.

B. Consumption Cruise Control Process

A problem most manufacturers often confront relates to random or erratic fluctuations in consumption. To adjust to such fluctuations, manufacturers have used various strategies. One strategy is to maintain minimum inventory buffers and gauge manufacturing resources for maximum consumption. During periods of high consumption, the manufacturer operates at higher efficiency and generates higher earnings. However, during the periods of low consumption that typically follow, the manufacturer operates at low efficiency due to underutilized resources and generates lower earnings. Another strategy is to maintain large inventory buffers and gauge manufacturing resources for average consumption. The large inventory buffers absorb the consumption fluctuations but the cost of inventory results in reduced efficiency and earnings. Still another strategy is to maintain minimum inventory buffers and gauge manufacturing resources for minimum consumption. In this case the manufacturer operates at maximum efficiency irrespectively of consumption fluctuations, but systematically loses business to competitors, thereby limiting growth opportunities, revenues, and earnings. For many years product manufacturers have tried a variety of strategies, but none has succeeded in overcoming the problems associated with fluctuations in consumption.

To survive the effects of cyclic reductions in consumption, sometimes manufacturers are forced to resort to drastic measures involving the reduction of valuable resources including facilities and personnel. Such measures tend to lower consumer confidence and further reinforce the trend towards reduction of consumption. This phenomenon is typically the root cause of the deep economic fluctuations and recessions observed over the years.

The valuable consumption data collected by the system and method described in Section VIII.A can be used to anticipate and identify forthcoming undesirable fluctuations in consumption. Based upon this knowledge, predictive purchase discounts can then be adjusted in such a manner as to avoid partially if not totally the undesirable fluctuations.

From a manufacturing perspective, fluctuation-free consumption with sustained growth over the time provides the most desirable environment under which a manufacturer can develop an efficient and prosperous enterprise.

The Consumption Cruise Control (CCC) presented here provides a system and method that smoothes undesirable fluctuations in consumption, instead of trying to adjust manufacturing to compensate for such undesirable fluctuations. As opposed to previous methods that involve compensating for mismatches between supply and demand after inventory has accumulated or depleted, this system and method can be used to adjust prices to maintain consumption at a level that is compatible with production resources before such mismatches occur. Accordingly, warehousing of products and supply shortages can be minimized or even eliminated.

Figure 28B:
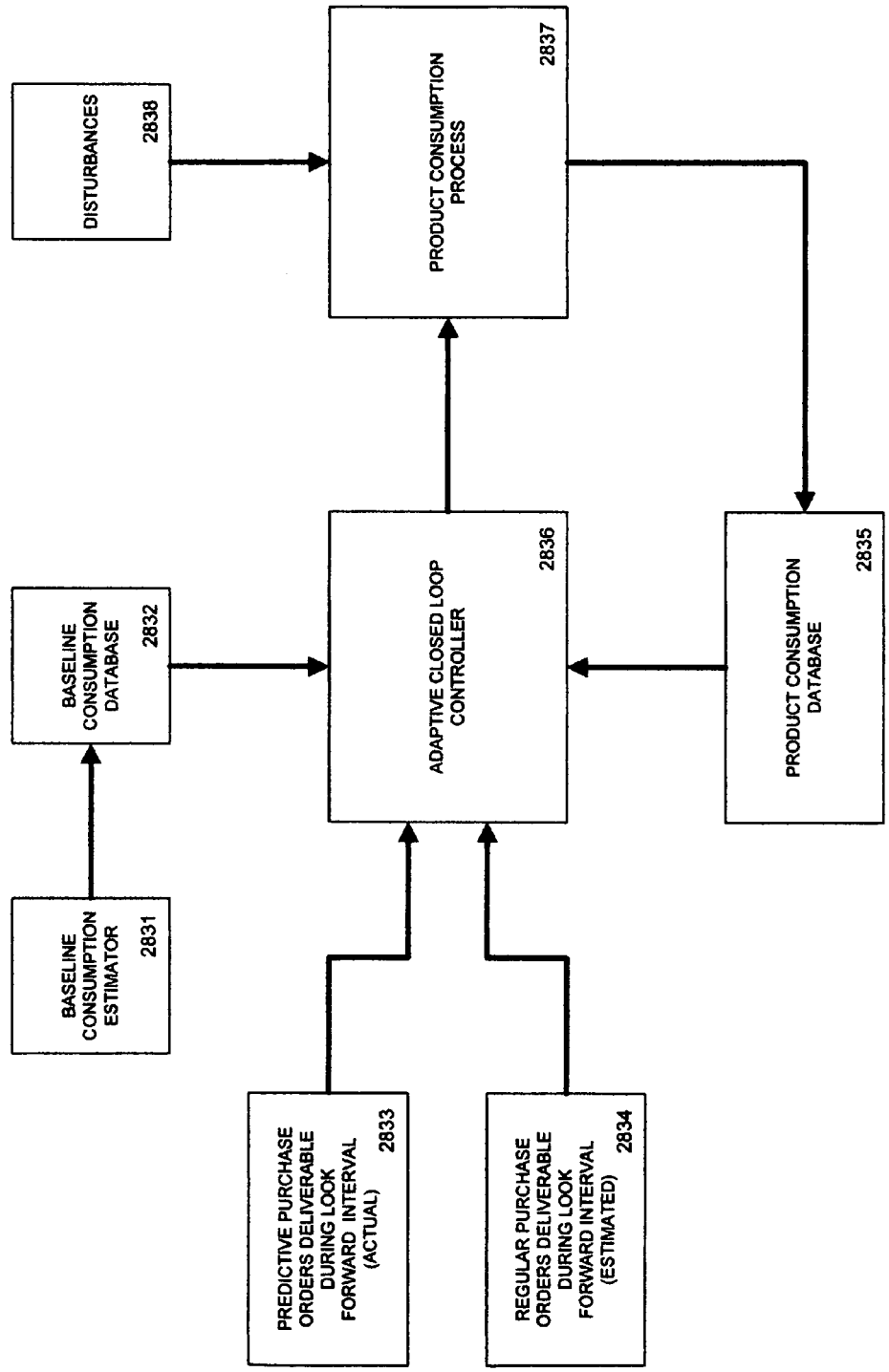
FIG. 28B illustrates a preferred configuration of the Consumption Cruise Control system.
Figure 28C:
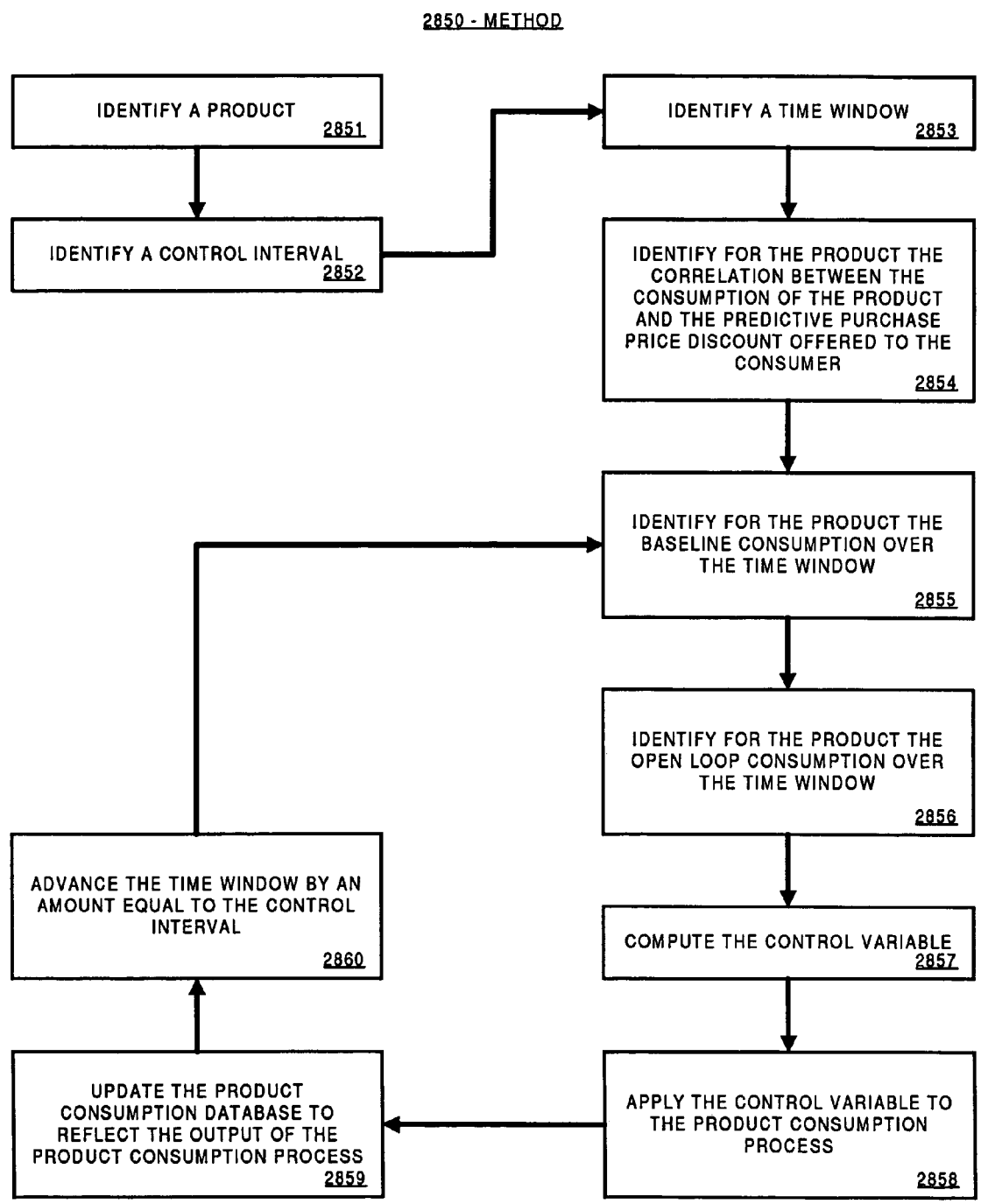
FIG. 28C illustrates a preferred method performed by the PDMS to smooth fluctuations in product consumption.

FIG. 28B is a block diagram illustrating an adaptive closed loop controller 2836 that can be used with method 2850, illustrated in FIG. 28C, to minimize or even eliminate undesired fluctuations in product consumption. For the purpose of this description, a product is an item produced by a manufacturer for ultimate distribution to consumers and product consumption is the total quantity of the product sold to consumers during a unit of time. FIGS. 28B and 28C refer to several parameters and variables which include: (1) the Time Unit, (2) the Look Back Interval, (3) the Look Forward Interval, (4) the Control Interval, (5) the Time Window, (6) the Baseline Consumption, (7) the Open Loop Consumption, and (8) the Control Variable. These parameters and variables are defined below.

The Time Unit is the unit selected to express the time variable. For the purpose of this illustration, a Time Unit of one week is selected.

The Look Back Interval is an interval, expressed in Time Units, extending in time back from the end of current Time Unit. For example, the Look Back Interval can be set at 20 weeks.

The Look Forward Interval is an interval, expressed in Time Units, extending in time forward from the end of current Time Unit. For example, the Look Forward Interval can be set at 6 weeks.

The Time Window is the time interval obtained by appending the Look Forward Interval to the Look Back Interval. For example, if the Look Back Interval is 20 weeks and the Look Forward Interval is 6 weeks, the Time Window is 26 weeks.

The Control Interval is the time interval between two consecutive cycles of the adaptive closed loop control algorithm. For the purpose of this illustration, a Control Interval of one week, corresponding to one Time Unit, is selected.

The Baseline Consumption is a variable representing the desired product consumption versus time, over the Time Window. The Baseline Consumption is an input to the adaptive closed loop controller 2836 of FIG. 28B. This input is provided by a baseline consumption database 2832, which receives its information from a baseline consumption estimator 2831. Preferably, the baseline consumption estimator 2831 takes into account factors such as use of natural resources, manufacturing capacity, historical consumption data, long-term price stability, inflation, economic stability and growth, and preservation of the environment to generate the best estimate of the consumption of the product over the Time Window.

The Open Loop Consumption is a variable representing the product consumption versus time most likely to occur, over the Time Window, without the influence of the adaptive closed loop controller 2836. It includes the actual consumption data collected during the Look Back Interval and reliable consumption projections for the Look Forward Interval. The look forward projections consist of two components. The first is associated with received Predictive Purchase Orders, scheduled for delivery during the Look Forward Interval. The second is associated with regular purchase orders expected to occur during the Look Forward Interval.

The Control Variable expresses the appropriate level of action to be exercised upon the product consumption process 2837 by applying the incentive price discounts necessary to maintain the product consumption process 2837 under control. It represents the final result of a computation that involves an indicator that quantifies the deviation between the Open Loop Consumption and the Baseline Consumption. Examples of how such deviation can be expressed are: the average deviation computed for the entire Time Window, a four-week moving average deviation, and a weighted Time Window moving average deviation.

As shown in FIG. 28B, the adaptive closed loop controller 2836 receives Baseline Consumption from the baseline consumption database 2832, as a reference input. It receives data representing consumption during the Look Forward Interval, as a look forward input. Such data is attributable to actual Predictive Purchase Orders deliverable during the Look Forward Interval 2833. Preferably, this data is adjusted for potential cancellations based upon historical cancellation rates.

The adaptive closed loop controller 2836 also receives data representing consumption during the Look Forward Interval, as a look forward input. This data is attributable to estimated regular purchase orders deliverable during the Look Forward Interval 2834. Preferably, such data is estimated by statistical analysis of historical data related to regular purchase orders and the correlation between consumption associated with regular purchase orders and Predictive Purchase Orders. For example, assume that 70% of the total consumption of the product is associated with Predictive Purchase Orders and 30% with regular purchase orders. If the known consumption of the product associated with Predictive Purchase Orders is 10,000 units for a particular week, then a reasonable estimate of the consumption associated with regular purchase orders, during that same week, is 4.286 representing 10,000×30/70. Such estimates combined with historical consumption data can provide quite accurate projections.

As a feedback input, the adaptive closed loop controller 2836 receives from the product consumption database 2835 actual consumption data for the Look Back Interval. This data includes both the consumption associated with Predictive Purchase Orders and regular purchase orders. The product consumption database 2835 is continuously updated, in real-time, by the product consumption process 2837 whereby this process outputs the total product consumption activity actually occurring from week to week.

The product consumption process 2837 receives an input from disturbances 2838 representing random phenomenon and unpredictable or undesirable factors that can affect the desired outcome of the product consumption process 2837. An example of a random phenomenon is when suddenly the demand for the product rises to an unusually high level on a particular week, in accordance with a small but possible statistical probability and for no other apparent reason. An example of an undesirable factor is a snowstorm that prevents the manufacturer from shipping the product for a period of time. In both cases the CCC system can compensate for the undesirable effects of the disturbance.

The product consumption process 2837 also receives an input from the adaptive closed loop controller 2836. This input is the Control Variable, which tries to bring the product consumption process 2837 back on track by appropriate level of action exercised upon incentive price discounts, as if the disturbances 2838 had not occurred.

FIG. 28C illustrates method 2850 by which the CCC system can correct for disturbances in the product consumption process 2837.

At step 2851, a product is identified. At step 2852, a Control Interval is identified. At step 2853, a Time Window is identified.

At step 2854, the correlation between consumption of the product and the incentive price discounts offered to consumers on Predictive Purchase Orders for the product is identified. Data to establish this correlation can be obtained from product manufacturers participating in the PDMS 100. In addition, this data can be supplemented by data obtained from the statistical experiments described previously with reference to step 2803. In those experiments the actual purchase order data, which is recorded in the consumer orders DBM 234, can be used to compile the consumption associated with each incentive price discount.

At step 2855, the Baseline Consumption of the product, over the Time Window, is identified.

At step 2856, the Open Loop Consumption of the product, over the Time Window, is identified. At step 2857 the value of the Control Variable is computed by the adaptive closed loop controller 2836.

At step 2858, the Control Variable is applied to product consumption process 2837. At step 2859, the product consumption database 2835 is updated to reflect the output of the product consumption process 2837.

At step 2860, the Time Window is advanced by an amount equal to the Control Interval. Step 2860 completes the cycle of the control loop. From step 2860, the process loops back to step 2855 to start a new loop cycle and continues indefinitely in the control loop maintaining consumption of the product free from disturbances.

IX. THE DISPLAY SHOP

The Display Shop was introduced in the "Summary of the Invention" as one aspect that is preferably included in the Product Distribution Management System (PDMS) 100. This Section describes one business model in accordance with which a Display Shop can operate.

For the purpose of this description, a Display Shop is a commercial establishment that specializes in providing display space and information services for consumer products.

The business model preferably includes the following components:

(1) Providing space for displaying products on the behalf of manufacturers, wholesalers, and distributors.

(2) Providing trained technicians for assisting consumers, answering questions, explaining product features, giving product demonstrations, offering technical support, conducting training sessions on the operation of products, etc.

(3) Soliciting representation contracts including product display and information services from manufacturers, wholesalers, and distributors.

(4) Coordinating and securing local advertising on the behalf of the manufacturers, wholesalers, and distributors represented.

(5) Providing a web based Storefront, including web browsers within the Display Shop, for placing orders for any products listed in the Virtual Inventory DBM 231 or executing other transactions (6) Relying on local Inventory Providers, such as regional distribution centers, to send the products sold by the Display Shop directly to the Order Aggregation Site of the consumer's choice.

(7) Focusing the operations on the product lines that can be efficiently serviced with the available resources.

In accordance with this business model, a Display Shop need not carry inventory for sale. Instead, the products sold can be brought directly from regional distribution centers to the Order Aggregation Site of the consumer's choice to be made available based upon the consumer's instructions. The Display Shop can afford the use of premium commercial space because it does not have the financial burden of carrying inventory on its shelves.

The primary function of the Display Shop is to provide the ultimate environment where consumers can make the right decisions with respect to products they are interested in buying. Preferably a Display Shop maintains high standards for customer service and satisfaction, by using well-trained and courteous personnel with adequate knowledge of the product lines supported. It can place emphasis on quality of service and appeal of the facilities used to develop a large clientele of committed patrons.

The Display Shop can derive revenues from both inventory providers seeking display space and information services to promote their product offerings and retail sales booked from the web Storefront.

Display Shops can also participate in the Distributed Exhibition System presented in Section XII, whereby manufacturers of consumer products can have their products displayed nationwide at locations reasonably accessible to consumers.

X. UNIFORM CONSUMER PREFERENCE CODES

The Uniform Consumer Preference Codes were introduced in the "Summary of the Invention" as one aspect that is preferably included in the Product Distribution Management System (PDMS) 100 and a brief description of their operation was provided in Section II.A.8. This Section describes a preferred configuration of the Uniform Consumer Preference Codes with reference to FIG. 26 and a preferred method for their operation with reference to FIG. 27.

The Uniform Consumer Preference Codes (UCPC) represent a universal coding system and method designed to characterize discrete consumer products that fall into well-understood definitions, but where each sample is distinct in terms of its specific characteristics. For example, bananas represent a well-defined product, but each banana is distinct in that no two bananas are identical. This is in contrast with consumer products known as staples where separate samples of the same product are practically indistinguishable.

Because of the broad range of characteristics that discrete products can exhibit, it is often impractical, if not impossible, to describe such products in sufficient detail to unequivocally identify what a consumer may have in mind. Using the previous example of bananas, an Internet grocer may offer a choice of green and ripe bananas. However, such selection falls short of identifying what a consumer may have in mind when shopping for bananas online.

The Uniform Consumer Preference Codes (UCPC) address this problem by providing a system and method whereby a consumer can easily identify with sufficient specificity the desired discrete product. The intent of the UCPC is to provide a system and method offering the convenience and incentive for consumers to extend online shopping to discrete products.

The UCPC are extensible universal codes that can be configured to represent each of the relevant characteristics of a discrete product with the desired level of granularity to satisfy even the most demanding consumer. The codes are universal to the extent that they can be applied without restriction to any discrete consumer product.

Preferably, the codes consist of character fields whereby each field is associated with one of the relevant characteristics of the discrete consumer product. The length of each character field can be individually configurable to provide the flexibility to adjust the granularity by which each characteristic is specified. The number of fields can also be configurable to not limit the number of characteristics that can be specified. The configuration flexibility makes the UCPC extensible, whereby the desired specificity can be defined for a particular discrete consumer product. The codes apply to the initial configuration of a discrete product and to any subsequent reconfiguration that experience may dictate to be desirable.

FIG. 26 illustrates two example representations of UCPC 2610 and 2650 that can be included in a web page used for code selection by the consumer. These representations show a text box for PRODUCT 2611 followed by a field 2612 containing the common designation of the product. They show a text box for CODE NAME 2613 followed by a field 2614 for the consumer to enter a personally selected name that can be subsequently used to refer to the selected code. In representation 2610 the product is BANANA 2612 and the code name entered by the consumer is GREEN 2614. They show a row of three text boxes for the titles CHARACTERISTIC 2615, UNIT 2616, and UCPC 2617. Below these title boxes there are rows of fields whereby each field is associated with the respective title. The first characteristic is WEIGHT 2621 with a unit of OUNCE 2631 and the second characteristic is RIPENESS 2622 with a unit of DAY 2632. The field for the common product designation 2612 and the fields for the various characteristics and their respective units are entered during system configuration. The field for selected code name 2614 and the fields for the selected UCPC 2641 and 2642 are entered by the consumer. Preferably the tolerance for the code values is set to a standard value of plus or minus one half unit. For example a ripeness value of 3 indicates that the ripeness is within the range 2.5 to 3.5.

In representation 2650, the product is a NEW YORK STEAK 2652 and the code name entered by the consumer is MY NY 2654. The first characteristic is THICKNESS 2661 with a unit of INCH 2671, the second characteristic is WEIGHT 2662 with a unit of OUNCE 2672, the third characteristic is MARBLE FAT 2663 with a unit of SPOTS/SQ IN 2673 and the fourth characteristic is PERIPHERAL FAT 2664 with a unit of % 2674. The corresponding UCPC are shown in fields 2681 through 2684.

The method for the use of UCPC can be supported by documentation that clearly identifies the discrete product associated with each code. For characteristics identified by well-established units, such as inch for length or ounce for weight, the unit is usually sufficient. However, for characteristics that identify appearance, such as the fat distribution in a New York steak, the documentation can include pictures or other special references that satisfactorily express the characteristic. An example of a special reference is a set of fabric samples that establish a scale of smoothness to the touch. Such sample sets can be available at Order Aggregation Sites 400, Display Shops 3006, or other convenient locations to enable consumers to select the desired codes. Once a consumer selects the desired UCPC for a particular discrete product, preferably those codes are stored in the VIMS 200 in the Consumer DBM 239. Thereafter, every time the consumer orders that discrete product, the selected UCPC can be automatically displayed along with the personal designation assigned by the consumer, as shown in fields 2614 and 2654 of FIG. 26. If the consumer needs to have more than one code for a particular discrete product, the different codes can be distinguished by the code name assigned by the consumer. For example, a consumer can use the code name GREEN for a 7-ounce banana with a ripeness of 3 and the code name ROTTEN for a 5-ounce banana with a ripeness of 10, which the consumer likes to order for baking banana bread.

After the UCPC for a discrete product are documented and configured in the VIMS 200, it is preferably the responsibility of the retailer or inventory provider to ensure compliance with code specifications. The level of compliance can, over time, become a valuable criterion for consumers to judge and select retailers. Consumers will be more likely to patronize those retailers that earn the reputation for dependability and compliance with the UCPC.

Figure 27:
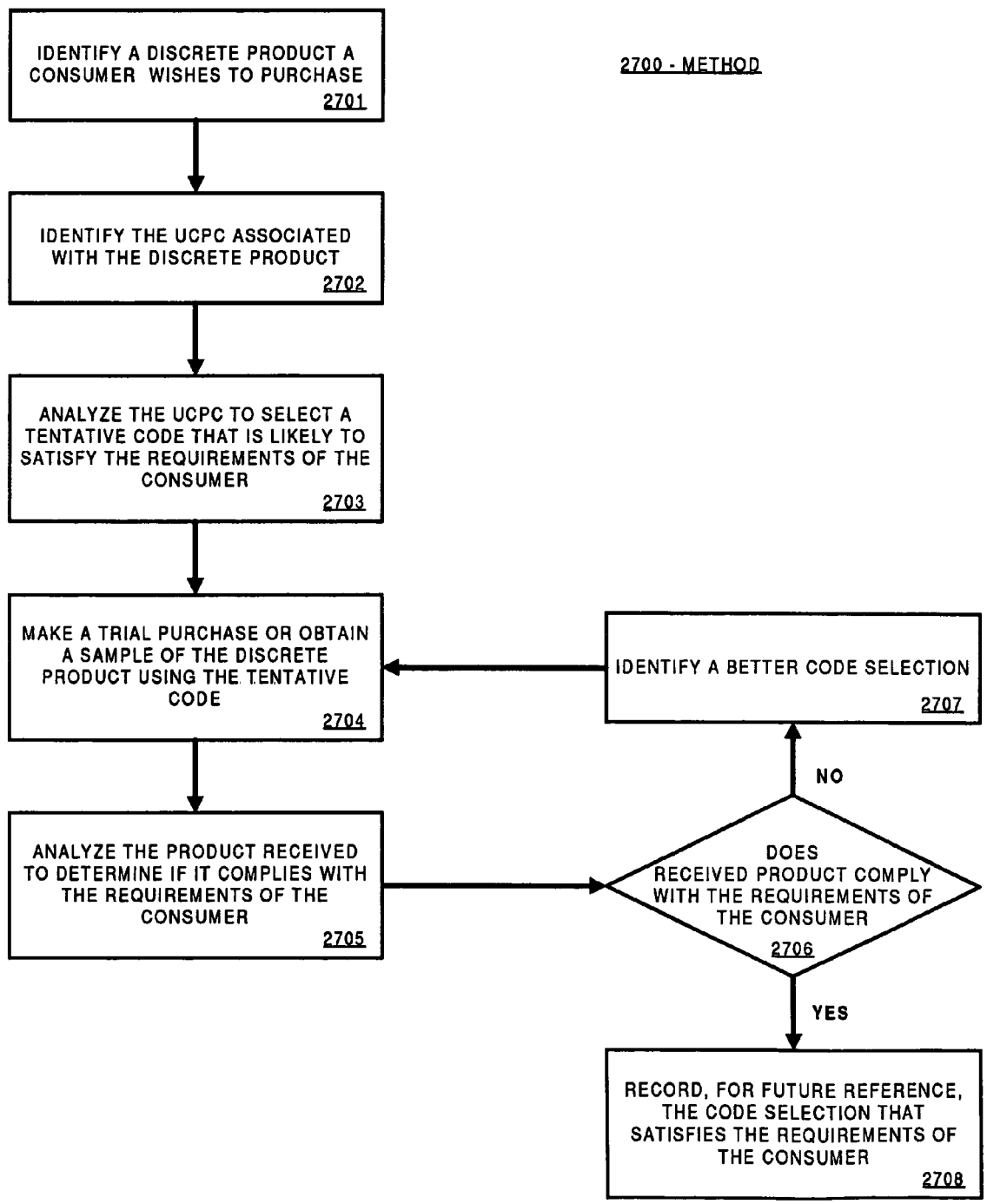
FIG. 27 illustrates a preferred method performed by the consumer to define Uniform Consumer Preference Codes.

FIG. 27 illustrates a flowchart for a preferred method 2700 by which the UCPC can be used to facilitate online purchases of discrete products by consumers.

At step 2701, a discrete product a consumer wishes to purchase is identified. This step can be performed online, at a retail store, at a Unique Items Shop, etc. At step 2702, the UCPC associated with that discrete product are identified. Preferably, the UCPC and the respective documentation are available online and can be accessed by any user. For example, the UCPC can be stored in a database and searched by the conventional designation of the discrete product such as that used by retailers. The documentation can include detailed descriptions, figures, pictures, links to other files for additional detail, etc.

At step 2703, the UCPC for the desired discrete product are analyzed to select a tentative code that is likely to satisfy the requirements of the consumer. For some items, such as the softness of a fabric that cannot be experienced online, the consumer can resort to a retail store or Unique Items Shop to physically obtain the detailed information expressed by each code. Some consumers may prefer to make a best guess for a tentative code based upon personal experience, additional information obtained through dialog with a representative from a retail store or Unique Items Shop, a recommendation from a friend, etc.

At step 2704, the consumer makes a trial purchase or obtains a sample of the desired discrete product using the selected tentative code. This step implies that the consumer is responsible for the trial purchase unless the retailer elects to provide the consumer a free sample of the discrete product associated with the selected code.

At step 2705, the discrete product received through the trial purchase is analyzed to determine if it complies with the requirements of the consumer. This analysis may involve a simple inspection, trying the product in the case of clothing or footwear, cooking and tasting the product in the case of food products, etc. At step 2706, if the outcome of the analysis is not affirmative, the process continues with step 2707 where an attempt is made to select a code that better represents the requirements of the consumer. This step is predicated upon the experience gained through previous code selection and uses a successive approximation algorithm. After step 2707, the process goes back to step 2704, previously described.

At step 2706, if the outcome of the analysis is affirmative, the process continues with step 2708 where the code selection that satisfies the requirements of the consumer is recorded for future reference. Preferably, this code is recorded in the Consumer DBM 239 in the VIMS 200. In most cases, a consumer may only use one code for a specific discrete product. However, in some cases, the consumer needs more than one code for a particular discrete product. When more than one code is needed, method 2700 is repeated for each code.

XI. THE UNIQUE ITEMS SHOP

The Unique Items Shop was introduced in the "Summary of the Invention" as one aspect that is preferably included in the Product Distribution Management System (PDMS) 100. This Section describes a preferred configuration of a Unique Items Shop.

The Unique Items Shop is preferably operated by those retailers that specialize in unique items that the consumer prefers to personally select as opposed to staple type products.

By subscribing to the PDMS 100, the Unique Items Shop can also sell staple type products or other products in the Virtual Inventory DBM 231 but need not carry such products on its precious shelf space or provide for additional inventory space. Instead, products not normally carried by the Unique Items Shop can be supplied from regional distribution centers and made available at any local Order Aggregation Site of the customer's choice.

The Unique Items Shop can be equipped with browsers that operate as web storefronts that customers can use to access the VIMS 200 to place orders for any products listed in the Virtual Inventory DBM 231 or execute other transactions. As an alternative, customers can have a sales representative access a browser to place such orders on their behalf. By subscribing to the PDMS 100, the Unique Items Shop can sell any product in the Virtual Inventory DBM 231 without incurring the costs associated with maintaining additional inventory. Accordingly, the Unique Items Shop has the opportunity to increase revenues and profits while providing better service to its patrons.

XII. THE DISTRIBUTED EXHIBITION SYSTEM

The Distributed Exhibition System was introduced in the "Summary of the Invention" as one aspect that is preferably included in the Product Distribution Management System (PDMS) 100. This Section describes the Distributed Exhibition System.

As they increase in popularity, Display Shops can be coordinated by the PDMS 100 to create a nationwide Distributed Exhibition System (DES) where manufacturers can display their products or unveil new product offerings. The DES preferably functions as an exhibition center except that it is not concentrated in one large hall. Instead, it is distributed through thousands of Display Shops operating year around during conventional commercial hours.

As an example, assume a manufacturer announces a new product to be introduced at some future date. While the manufacturer contracts with advertising agencies for the advanced promotion of the new product it also contracts through the PDMS for exhibiting the new product nationwide starting at the announced introduction date. As another example, a manufacturer can conduct a pilot in a selected region for a specific time window to test the consumer acceptance of a new product before committing to large volume production.

The DES, which is preferably coordinated by the PDMS 100, can market its display space by methods similar to those used by conventional exhibition halls. However, the DES offers unlimited flexibility with respect to time window and location in contrast with an exhibition hall where the display is limited to a specific time window and one location. In this respect the DES offers both manufacturers and consumers numerous advantages. Manufacturers control the level of consumer exposure they wish to achieve by selecting Display Shops and time windows while consumers are offered the convenience and ease of access to new products, live demonstrations, feature and price comparisons, and trained personnel.

XIII. SHIPPING AND RECEIVING THROUGH ORDER AGGREGATION SITES

Shipping and Receiving Through Order Aggregation Sites was introduced in the "Summary of the Invention" as one aspect that is preferably included in the Product Distribution Management System (PDMS) 100. This Section describes, with reference to FIG. 29 and method 2900 Shipping and Receiving Through Order Aggregation Sites.

A common problem often confronting consumers relates to delivery of parcels by carrier services. Typically, such deliveries are executed randomly without notice. If the consumer happens not to be home when the carrier service arrives, a notice is usually left on the door and, over the next few days, other attempts are made to deliver the parcel. The notice provides a phone number the recipient can call or an address where the recipient can pickup the parcel. However, there are additional complications. Assume the recipient finds the notice of attempted delivery upon returning home from work. The next day, the recipient contacts the delivery service to make arrangements to pickup the parcel. By then the parcel may already be on another delivery truck, for a second delivery attempt sometime that day. Unfortunately, the recipient is normally not home during the workweek and this lack of coordination may continue for several days. Sometimes the delivery service is able to hold the parcel for recipient pickup but other times the parcel ends up being returned to the sender. The lack of coordination illustrated by this example shows the significant inefficiencies presently experienced by conventional carrier services. The lack of proper coordination results in wasted labor, miles driven by delivery trucks, and storage space. In addition, the recipient is subject to considerable inconvenience and waists valuable time.

Facilitating the use of the OAS 400 to coordinate the transfer of parcels between senders and receivers, associated with parcel deliveries by conventional carriers, can eliminate the inefficiencies described above.

Figure 29:
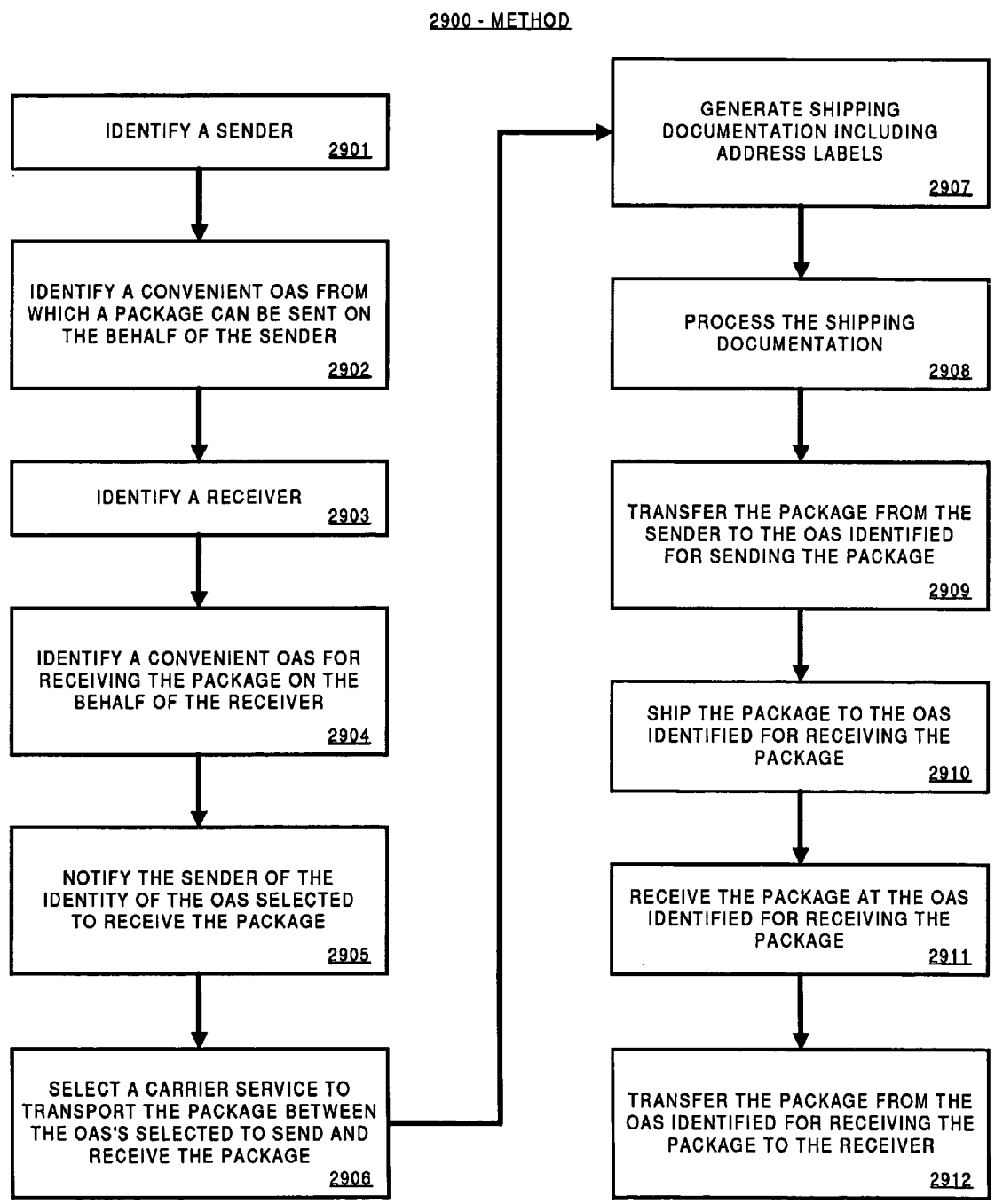
FIG. 29 illustrates a preferred method used for sending and receiving parcels using the infrastructure provided by the Order Aggregation Sites.

FIG. 29 illustrates a method 2900 by which the OAS 400 can be used by consumers to send and receive parcels.

At step 2901, a sender is identified. Assuming the sender is a registered user of the PDMS 100, upon logging on, the sender can be automatically recognized and identified. At step 2902, a convenient OAS 400 from which the parcel can be sent on the behalf of the sender is identified. If the sender elects to deliver the parcel to the OAS 400, the sender selects the OAS 400. If the sender elects to have the PTSS 300 pickup the parcel at a designated address, the selection of the OAS 400 can be made by the VIMS 200. This selection can take into consideration various factors such as the distance from the designated address to each available OAS 400 in the area, the PTSS 300 schedules, pending pickups or deliveries in the vicinity of the designated address, etc.

At step 2903, a receiver is identified. To execute this step the VIMS 200 preferably presents to the sender a web page where the sender can enter the name and address of the intended receiver. If the receiver is a registered PDMS 100 user, the receiver is preferably automatically recognized and no further information is required to process the shipping of the parcel. If the receiver is not a registered PDMS 100 user, the VIMS preferably obtains from the sender the receiver's contact information such as address, email address or phone number.

At step 2904, a convenient OAS 400 for receiving the parcel on the behalf of the receiver is identified. If the receiver is a registered PDMS 100 user, the VIMS 200 can use the Pickup and Delivery Information Module (PDIM) 216 to identify the appropriate OAS 400. If the receiver is not yet a registered PDMS 100 user, the VIMS can contact the receiver to first register the receiver in the PDMS 100 before using the PDIM 216.

At step 2905, the sender is notified of the identity of the OAS 400 that was selected to receive the parcel. This step provides the sender valuable information whereby the selection of a receiving OAS 400 indicates that the receiver is ready to receive the parcel. At this point, the sender knows that the receiver has been notified and that proper arrangements for the transfer of the parcel to the receiver from the selected OAS 400 have been completed.

At step 2906, a carrier service is selected to transport the parcel between the two OAS's 400 identified to send and receive the parcel. The selection of a carrier service can be made by the sender, receiver, participating OASs 400, etc. For example, a particular OAS 400 can offer discount-shipping rates through the use of carriers operating under contract with that OAS 400.

At step 2907 shipping documents including bar-coded address labels are generated preferably by the VIMS 200. Bar-coded address labels are desirable for improving the efficiency of the shipping process. At step 2908, the shipping documentation is processed. This step preferably involves sending confirmations of the shipment to the sender, carrier, and receiver, generating shipping schedules, generating applicable billing information, notifying the receiver upon arrival of the parcel at the identified OAS 400, notifying the sender upon receipt of the parcel by the receiver, etc.

At step 2909, the parcel is transferred from the sender to the selected OAS 400. If the sender elects to deliver the parcel to the selected OAS 400, the sender executes the transfer. If the sender elects to use residential services, the transfer is executed by the PTSS 300 which picks up the parcel at the address designated by the sender and delivers it to the identified OAS 400. The OASs 400 can also provide packing materials and packing and unpacking services. The OASs 400 can also offer senders and receivers a recycling program for packing materials that can help reduce packing costs and contribute to the preservation of the environment. When a receiver goes to an OAS 400 to pickup a parcel the unpacking can be performed at the OAS 400 thereby saving the receiver the inconvenience of having to dispose of the packing materials. The OAS 400 can store the used packing materials that are in reusable condition and make them available for reuse by senders.

At step 2910, the parcel is shipped via the selected carrier to the OAS 400 identified for receiving the parcel. At step 2911, the parcel is received at the OAS 400 identified for receiving the parcel.

A significant advantage of the use of the OAS's 400 to facilitate shipping of parcels is the improvement in the efficiency of transferring parcels from senders to carriers and from carriers to receivers. Most carrier services have developed high levels of efficiency in city to city transportation but have yet to provide an efficient method to address the problem known as "the last mile." This problem relates to the transportation between senders or receivers and the local carrier depot. Because it is not convenient for individual senders to wait for a carrier to pickup a parcel, carrier trucks carry mostly deliveries. Assuming a carrier truck only carries deliveries, the highest attainable loading efficiency is approximately 50%, corresponding to a condition whereby the truck starts a delivery route with a full load and returns empty. In addition, due to the numerous stops, the miles driven per hour are very low. This results in extremely high operating costs compared to those experienced in long distance transport where the trucks often operate with full loads and the average miles driven per hour is much higher. In contrast, the PTSS 300 can operate at much higher loading efficiencies because of the large volume of transports related to consumer purchases.

At step 2911, the parcel is received at the OAS 400 identified for receiving the parcel. At step 2912, the parcel is transferred from the OAS 400 identified for receiving the parcel to the receiver. If the sender elects to pickup the parcel at the identified OAS 400, the OAS 400 executes the transfer. If the receiver elects to use residential services, the transfer is executed by the PTSS 300, which picks up the parcel at the identified OAS 400 and delivers it to the address designated by the receiver.

XIV. THE ORDER AGGREGATION MALL

The Order Aggregation Mall was introduced in the "Summary of the Invention" as one aspect that is preferably included in the Product Distribution Management System (PDMS) 100. This Section describes, with reference to FIGS. 25A-D, a preferred configuration of an Order Aggregation Mall 2500, which includes the following components:

(1) An Order Aggregation Site.
(2) Unique Items Shops.
(3) Display shops.
(4) Consumer-oriented business services.
(5) General business services.
(6) Post office.
(7) Public transportation.

The Order Aggregation Mall 2500 is intended to significantly improve the quality of life within residential neighborhoods. It integrates the benefits provided by the various aspects of this invention to offer, in a compact area, most of the shopping facilities and services frequently used by consumers. The Order Aggregation Mall 2500 enables consumers to obtain goods and services at a convenient location, often within walking distance, and have little or no need to drive for shopping, by combining driving for shopping with needed driving for services. For example, a consumer may have one or more engagements at the Order Aggregation Mall such as hair styling, luncheon, dental, etc. Since these engagements require a personal trip to the mall, the consumer can easily schedule the pickup of aggregated orders to coincide with the return from the mall, thus eliminating a separate drive associated with shopping. Deployment of these malls can cause significant reductions in vehicular traffic, air pollution, and the time and effort consumers spend shopping.

Except for Unique Items Shops, the retail part of the Order Aggregation Mall 2500 operates substantially under a Just-In-Time model. Instead of wasting high priced retail shelf space for storing products, it uses the PDMS 100 to coordinate the transport of products from regional distribution centers to the built-in Order Aggregation Site 400, Just-In-Time, for consumer pickup or delivery to the consumer by the PTSS 300. Preferably all businesses in the Order Aggregation Mall 2500 will be equipped with browsers that operate as web storefronts that consumers can use to access the VIMS 200 to place orders for any products listed in the Virtual Inventory DBM 231 or execute other transactions. For prepackaged products that consumers buy frequently, known as staples, the consumer is already familiar with such products and has no need to inspect them. For discrete products that the consumer buys frequently but are difficult to describe with adequate specificity, the Uniform Consumer Preference Codes discussed in Section X can be used to facilitate purchases without the need for the consumer to inspect the products. The remaining products are either unique items that the consumer wants to personally select or products that the consumer is not familiar with that may require inspection, analysis, possible demonstration, brand and price comparison, etc. For the last two types of products, the Order Aggregation Mall 2500 offers Display Shops and Unique Items Shops further described in Sections IX and XI respectively.

Figure 25A:
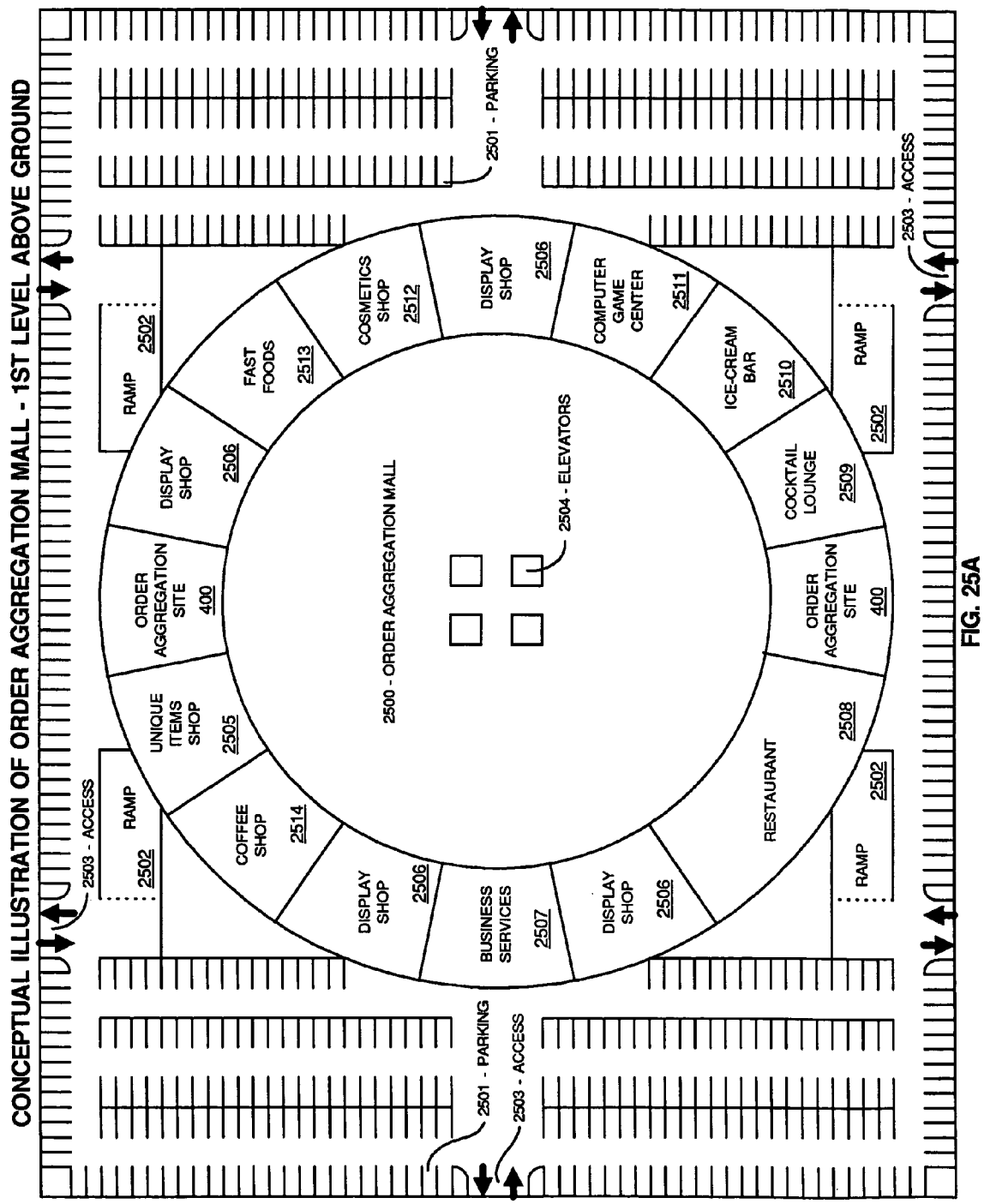

FIG. 25A illustrates the first or ground level of the Order Aggregation Mall 2500. It shows parking 2501, ramps 2502 providing access between the ground and underground levels, driving accesses 2503, and four elevators 2504 for pedestrian access to the various levels. These elevators 2504, shown in the center of the mall, can have separate entrance and exit doors to facilitate pedestrian traffic. In addition they can operate in a staggered schedule whereby, at any time during hours of operation, one of the four elevators is either stopped at, or on the way to, each of the four levels of the mall, thus ensuring that pedestrian wait is very short. The Order Aggregation Site 400 is preferably located on the same footprint on the four levels to permit the movement of products and personnel between the four levels by elevators internal to the Order Aggregation Site 400. The building is shown as a ring shape structure divided into commercial spaces. The ring shape, depicted in the figure, is intended to show scalability whereby the number of stores can be adjusted by varying the diameter of the ring. It is to be understood that such ring shape is merely illustrative of, and not restrictive on, the architectural configuration selected for a particular Order Aggregation Mall 2500. It is also to be understood that the stores and services depicted in FIGS. 25A-D are merely illustrative of, and not restrictive on, the stores and services selected for a particular implementation of the concepts presented.

FIG. 25A also shows the Order Aggregation Site 400, Unique Items Shop 2505, Display Shops 2506, Business Services 2507, Restaurant 2508, Cocktail Lounge 2509, Ice Cream Bar 2510, Computer Game Center 2511, Cosmetics Shop 2512, Fast Foods 2513, and Coffee Shop 2514.

Figure 25B:
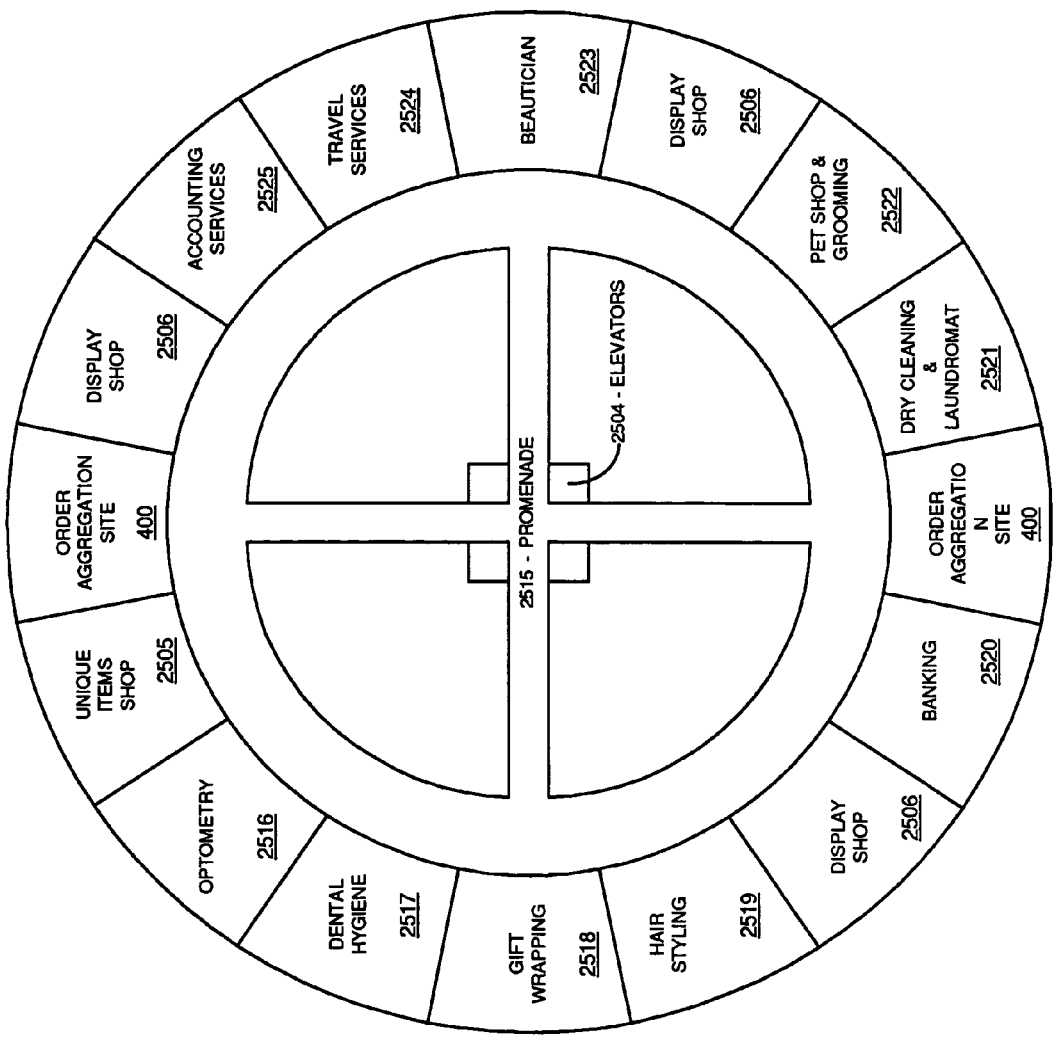

FIG. 25B illustrates the second level of the Order Aggregation Mall 2500. It shows the Order Aggregation Site 400, Unique Items Shop 2505, Display Shops 2506, Optometry 2516, Dental Hygiene 2517, Gift Wrapping 2518, Hair Styling 2519, Banking 2520, Dry Cleaning And Laundromat 2521, Pet Shop and Grooming 2522, Beautician 2523, Travel Services 2524, and Accounting Services 2525. Also shown are the elevators 2504 for pedestrian access to the various levels and a promenade 2515.

FIG. 25C illustrates the third level of the Order Aggregation Mall 2500. It shows the Order Aggregation Site 400, Unique Items Shop 2505, Display Shop 2506, Medical Services 2526, Dental Services 2527, and Legal Services 2528. Also shown are the elevators 2504 for pedestrian access to the various levels and a promenade 2515.

Figure 25D:
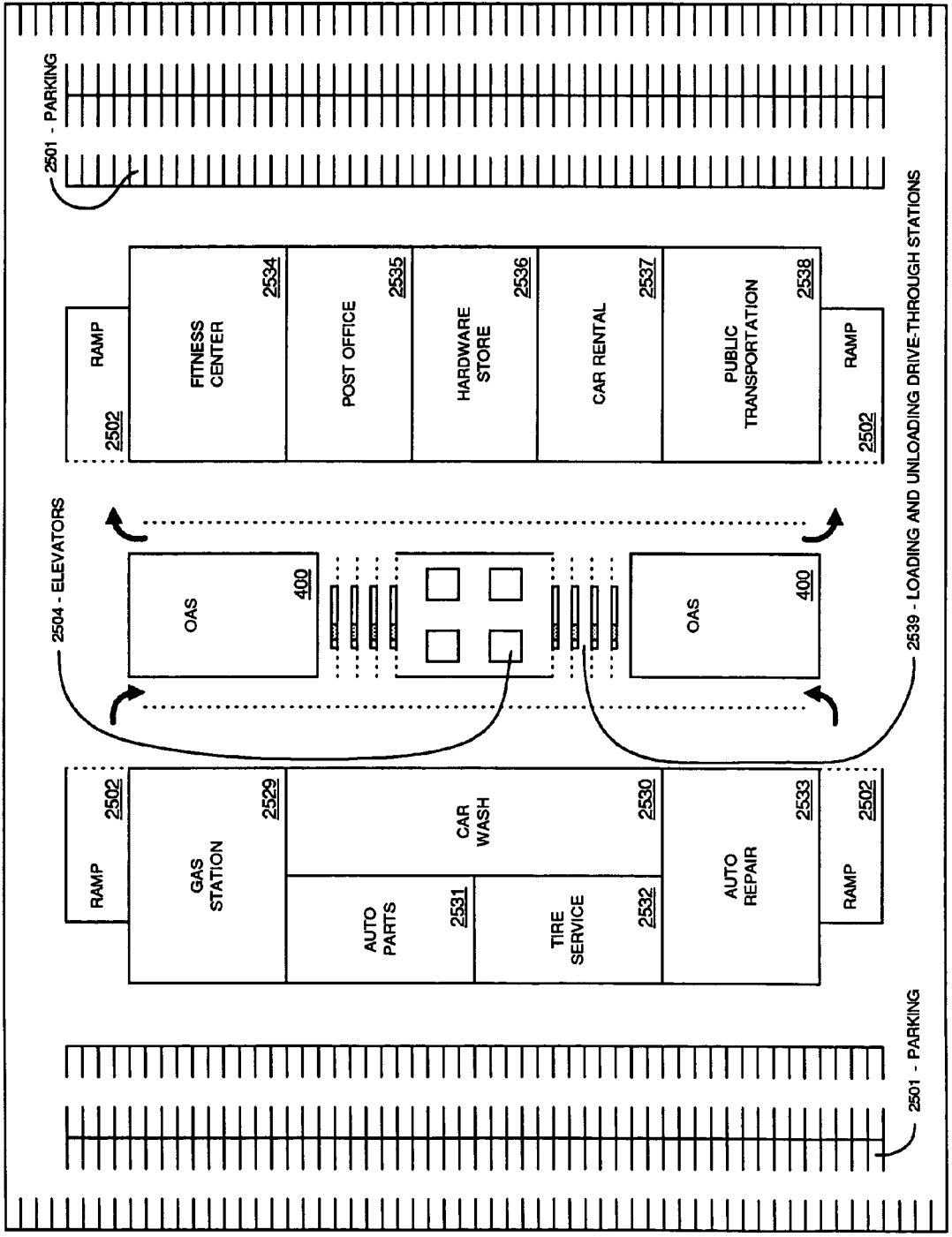

FIG. 25D illustrates the underground level of the Order Aggregation Mall 2500. It shows the Order Aggregation Site 400, Gas Station 2529, Car Wash 2530, Auto Parts 2531, Tire Service 2532, Auto Repair 2533, Fitness Center 2534, Post Office 2535, Hardware Store 2536, Car Rental 2537, and Public Transportation 2538. Also shown are parking 2501, ramps 2502 providing access between the ground and underground levels, elevators 2504 for pedestrian access to the various levels, and the loading and unloading drive-through stations 2539 associated with the OAS 400.

Preferably, Order Aggregation Malls are planned to best meet the needs of the communities they serve. Such needs depend upon numerous factors characterizing the specific community. These factors include size, geographic location, climate, prevailing culture, local economy, local commerce or industry, etc. The size and location of an Order Aggregation Mall are preferably selected to offer the desired services within two miles of most residences in the community.

An Order Aggregation Mall provides maximum benefits when deployed in new facilities properly planned in accordance with the guidelines presented in this Section. However, in many instances Order Aggregation Malls can be deployed by the conversion of existing malls, where it may not be possible to satisfy all such guidelines. In such instances, the Order Aggregation Mall can still provide significant benefits even if only parts of the guidelines are implemented. The conversion process can involve a progressive adaptation over a period of time, spanning several years, during which businesses have the opportunity to adjust to the product distribution concepts proposed herein.

XV. CONCLUSION

While certain preferred embodiments have been described and shown in the accompanying drawings, it is to be understood that such embodiments are merely illustrative of, and not restrictive on, the broad invention. Other embodiments that are apparent to those of ordinary skill in the art, including embodiments that do not provide all of the features and advantages set forth herein, are also within the scope of this invention. Further, it is to be understood that this invention is not limited to the specific construction and arrangements shown and described since various modifications or changes may occur to those of ordinary skill in the art without departing from the spirit and scope of the invention. Accordingly, the scope of the invention is defined by the claims that follow. In the claims, a portion shall include greater than none and up to the whole of a thing. In the method claims, reference characters are used for convenience of description only, and do not indicate a particular order for performing the method.

What is claimed is:

1. A computer-assisted method of managing an inventory associated with product distribution and facilitating a transfer of purchases to each of a plurality of consumers, the method comprising:

on a computer system, for said each of a plurality of consumers:
  associating a plurality of items with each other, wherein each of the associated plurality of items is ordered by said each of the plurality of consumers from a different one of a plurality of merchants;
  identifying a temporary storage facility proximate to said each of a plurality of consumers, from which the associated plurality of items can be transferred to said each of a plurality of consumers;
  identifying a date and time for transferring the associated plurality of items to said each of a plurality of consumers;

on the computer system, for said each of a different one of a plurality of merchants:
  estimating a transportation time for said each of the associated plurality of items ordered by said each of a plurality of consumers from said each of a different one of a plurality of merchants to be transported to the identified temporary storage facility;
  based at least on the estimated transportation time and the identified date and time, synchronizing a shipment of said each of the associated plurality of items from the point of origin to the identified temporary storage facility in accordance with a just-in-time schedule compliant with the identified date and time for transferring the associated plurality of items to said each of a plurality of consumers; and for said each of a plurality of consumers:
  receiving said associated plurality of items at the identified temporary storage facility;
  based at least on the association of the items on the computer system, physically aggregating the associated plurality of items at the identified temporary storage facility; and
  transferring the physically aggregated associated plurality of items to said each of a plurality of consumers.

2. The method of claim 1, wherein each of the associated plurality of items are associated with each other indirectly through an association of each item with said each of a plurality of consumers consumer ordering the item.

3. The method of claim 2, wherein each of the ordered items is a product or comprises one or more products.

4. The method of claim 3, wherein identifying a temporary storage facility proximate to said each of a plurality of consumers, further comprises:
   presenting to said each of a plurality of consumers at least one temporary storage facility proximate to said each of a plurality of consumers at which said each of a plurality of consumers can receive the associated plurality of items;
   obtaining from said each of a plurality of consumers a selection of one of the temporary storage facilities; and
   notifying said each of a different one of a plurality of merchants of the identity of the temporary storage facility selected by said each of a plurality of consumers.

5. The method of claim 4, wherein identifying the date and time for transferring the associated plurality of items to said each of a plurality of consumers, further comprises
   receiving from said each of a plurality of consumers, an identification of the date and time at which said each of a plurality of consumers will expect to receive the associated plurality of items.

6. The method of claim 5 wherein on the computer system for said each of a different one of a plurality of merchants, said synchronizing further comprises:
   associating the items ordered by said each of a plurality of consumers from said each of a different one of a plurality of merchants in a plurality of groups whereby the items in each group are destined for the same identified temporary storage facility and have similar dates and times for transferring the items to the respective consumers; and
   based at least on the estimated transportation time and the identified date and time for transfer, synchronizing the shipping of the items in said each group from the point of origin to the respective identified temporary storage facility in accordance with a just-in-time schedule compliant with the identified date and time for transferring the associated plurality of items to said each of a plurality of consumers.

7. The method of claim 6, further comprising
   providing said each of a different one of a plurality of merchants target shipping dates, times, and schedules for the items in said each group, compliant with the identified date and time for transferring the associated plurality of items to said each of a plurality of consumers.

8. The method of claim 7, further comprising
   providing each temporary storage facility:
      an identification of the shipping schedule of each group of items destined to that facility;
      an identification of the items in said each group; and
      aggregation instructions to aggregate the items in the groups received in accordance with the association of items in the computer system for said each of a plurality of consumers.

9. The method of claim 8, wherein transferring the physically aggregated plurality of items to said each of a plurality of consumers comprises having said each of a plurality of consumers pick up the physically aggregated items at the temporary storage facility.

10. The method of claim 9, further comprising
    reminding said each of a plurality of consumers of the selected date and time to pick up the physically aggregated items at the temporary storage facility.

11. The method of claim 8, wherein transferring the physically aggregated items to said each of a plurality of consumers comprise
    sending the physically aggregated items to said each of a plurality of consumers from the temporary storage facility.

12. The method of claim 11 further comprising
    instructing a delivery service to pick up the physically aggregated items at the temporary storage facility and to deliver the physically aggregated items to said each of a plurality of consumers.

\* \* \* \* \*

UNITED STATES PATENT AND TRADEMARK OFFICE
CERTIFICATE OF CORRECTION

| | |
|---|---|
| PATENT NO. | : 7,257,552 B1 |
| APPLICATION NO. | : 09/817535 |
| DATED | : August 14, 2007 |
| INVENTOR(S) | : Hector Franco |

Page 1 of 1

It is certified that error appears in the above-identified patent and that said Letters Patent is hereby corrected as shown below:

Col. 68, in claim 32 where it reads – The method of claim 31, further comprises – it should read -- The method of claim 31, further comprising -- (Note the change from "comprises" to "comprising").

Col. 68, in claim 34 where it reads – The method of claim 33 further comprises – it should read -- The method of claim 33, further comprising -- (Note the missing comma after "claim 33" and the change from "comprises" to "comprising").

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,257,552 B1
APPLICATION NO. : 09/817535
DATED : August 14, 2007
INVENTOR(S) : Hector Franco It is certified that error appears in the above-identified patent and that said Letters Patent is hereby corrected as shown below:

Column 66, line 22 — Column 68, line 39, delete Claims 1-12 and substitute therefore the attached Claims 1-12.

--1. A network-based computer-assisted method of managing product distribution and facilitating a transfer of purchases from a plurality of merchants to a plurality of consumers, the method comprising:

for each consumer of the plurality of consumers:

receiving an identification of a plurality of items ordered by the consumer, wherein each of the plurality of items is ordered by the consumer from a different one of the plurality of merchants;

associating the plurality of items with each other on a computer system;

identifying a temporary storage facility proximate the consumer, from which the plurality of associated items can be transferred to the consumer;

identifying a date and time for transferring the plurality of associated items to the consumer;

for each item of the plurality of associated items:

identifying an estimated transportation time for said each item to be transported from a point of origin to the identified temporary storage facility; and based at least on the identified estimated transportation time and the identified date and time for transferring the plurality of associated items to the consumer, synchronizing a shipment of said each item from the point of origin to the identified temporary storage facility in accordance with a just-in-time schedule compliant with the identified date and time for transferring the plurality of associated items to the consumer;

receiving the plurality of associated items at the identified temporary storage facility;

physically aggregating the plurality of associated items at the identified temporary storage facility based at least on the association of the plurality of associated items on the computer system; and transferring the physically aggregated plurality of associated items to the consumer.--

-- 2. The method of claim 1, wherein each of the plurality of items are associated with each other indirectly through an association of each item with the consumer ordering the item.--

--3. The method of claim 2, wherein each of the ordered items is a product or comprises one or more products.--

-- 4. The method of claim 3, wherein identifying a temporary storage facility proximate the consumer, further comprises:

presenting to the consumer at least one temporary storage facility proximate the consumer at which the consumer can receive the items;

obtaining from the consumer a selection of one of the temporary storage facilities; and notifying the merchants of the identity of the temporary storage facility selected by the consumer.--

--5. The method of claim 4, wherein identifying a date and time for transferring the plurality of items to the consumer, further comprises receiving from the consumer, an identification of a date and time at which the consumer will expect to receive the items.--

--6. The method of claim 5, wherein said synchronizing further comprises:

including in a group of items said each item and other items ordered by other consumers of said plurality of consumers, wherein all the items in the group are destined for the identified temporary storage facility, have a same point of origin, and have similar dates and times for transferring to consumers; and based at least on the identified estimated transportation time and the identified date and time for transfer, synchronizing shipping of the items in the group from the point of origin to the identified temporary storage facility in accordance with a just-in-time schedule compliant with the identified date and time for transferring to consumers.--

--7. The method of claim 6, further comprising providing each merchant target shipping dates, times, and schedules compliant with the identified dates and times for transferring items to consumers.--

--8. The method of claim 7, further comprising providing each temporary storage facility:

a shipping schedule of each group of items destined to that facility;

an identification of the items in each group; and aggregation instructions to physically aggregate the items in the groups received in accordance with the association of items in the computer system for each consumer.--

--9. The method of claim 8, wherein transferring the physically aggregated items to the consumer comprises having the consumer pick up the physically aggregated items at the identified temporary storage facility.--

CERTIFICATE OF CORRECTION (continued)
U.S. Pat. No. 7,257,552 B1

--10. The method of claim 9, further comprising reminding the consumer of the identified date and time to pick up the physically aggregated items at the temporary storage facility.--

--11. The method of claim 8, wherein transferring the physically aggregated items to the consumer comprises sending the physically aggregated items to the consumer from the temporary storage facility.--

--12. The method of claim 11, further comprising instructing a delivery service to pick up the physically aggregated items at the temporary storage facility and to deliver the physically aggregated items to the consumer.--

Signed and Sealed this

Sixteenth Day of March, 2010

David J. Kappos
*Director of the United States Patent and Trademark Office*